US011305182B2

(12) United States Patent
Hajati et al.

(10) Patent No.: US 11,305,182 B2
(45) Date of Patent: Apr. 19, 2022

(54) HAPTIC ACTUATOR INCLUDING FLEXURE BEARING HAVING DIVERGING ARMS EACH WITH A REDUCED SIZE MEDIAL PORTION AND RELATED METHODS

(71) Applicant: Apple Inc., Cupertino, CA (US)

(72) Inventors: Arman Hajati, San Carlos, CA (US); Jere C. Harrison, Redwood City, CA (US); Jason C. Law, Foster City, CA (US); Logan M. Ames, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 321 days.

(21) Appl. No.: 16/320,345

(22) PCT Filed: Jul. 31, 2017

(86) PCT No.: PCT/US2017/044663
§ 371 (c)(1),
(2) Date: Jan. 24, 2019

(87) PCT Pub. No.: WO2018/151753
PCT Pub. Date: Aug. 23, 2018

(65) Prior Publication Data
US 2021/0016162 A1    Jan. 21, 2021

Related U.S. Application Data

(60) Provisional application No. 62/463,876, filed on Feb. 27, 2017, provisional application No. 62/463,885, (Continued)

(51) Int. Cl.
*A63F 9/24* (2006.01)
*A63F 11/00* (2006.01)
(Continued)

(52) U.S. Cl.
CPC ............ *A63F 13/25* (2014.09); *G06F 3/0481* (2013.01)

(58) Field of Classification Search
USPC ................................ 463/1, 5, 20, 22, 39, 40
See application file for complete search history.

(56) References Cited

U.S. PATENT DOCUMENTS

| 8,169,402 B2 | 5/2012 | Shahoian et al. |
| 2014/0197936 A1 | 7/2014 | Biggs et al. |
| (Continued) | | |

FOREIGN PATENT DOCUMENTS

| EP | 1149636 A1 | 10/2001 |
| GB | 2094097 A | 9/1982 |
| (Continued) | | |

OTHER PUBLICATIONS

Product Specification Sheet: Geeplus, VIBRO1 Vibration Actuator, 2 pages, www.geeplus.biz, downloaded on Jul. 15, 2015.

*Primary Examiner* — Adetokunbo O Torimiro
(74) *Attorney, Agent, or Firm* — Brownstein Hyatt Farber Schreck, LLP

(57) ABSTRACT

A haptic actuator may include a housing, at least one coil carried by the housing, and a field member having opposing first and second sides. The haptic actuator may also include a respective at least one flexure bearing mounting each of the first and second sides of the field member to be reciprocally movable within the housing responsive to the at least one coil. Each flexure bearing may include two diverging arms joined together at proximal ends and having spaced distal ends operatively coupled between adjacent portions of the field member and the housing. The two diverging arms may each have a reduced size medial portion relative to respective proximal and distal ends.

21 Claims, 53 Drawing Sheets

Related U.S. Application Data filed on Feb. 27, 2017, provisional application No. 62/459,701, filed on Feb. 16, 2017.

(51) Int. Cl.
*G06F 13/00* (2006.01)
*G06F 17/00* (2019.01)
*A63F 13/25* (2014.01)
*G06F 3/0481* (2022.01)

(56) References Cited

U.S. PATENT DOCUMENTS

| | | |
|---|---|---|
| 2015/0109223 A1 | 4/2015 | Kessler et al. |
| 2015/0116205 A1 | 4/2015 | Westerman et al. |
| 2015/0130730 A1 | 5/2015 | Harley et al. |
| 2016/0349790 A1 | 12/2016 | Connor |
| 2017/0085163 A1* | 3/2017 | Hajati .................. H02K 33/00 |

FOREIGN PATENT DOCUMENTS

| | | |
|---|---|---|
| JP | 2002316094 A | 10/2002 |
| JP | 2002336783 A | 11/2002 |
| WO | 2013169299 A1 | 11/2013 |
| WO | 2013169303 A1 | 11/2013 |
| WO | 2013169305 A1 | 11/2013 |
| WO | 2013170099 A1 | 11/2013 |
| WO | 2013188307 A2 | 12/2013 |
| WO | 2014018111 A1 | 1/2014 |
| WO | 2015020663 A1 | 2/2015 |

* cited by examiner

HAPTIC ACTUATOR INCLUDING FLEXURE BEARING HAVING DIVERGING ARMS EACH WITH A REDUCED SIZE MEDIAL PORTION AND RELATED METHODS

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

A haptic actuator may include a housing, at least one coil carried by the housing, and a field member having opposing first and second sides. The haptic actuator may also include a respective at least one flexure bearing mounting each of the first and second sides of the field member to be reciprocally movable within the housing responsive to the at least one coil. Each flexure bearing may include two diverging arms joined together at proximal ends and having spaced distal ends operatively coupled between adjacent portions of the field member and the housing. The two diverging arms may each have a reduced size medial portion relative to respective proximal and distal ends.

Each arm may have a blade shape having a length between respective proximal and distal ends, a thickness, and height with a varying profile defining the reduced sized medial portion, for example. Each flexure bearing may also include a spacer member between the proximal ends of the two diverging arms. The haptic actuator may further include a weld joint joining together the spacer member and the proximal ends of the two diverging arms, for example.

Each diverging arm may include first and second parallel and spaced apart blades. Each diverging arm may include proximal and distal end spacers between the first and second parallel and spaced apart blades, for example.

The haptic actuator may also include respective weld joints joining together the proximal and distal end spacers and adjacent portions of the spaced apart blades, for example. Each diverging arm may also include a filler body between the first and second parallel and spaced apart blades, for example.

Each flexure bearing may have a wishbone shape. Each flexure bearing may include at least one mechanical stop adjacent the proximal end. Each flexure bearing may include at least one mechanical stop between the spaced distal ends, for example.

A method aspect is directed to a method of making a haptic actuator. The method may include positioning a respective at least one flexure bearing to mount each of first and second sides of a field member to be reciprocally movable within a housing responsive to at least one coil. Each flexure bearing may include two diverging arms joined together at proximal ends and having spaced distal ends operatively coupled between adjacent portions of the field member and the housing. The two diverging arms may each have a reduced size medial portion relative to respective proximal and distal ends.

Another device aspect is directed to a haptic actuator that may include a housing, at least one permanent magnet carried by the housing, and a field member having opposing first and second sides and that includes at least one coil cooperating with the at least one permanent magnet. The haptic actuator may also include a respective at least one flexure bearing mounting each of the first and second sides of the field member to be reciprocally movable within the housing responsive to the at least one coil. Each flexure bearing includes two diverging arms joined together at proximal ends and having spaced distal ends operatively coupled between adjacent portions of the field member and the housing, the two diverging arms each having a reduced size medial portion relative to respective proximal and distal ends.

A method aspect is directed to a method of making a haptic actuator. The method may include positioning a respective at least one flexure bearing to mount each of first and second sides of a field member to be reciprocally movable within a housing responsive to at least one coil. The housing carries at least one permanent magnet cooperating with the at least one coil. Each flexure bearing includes two diverging arms joined together at proximal ends and having spaced distal ends operatively coupled between adjacent portions of the field member and the housing, the two diverging arms each having a reduced size medial portion relative to respective proximal and distal ends.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations and refer to like elements in different embodiments.

Figure 1:
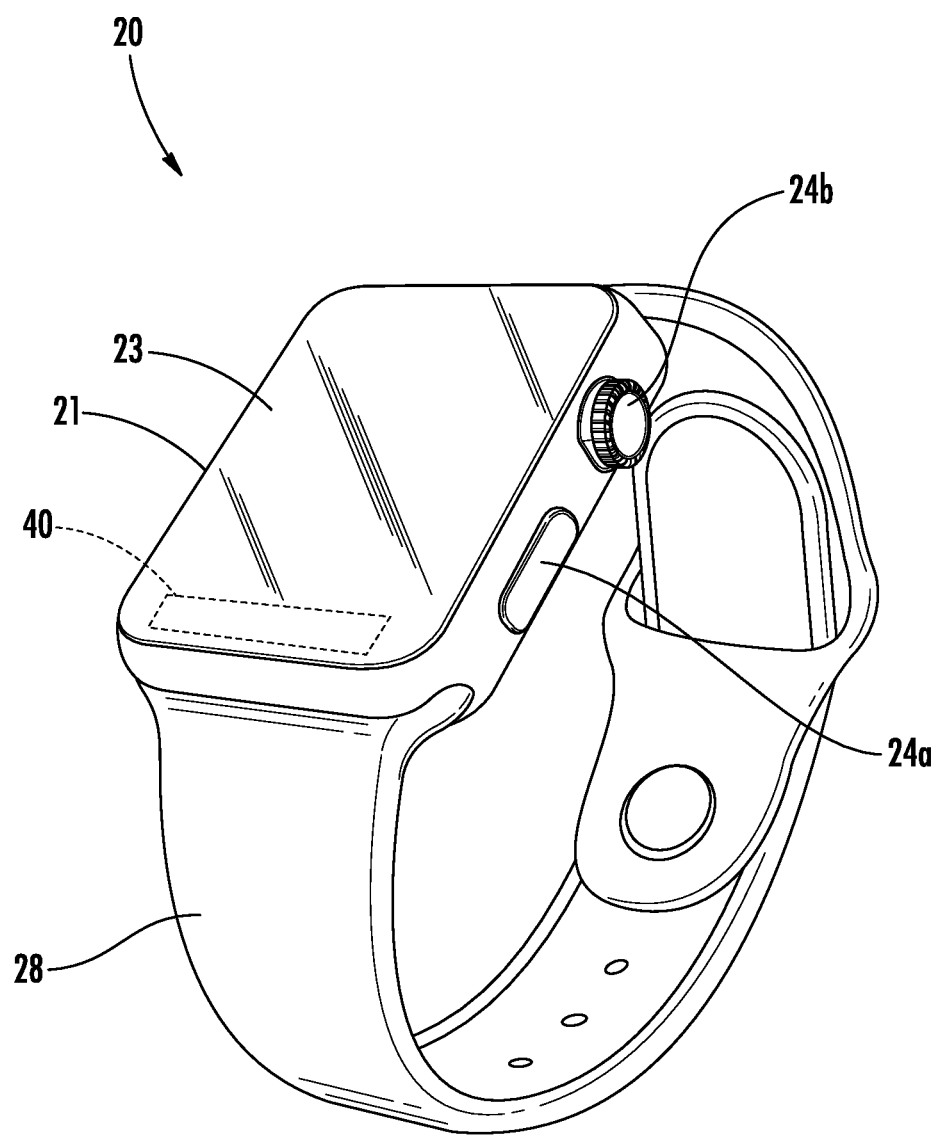
FIG. 1 is a perspective view of an electronic device including a haptic actuator according to an embodiment.
Figure 2:
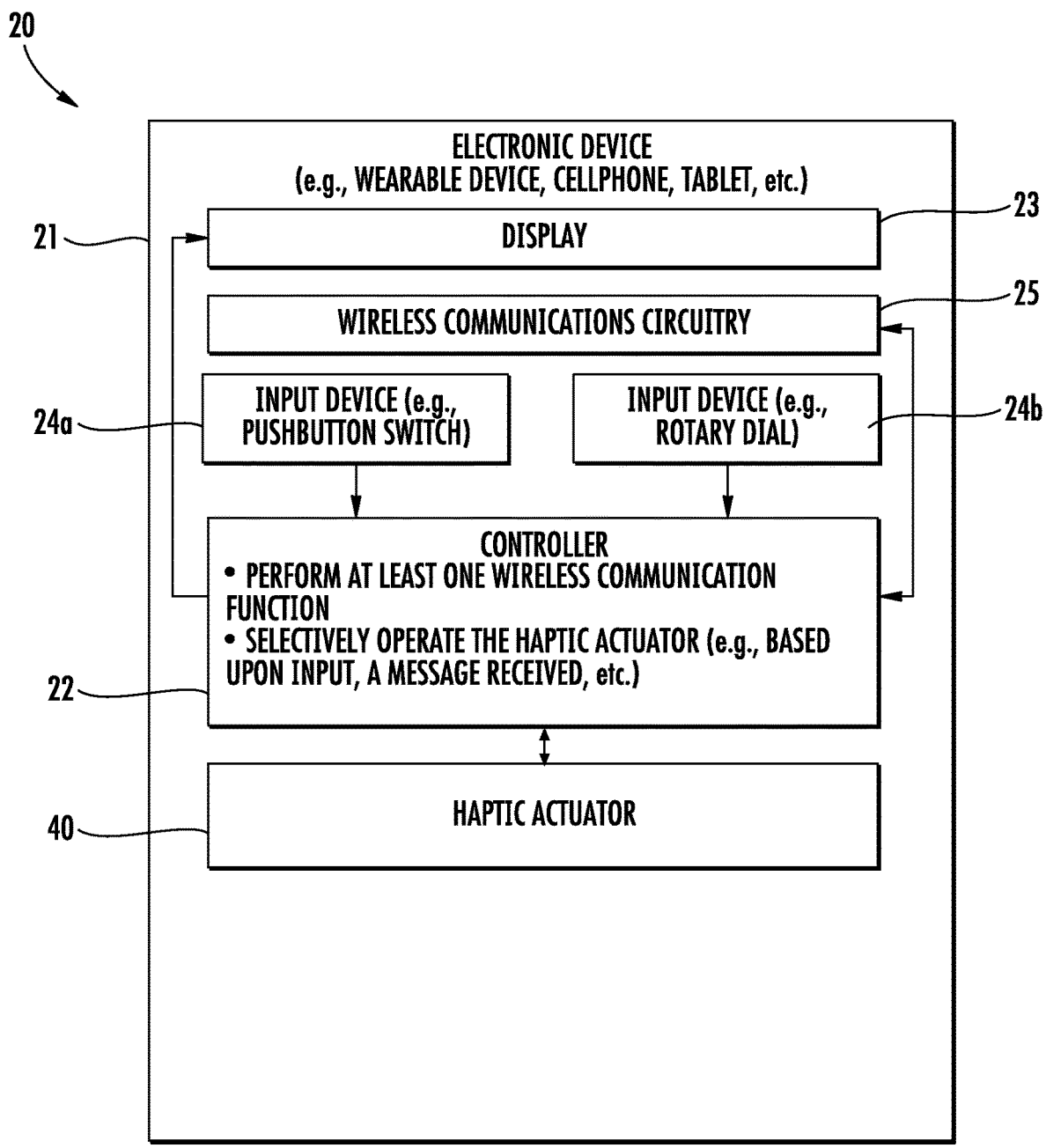
FIG. 2 is a schematic block diagram of the electronic device of FIG. 1.
Figure 3:
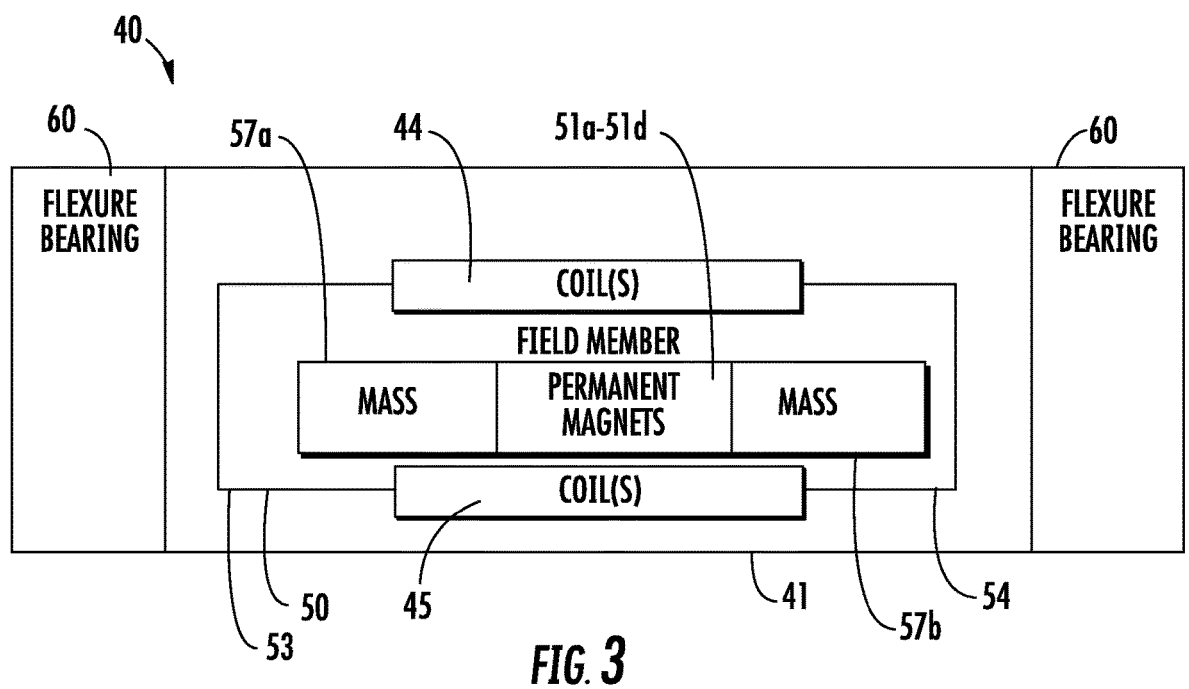
FIG. 3 is a schematic block diagram of the haptic actuator of the electronic device of FIG. 1.
Figure 4:
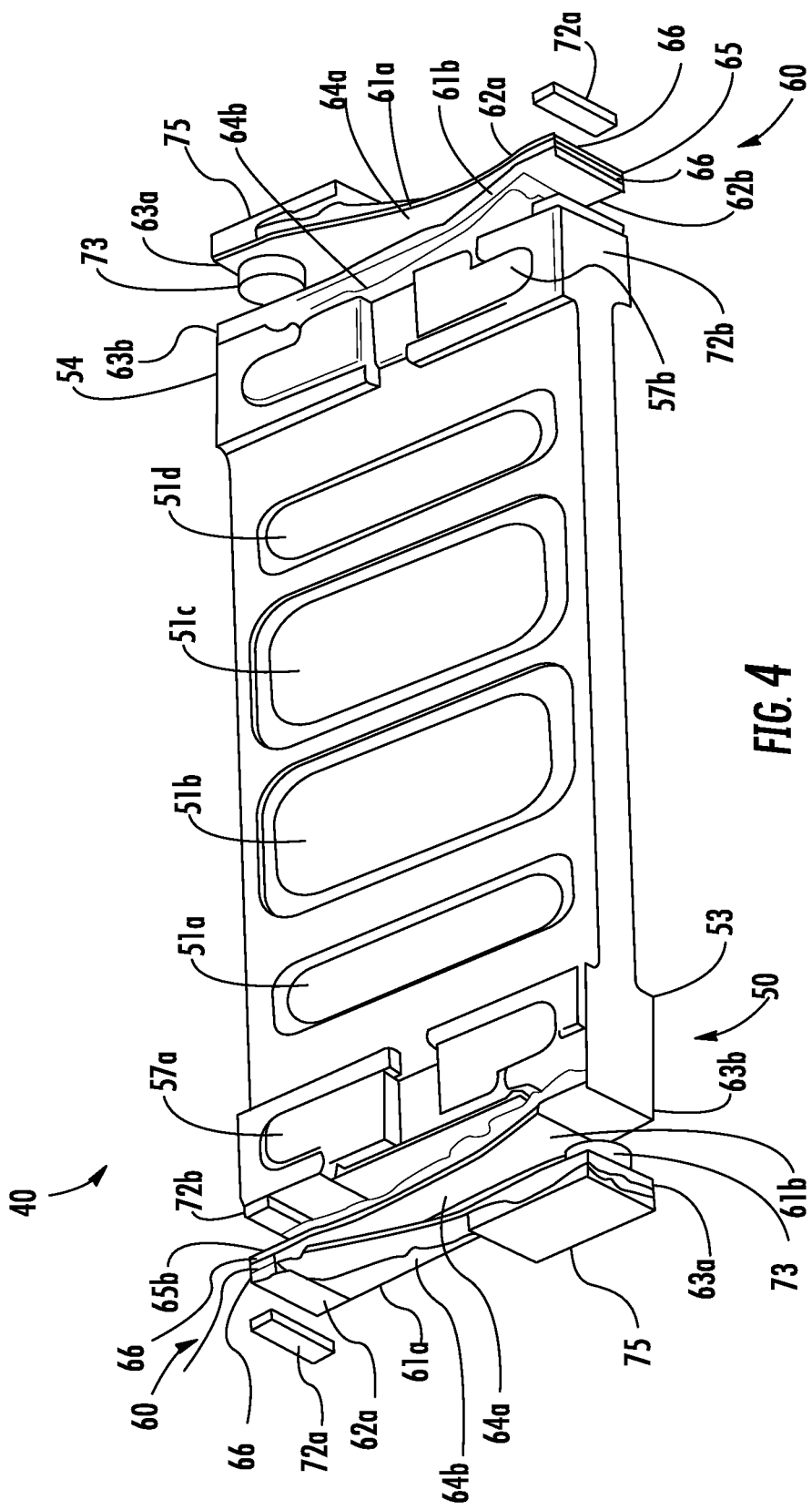
FIG. 4 is a perspective view of a portion of a haptic actuator in accordance with an embodiment.
Figure 5:
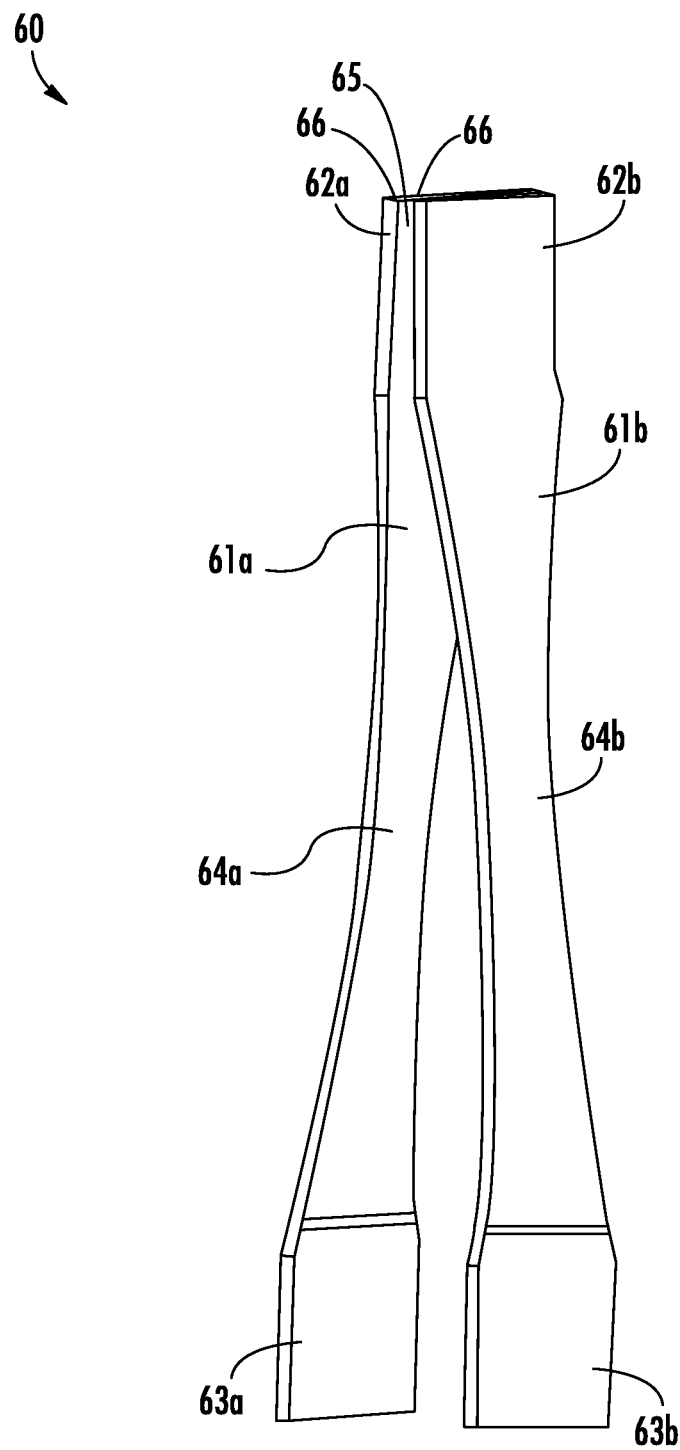
FIG. 5 is an enlarged perspective view of a portion of the flexure bearing of FIG. 4.
Figure 6:
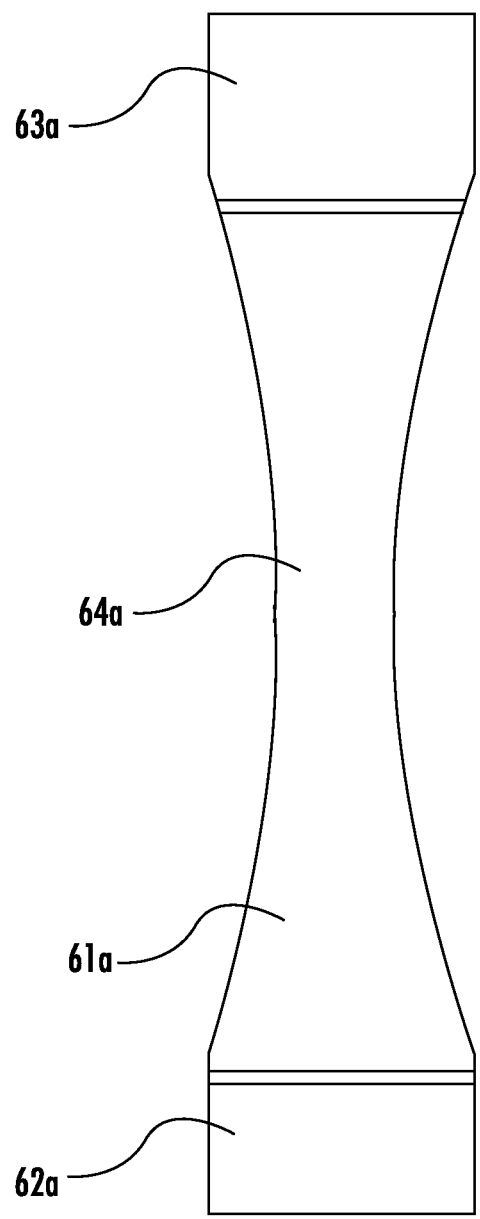
FIG. 6 is top view of the flexure bearing of FIG. 5.
Figure 7:
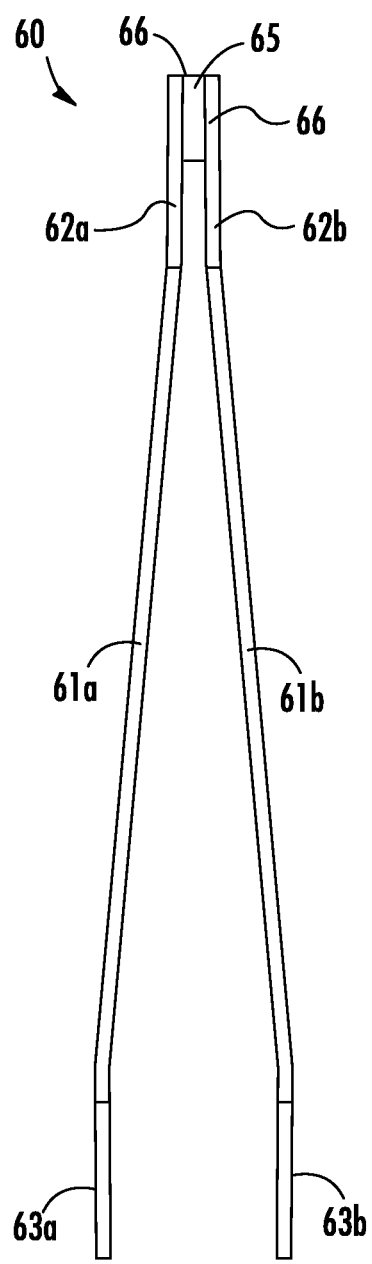
FIG. 7 is a side view of the flexure bearing of FIG. 5.
Figure 8:
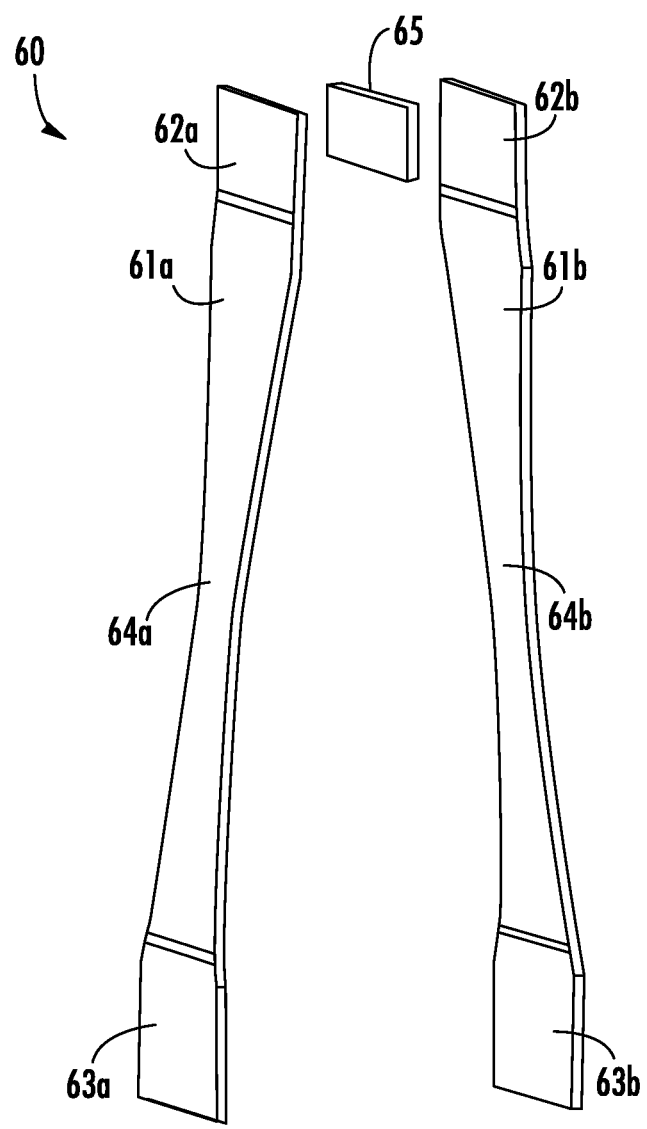
FIG. 8 is an exploded view of the flexure bearing of FIG. 5.

Referring initially to FIGS. 1-2, an electronic device 20 illustratively includes a device housing 21 and a controller 22 carried by the device housing. The electronic device 20 is illustratively a mobile wireless communications device, for example, a wearable wireless communications device, and includes a band 28 or strap for securing it to a user. The electronic device 20 may be another type of electronic device, for example, a cellular telephone, a tablet computer, a laptop computer, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be, for example, a liquid crystal display (LCD), light emitting diode (LED) display, or may be another type of display, as will be appreciated by those skilled in the art. The display 23 may be a touch display.

Finger-operated user input devices 24a, 24b, illustratively in the form of a pushbutton switch and a rotary dial are also carried by the device housing 21 and are coupled to the controller 22. The pushbutton switch 24a and the rotary dial 24b cooperate with the controller 22 to perform a device function in response to operation thereof. For example, a device function may include a powering on or off of the electronic device 20, initiating communication via the wireless communications circuitry 25, and/or performing a menu function.

The electronic device 20 illustratively includes a haptic actuator 40. The haptic actuator 40 is coupled to the controller 22 and provides haptic feedback to the user in the form of relatively long and short vibrations or "taps", particularly when the user is wearing the electronic device 20. The vibrations may be indicative of a message received, and the duration of the vibration may be indicative of the type of message received. Of course, the vibrations may be indicative of or convey other types of information. More particularly, the controller 22 applies a voltage to move a movable body or masses between first and second positions in a y-axis.

While a controller 22 is described, it should be understood that the controller 22 may include one or more of a processor and other circuitry to perform the functions described herein. For example, the controller 22 may include a class-D amplifier to drive the haptic actuator 40 and/or sensors for sensing voltage and current.

Referring now additionally to FIGS. 3-8 the haptic actuator 40 includes an actuator housing 41. The actuator housing 41 illustratively has a dimension in a length direction greater than a width direction. The actuator housing 41 may include ferritic material in portions of or all of the actuator housing. For example, the top and bottom of the actuator housing 41 may be ferritic. Of course other and/or additional portions of the actuator housing 41 may be ferritic. The use of ferritic material in the actuator housing 41 may improve performance, for example.

The haptic actuator 40 also includes first and second coils 44, 45 carried by the actuator housing 41, for example, the top and the bottom, respectively. The first and second coils 44, 45 may each have a loop shape or "racetrack" shape and are aligned in a stacked relation and spaced apart. There may be any number of first and second coils 44, 45, as will be appreciated by those skilled in the art. Moreover, in some embodiments, the first and/or second coils 44, 45 may be carried by the actuator housing around an exterior thereof, i.e., a circumferential voice coil.

The haptic actuator 40 also includes a field member 50 carried by the actuator housing 41. The field member 50, similarly to the actuator housing 41, has a dimension in a length direction greater than a width direction. Thus, the field member 50 is reciprocally movable in the width direction (i.e., the y-direction). While the movement of the field member 50 is described as being movable in one direction, i.e., a linear haptic actuator, it should be understood that in some embodiments, the field member may be movable in other directions, i.e., an angular haptic actuator, or may be a combination of both a linear and an angular haptic actuator.

The field member 50 illustratively includes permanent magnets 51a-51d between the first and second coils 44, 45. The permanent magnets 51a-51d may be neodymium, for example, and may be positioned in opposing directions with respect to their respective poles.

Figure 9:
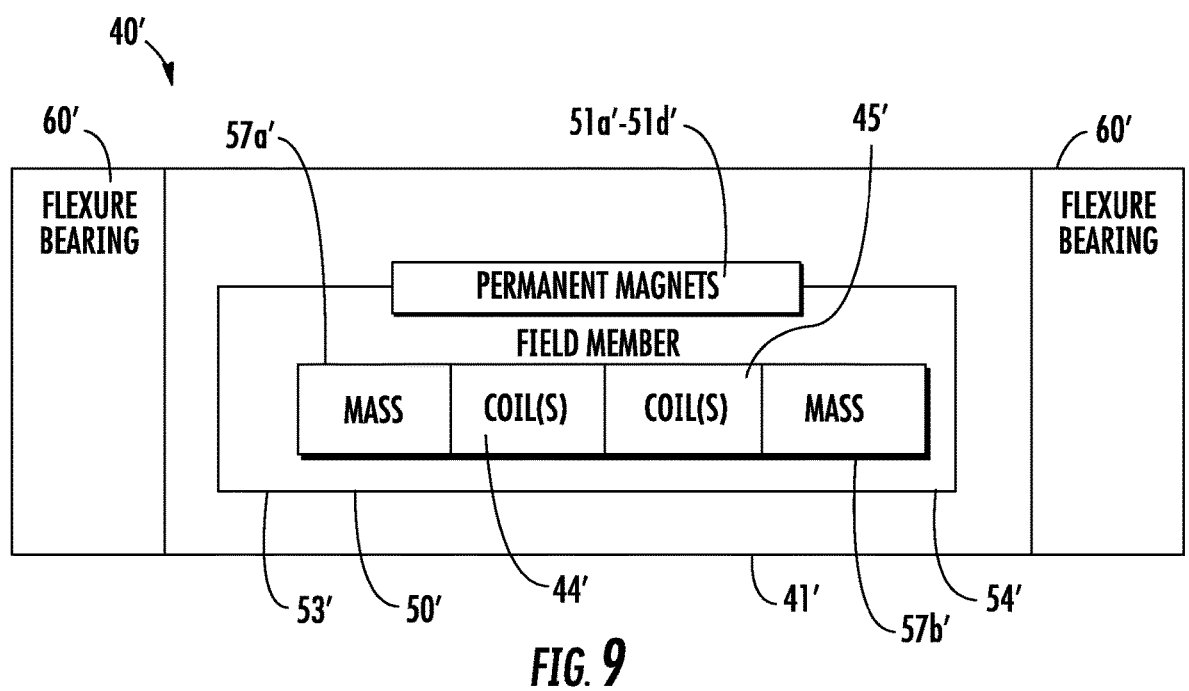
FIG. 9 is a schematic block diagram of a haptic actuator in accordance with an embodiment.
Figure 10:
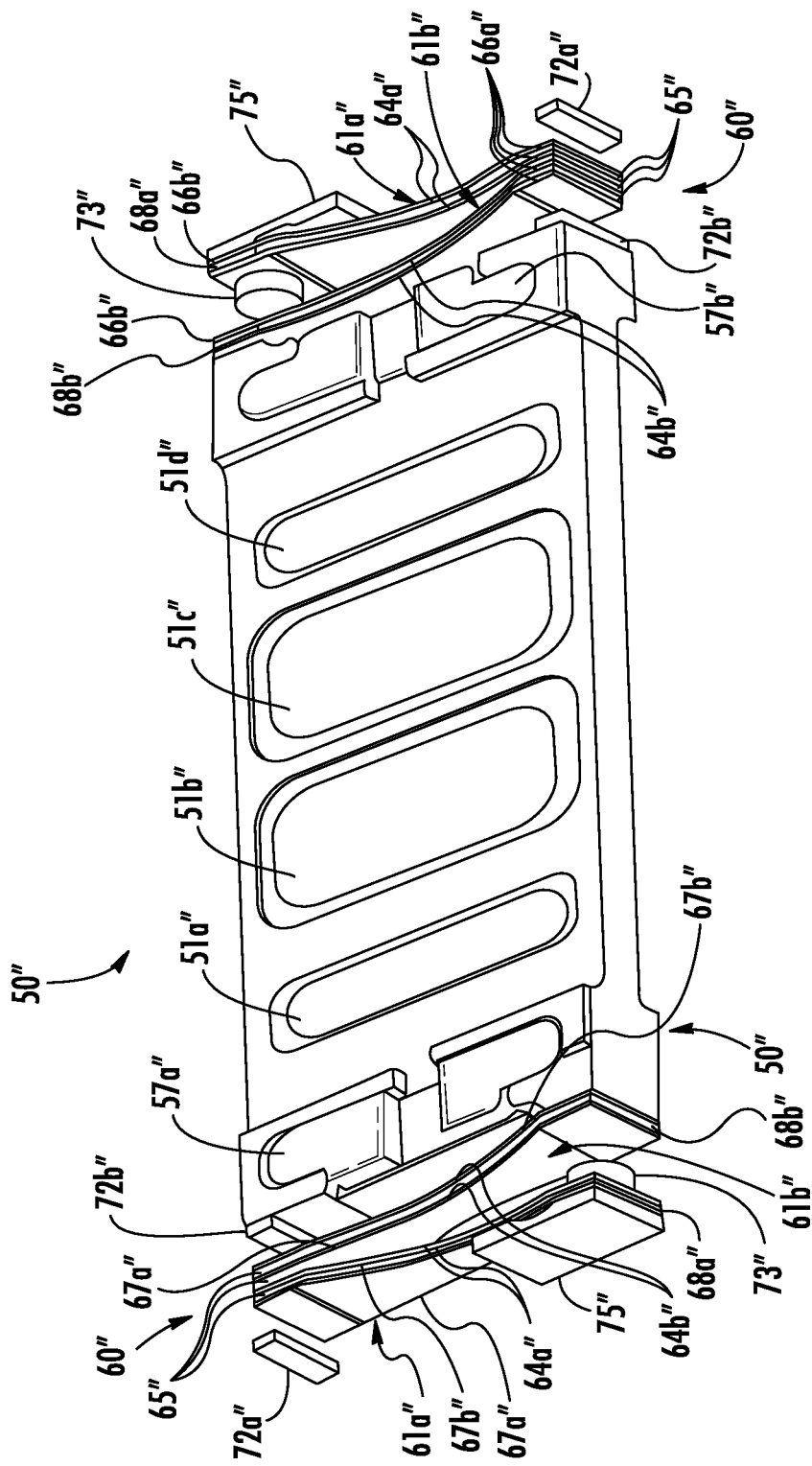
FIG. 10 is a perspective view of a portion of a haptic actuator in accordance with an embodiment.
Figure 11:
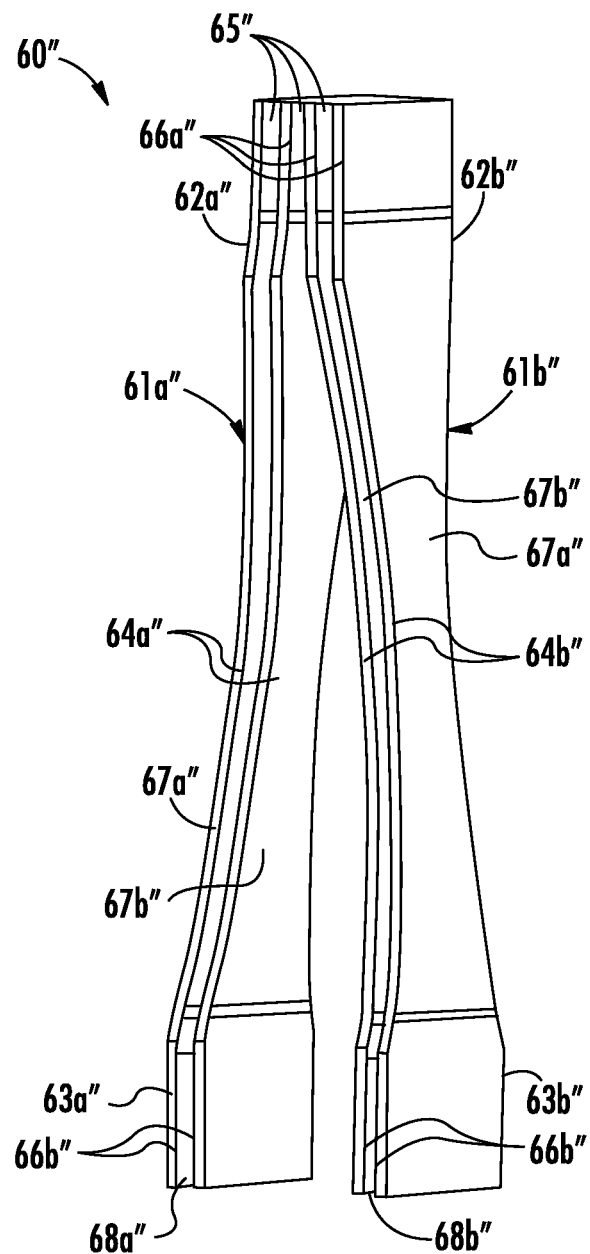
FIG. 11 is an enlarged perspective view of a portion of the flexure bearing of FIG. 10.
Figure 12:
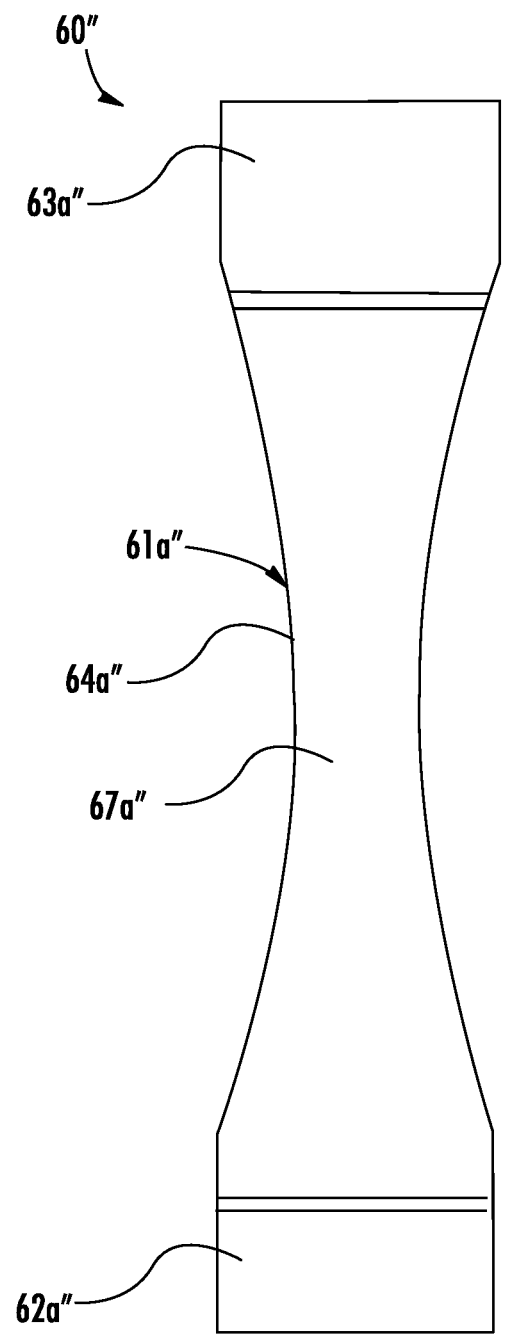
FIG. 12 is top view of the flexure bearing of FIG. 11.
Figure 13:
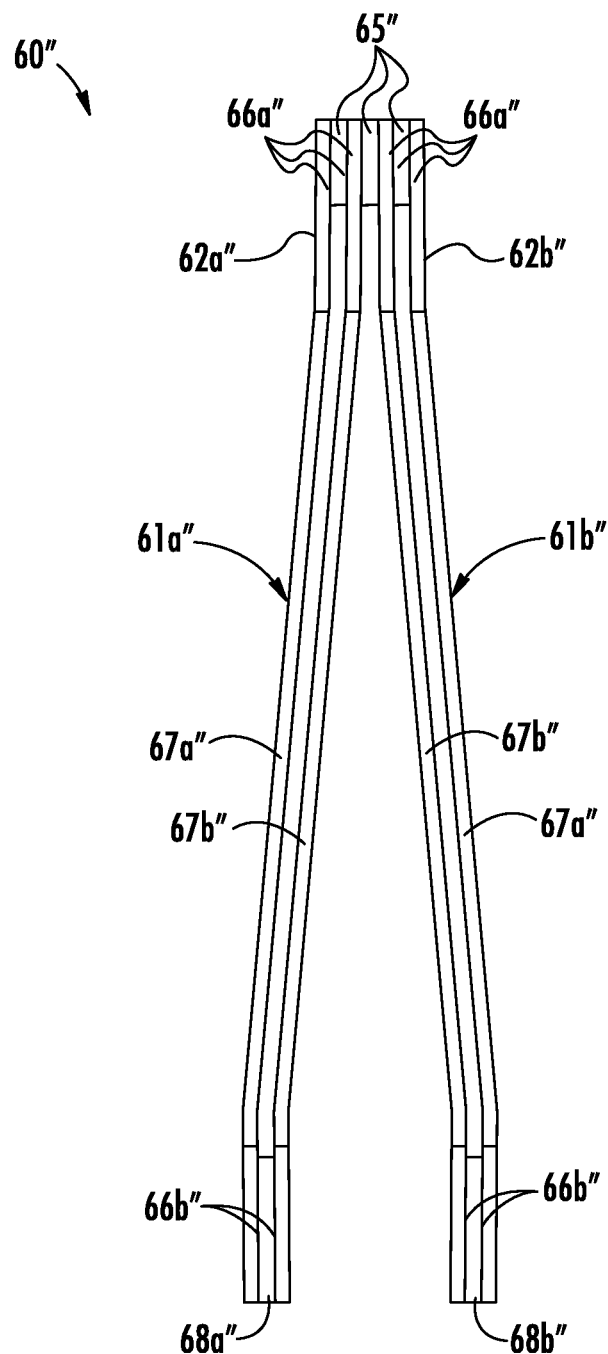
FIG. 13 is a side view of the flexure bearing of FIG. 11.
Figure 14:
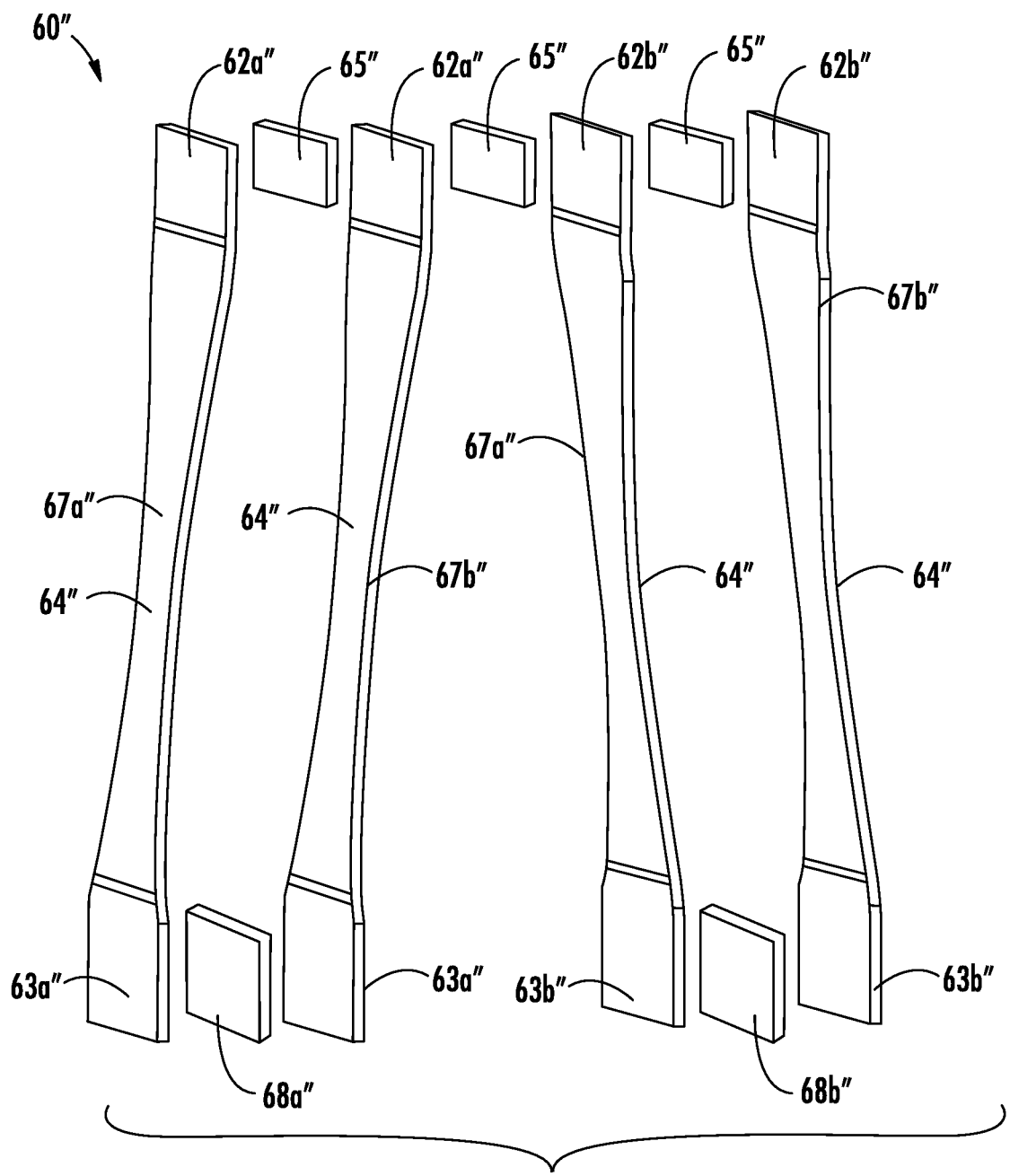
FIG. 14 is an exploded view of the flexure bearing of FIG. 11.

The permanent magnets 51a-51d may be aligned along a length of the first and second coils 44, 45. While four shaped permanent magnets 51a-51d are illustrated, it will be appreciated that there may be any number of permanent magnets having any shape between the first and second coils 44, 45. The permanent magnets 51a-51d may be arranged as a Halbach array. Referring briefly to FIG. 9, in some embodiments, the position of the coils 44', 45' and the permanent magnets 51a'-51d' may be reversed. In other words, the first and second coils 44', 45' may be carried by or part of the field member 50', while the permanent magnets 51a'-51d' are stationary or carried by the actuator housing 41' (i.e., a moving coil configuration).

The field member 50 also includes masses 57a, 57b adjacent the permanent magnets 51a-51d. The masses 57a, 57b may be tungsten, for example. The masses 57a, 57b may be a different material and there may any number of masses. In some embodiments, the position of the coils 44, 45 and the permanent magnets 51a-51d may be reversed. In other words, the first and second coils 44, 45 may be carried by or part of the field member 50, while the permanent magnets 51a-51d are stationary (i.e., a moving coil configuration).

The haptic actuator 40 also includes respective flexure bearings 60 mounting each of first and second sides 53, 54 of the field member 50 to be reciprocally movable within the actuator housing 41 responsive to the first and second coils 44, 45. Each flexure bearing 60 is illustratively in the shape of a wishbone and includes two diverging arms 61a, 61b, joined together at proximal ends 62a, 62b. The two diverging arms 61a, 61b each have spaced distal ends 63a, 63b that are operatively coupled between adjacent portions of the field member 50 and the actuator housing 41. In some embodiments, each flexure bearing 60 may not be in a wishbone shape, but may have another shape.

The two diverging arms 61a, 61b may include steel, titanium, and/or copper. The two diverging arms 61a, 61b may include other and/or additional materials.

The two diverging arms 61a, 61b each have a reduced size medial portion 64a, 64b relative to respective proximal and distal ends. More particularly, each arm 61a, 61b has a blade shape having a length between respective proximal and distal ends, a thickness, and height with a varying profile defining the reduced sized medial portion 64a, 64b.

Each flexure bearing 60 also includes a spacer member 65 between the proximal ends 62a, 62b of the two diverging arms 61a, 61b. A respective weld joint 66 joins together the spacer member 65 and the proximal ends 62a, 62b of the two diverging arms 61a, 61b.

The reduced size medial portion 64a, 64b may advantageously distribute stresses over each arm 61a, 61b thus constituting an improved use of the material. In contrast, in a flat arm, or uniform size arm, stresses are mostly distributed along edges of the arm. More particularly, each arm is patterned (e.g. stamped) with the illustrated curved pattern defining the reduced size medial portion to distribute the stress more uniformly over the length of the arms and away from the weld joints to reduce the risk of fatigue and improve the flexure travel range at low frequencies by up to 1.5 times.

Each flexure bearing illustratively includes mechanical stops 72a, 72b adjacent the proximal ends 62a, 62b. More particularly, first and second mechanical stops 72a, 72b are between the proximal ends 62a, 62b and the actuator housing 41 and the field member 50, respectively. The first and second mechanical stops 72a, 72b may be an elastomeric material, for example, having a hardness between 38-90. A third mechanical stop 73 is carried by the distal end 63a of one of the diverging arms 61a, and more particularly, is between the distal ends 63a, 63b. The third mechanical stop 73 may be a material similar to the first and second mechanical stops 72a, 72b. The third mechanical stop 73 may be carried by the other diverging arm 61b.

A respective anchor member 75 is coupled between each flexure bearing 60 and the adjacent portions of the housing 41. More particularly, the anchor member 75 is coupled between a distal end 63a of an arm 61a and the housing 41.

Referring now to FIGS. 10-14, in another embodiment, each diverging arm 61a", 61b" includes first and second parallel and spaced apart blades 67a", 67b" each, similarly to the embodiments described above, has a reduced size medial portion 64a", 64b" relative to respective proximal and distal ends 62a", 62b", 63a", 63b". More particularly, each spaced apart blade 67a", 67b" of each arm 61a", 61b" has a length between respective proximal and distal ends 62a", 62b", 63a", 63b', a thickness, and height with a varying profile defining the reduced sized medial portion 64a", 64b".

Distal end spacers 68a''', 68b''' are between the first and second parallel and spaced apart blades 67a''', 67b'''. Each flexure bearing 60''' has a wishbone shape. Each flexure bearing 60''' may not have a wishbone shape in some embodiments. Respective weld joints 66a''', 66b''' join together the proximal and distal end spacers 65''', 68a''', 68b''' and adjacent portions of the spaced apart blades 67a''', 67b'''.

Figure 15:
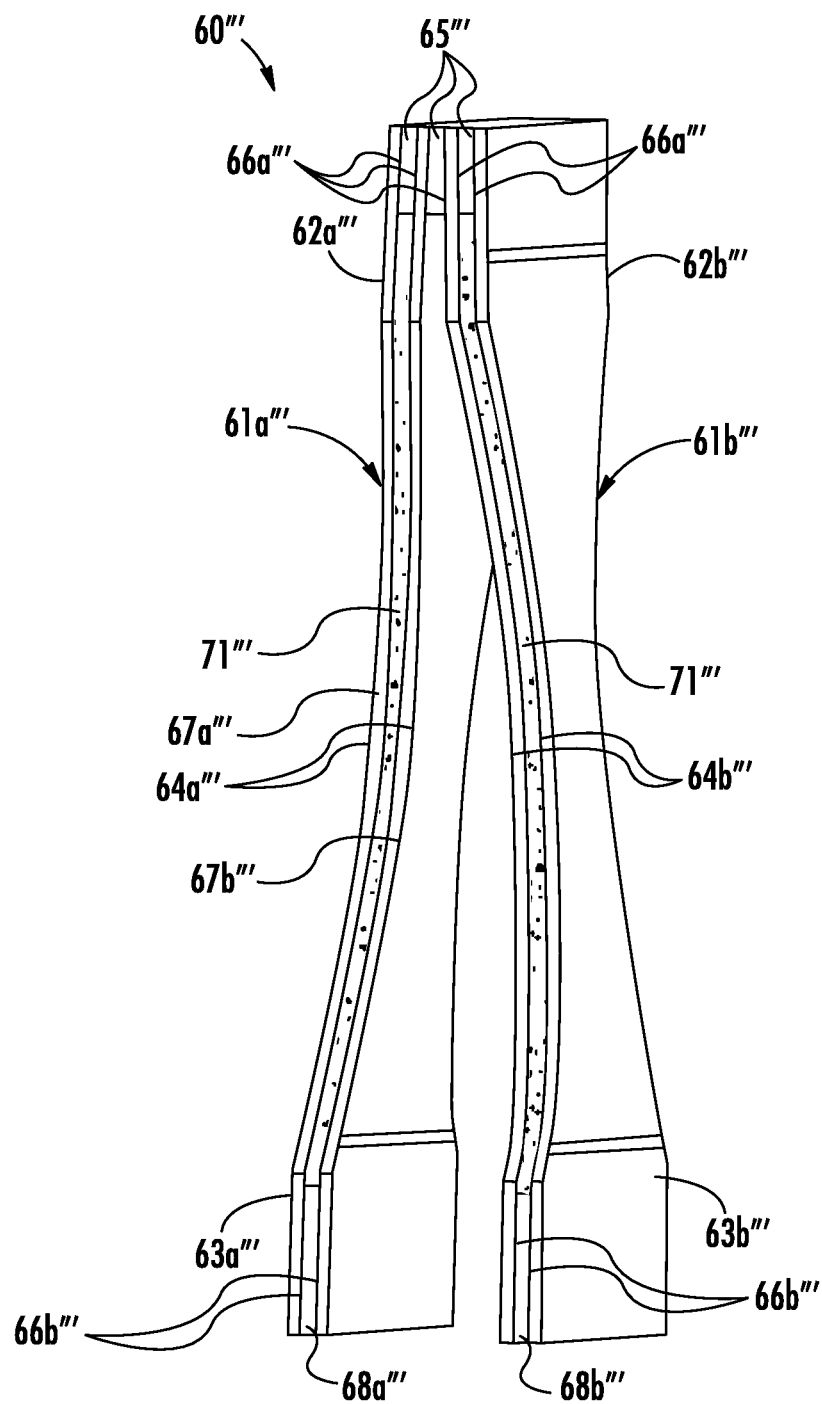
FIG. 15 is a perspective view of a portion of a flexure bearing in accordance with an embodiment.
Figure 16:
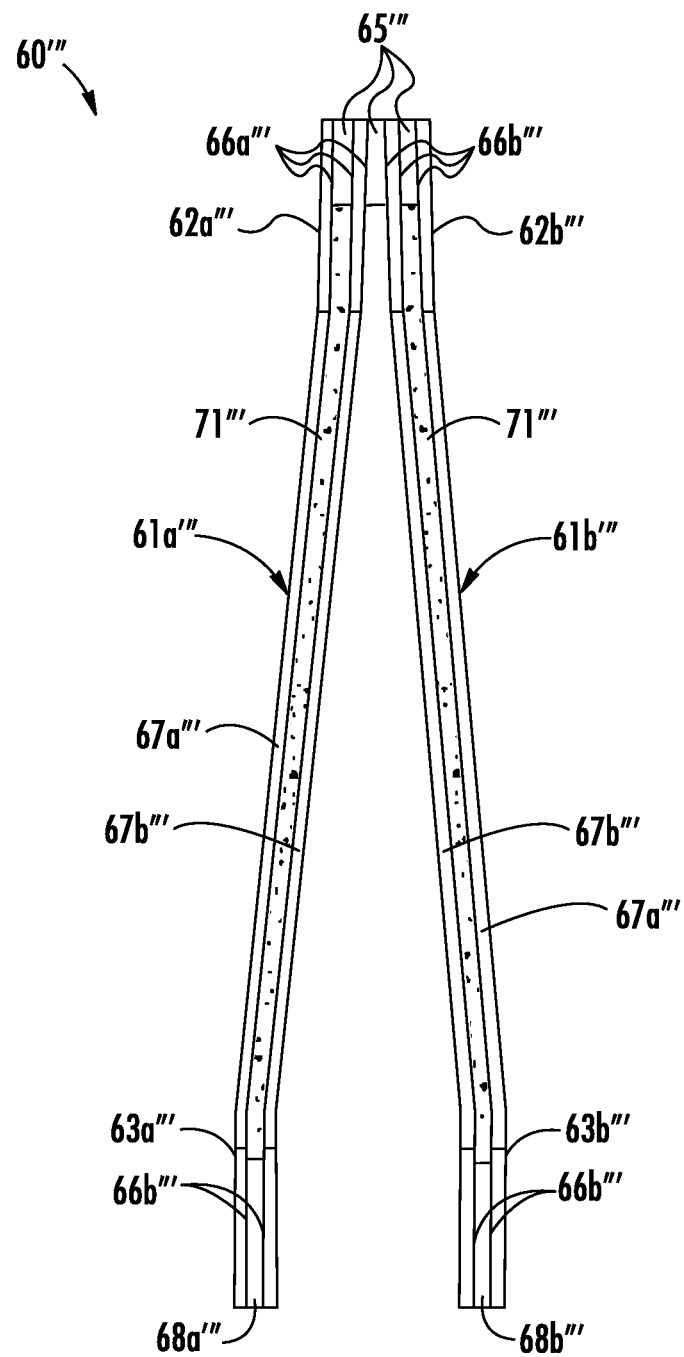
FIG. 16 is a side view of the portion of the flexure bearing of FIG. 15.

Referring briefly to FIGS. 15 and 16, in some embodiments, each diverging arm 61a''', 61b''' includes a filler body 71''' between the first and second parallel and spaced apart blades 67a''', 67b'''. The filler body 71''' may include a relatively soft material or bumper material, for example, an elastic material, silicone, and/or foam and follows the contour of the first and second blades 67a''', 67b'''. The filler body 71''' may act as a crash stop, for example, to reduce failure in an event of a crash. Of course, the filler body 71''' may be another and/or include other materials, for example, and may be the same as the first, second, and/or third mechanical stops. As will be appreciated by those skilled in the art, at a relatively low frequency, the filler body 71''' may not have a relatively large effect on the flexure bearing 60''', but upon a drop of the haptic actuator or at a relatively high frequency, the filler material provides increased protection against a failure.

Referring again to FIGS. 10-14, in some embodiments, the spaced apart blades 67a''', 67b''' may be covered, partially or completely, in a bumper material. As will be appreciated by those skilled in the art, in addition to the advantages described in the above embodiments, moving from one blade to two spaced apart blades 67a''', 67b''' torsion, for example, at the distal ends 63a''', 63b''', may be limited while maintaining relatively easy bending motion in the x-axis direction. Stresses are applied to or spread over two pairs of (i.e., four) blades instead of the two arms as in the embodiment described above. In other modes, i.e., movement in the y-axis and z-axis directions, stiffness is relatively maintained. Thus, the bandwidth of the actuator may be increased, for example, by up to two times.

Moreover, the proximal ends 62a''', 62b''' may be considered a relatively robust stop in addition to the mechanical stop 73''' between the distal ends 63a''', 63b'''. This may reduce the risk of flexure deformation during drops in the x-axis direction. Additionally, considering the significant improvement in z-axis stiffness, stronger EM engines, for example, in the form of larger magnets, a larger number of stages, and complex magnet arrays such as Halbach arrays, may be supported without giving much consideration of the magnetic anti-spring and the resulting z-axis tolerance amplification (manufacturing/yield risk). Elements in the illustrated embodiment that are not specifically described with respect to the present embodiment are similar to the elements described above and need no further discussion.

A method aspect is directed to a method of making a haptic actuator 40. The method includes positioning a respective flexure bearing 60 to mount each of first and second sides 53, 54 of a field member 50 to be reciprocally movable within a housing 41 responsive to at least one coil 44, 45, each flexure bearing including two diverging arms 61a, 61b joined together at proximal ends 62a, 62b and having spaced distal ends 63a, 63b operatively coupled between adjacent portions of the field member and the housing. The two diverging arms each have a reduced size medial portion 64a, 64b relative to respective proximal and distal ends 62a, 62b, 63a, 63b.

A haptic actuator comprises a housing, at least one permanent magnet carried by the housing, and a field member having opposing first and second sides and comprising at least one coil cooperating with the at least one permanent magnet. The haptic actuator also includes a respective at least one flexure bearing mounting each of the first and second sides of the field member to be reciprocally movable within the housing responsive to the at least one coil. Each flexure bearing comprises two diverging arms joined together at proximal ends and having spaced distal ends operatively coupled between adjacent portions of the field member and the housing, and the two diverging arms each having a reduced size medial portion relative to respective proximal and distal ends.

Each arm has a blade shape having a length between respective proximal and distal ends, a thickness, and height with a varying profile defining the reduced sized medial portion.

Each flexure bearing further comprises a spacer member between the proximal ends of the two diverging arms.

The haptic actuator further comprises a weld joint joining together the spacer member and the proximal ends of the two diverging arms.

Each diverging arm comprises first and second parallel and spaced apart blades.

Each diverging arm comprises proximal and distal end spacers between the first and second parallel and spaced apart blades.

The haptic actuator further comprises respective weld joints joining together the proximal and distal end spacers and adjacent portions of the spaced apart blades.

Each diverging arm further comprises a filler body between the first and second parallel and spaced apart blades.

Each flexure bearing has a wishbone shape.

Each flexure bearing comprises at least one mechanical stop adjacent the proximal ends.

Each flexure bearing comprises at least one mechanical stop between the spaced distal ends.

An electronic device comprises a housing, wireless communications circuitry carried by the housing, and a haptic actuator carried by the housing. The haptic actuator comprises an actuator housing, at least one permanent magnet carried by the actuator housing, and a field member having opposing first and second sides and comprising at least one coil cooperating with the at least one permanent magnet. The haptic actuator comprises a respective at least one flexure bearing mounting each of the first and second sides of the field member to be reciprocally movable within the housing responsive to the at least one coil. Each flexure bearing comprises two diverging arms joined together at proximal ends and having spaced distal ends operatively coupled between adjacent portions of the field member and the housing, the two diverging arms each having a reduced size medial portion relative to respective proximal and distal ends. The electronic device comprises a controller coupled to the wireless communications circuitry and the haptic actuator and configured to perform at least one wireless communications function and selectively operate the haptic actuator.

Each arm has a blade shape having a length between respective proximal and distal ends, a thickness, and height with a varying profile defining the reduced sized medial portion.

Each flexure bearing further comprises a spacer member between the proximal ends of the two diverging arms.

The haptic actuator further comprises a weld joint joining together the spacer member and the proximal ends of the two diverging arms.

Each diverging arm comprises first and second parallel and spaced apart blades.

Each diverging arm comprises proximal and distal end spacers between the first and second parallel and spaced apart blades.

Each diverging arm further comprises a filler body between the first and second parallel and spaced apart blades.

A method of making a haptic actuator comprises positioning a respective at least one flexure bearing to mount each of first and second sides of a field member to be reciprocally movable within a housing responsive to at least one coil, the housing carrying at least one permanent magnet cooperating with the at least one coil, and each flexure bearing comprising two diverging arms joined together at proximal ends and having spaced distal ends operatively coupled between adjacent portions of the field member and the housing, the two diverging arms each having a reduced size medial portion relative to respective proximal and distal ends.

Each arm has a blade shape having a length between respective proximal and distal ends, a thickness, and height with a varying profile defining the reduced sized medial portion.

Each flexure bearing further comprises a spacer member between the proximal ends of the two diverging arms.

Each diverging arm comprises first and second parallel and spaced apart blades.

Each diverging arm comprises proximal and distal end spacers between the first and second parallel and spaced apart blades.

Each diverging arm further comprises a filler body between the first and second parallel and spaced apart blades.

Figure 17:
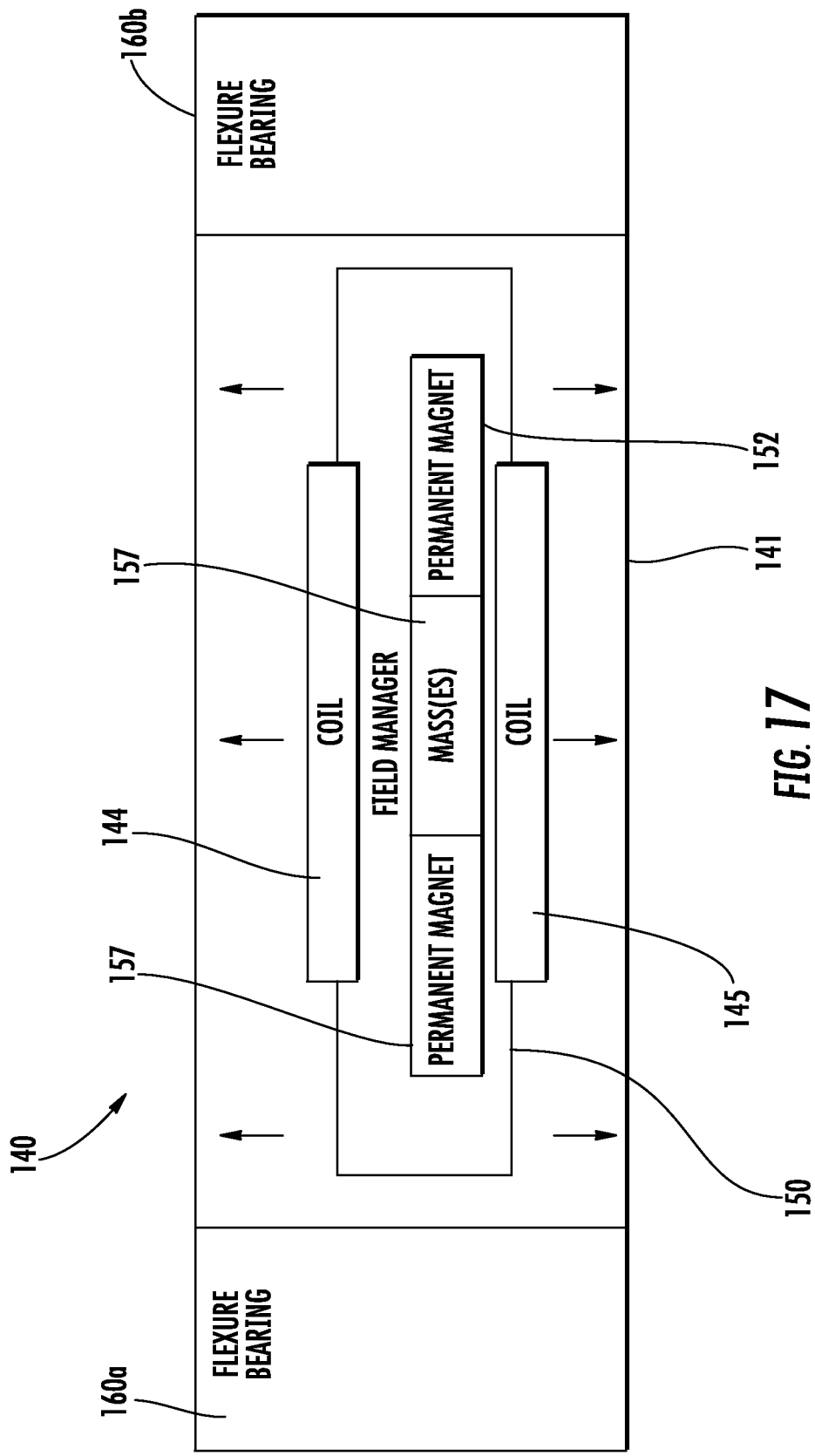
FIG. 17 is a schematic block diagram of a portion of the haptic actuator according to another embodiment.
Figure 18:
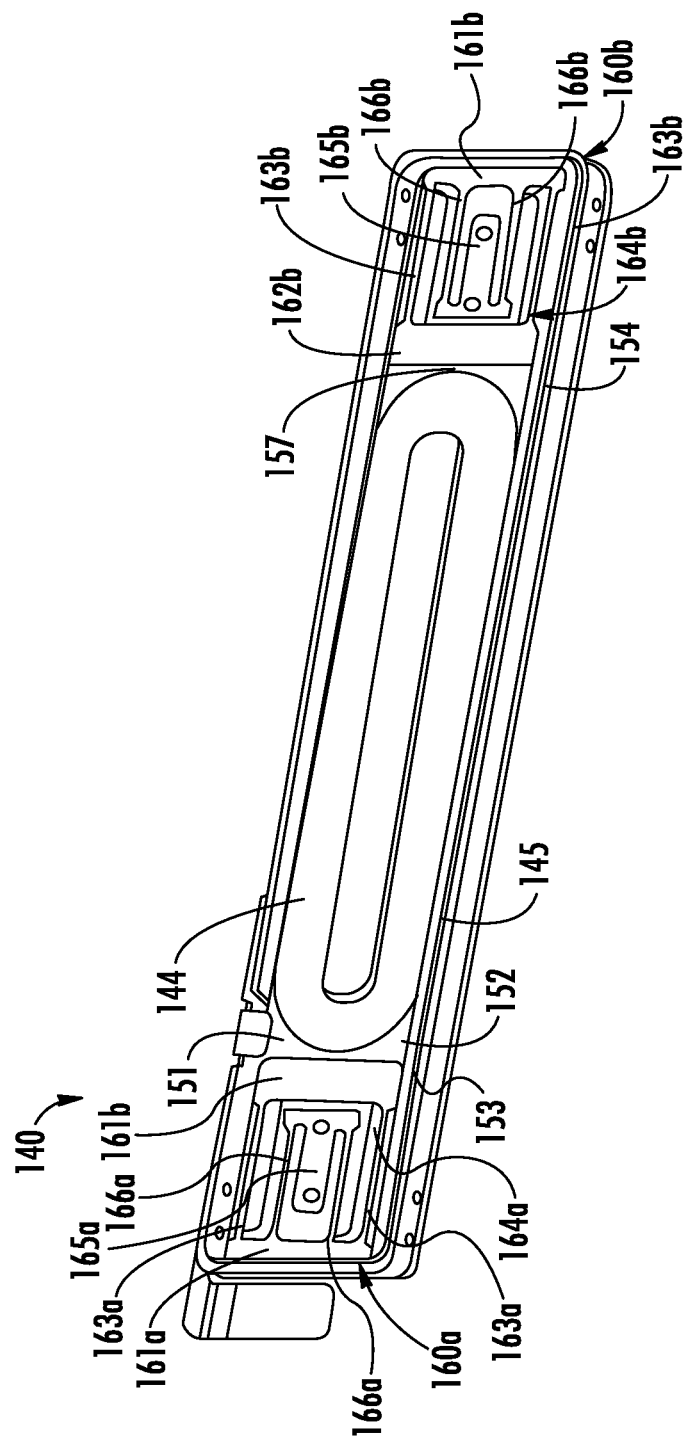
FIG. 18 is a perspective view of a portion of the haptic actuator of FIG. 17.
Figure 19:
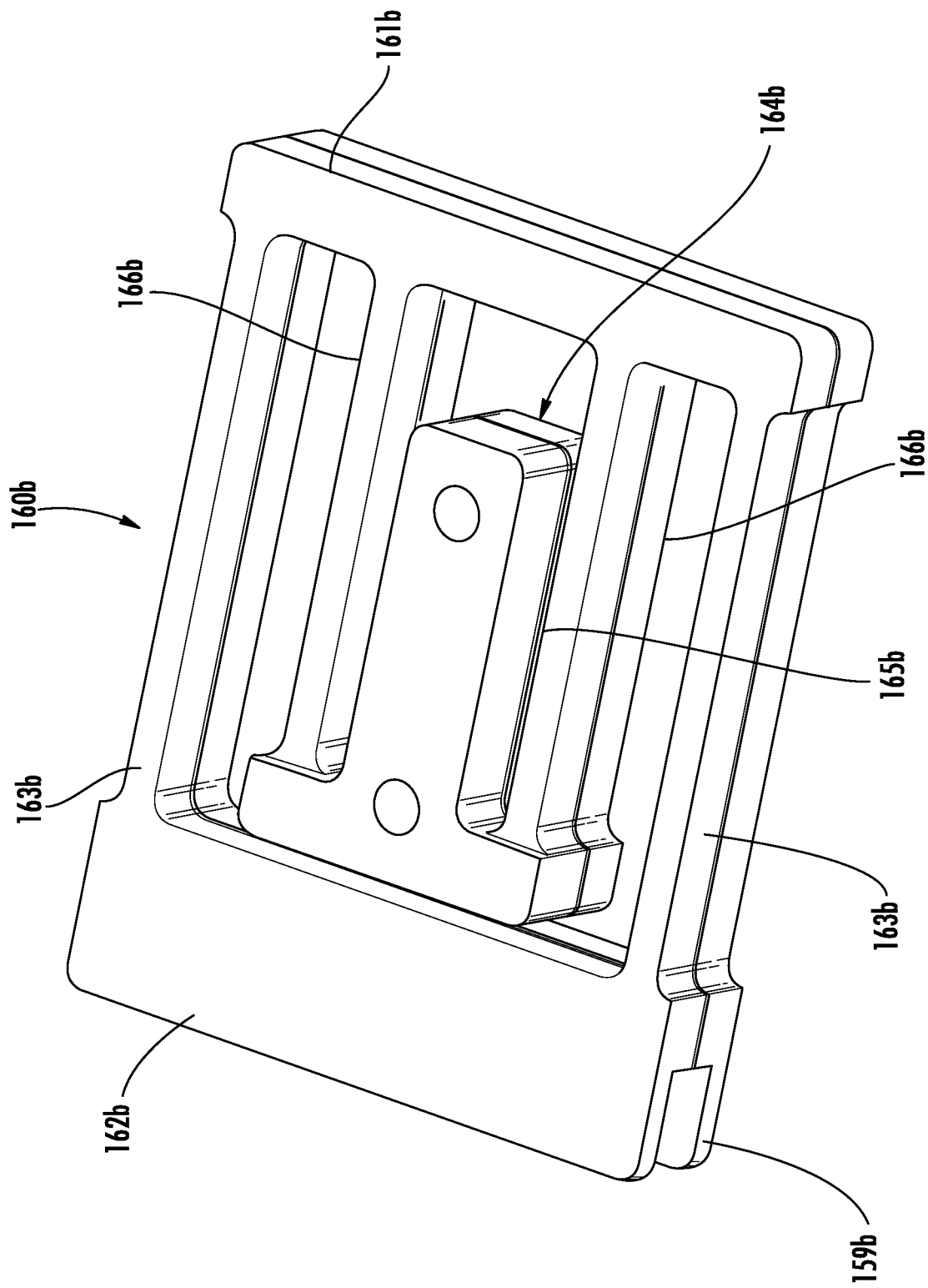
FIG. 19 is an enlarged perspective view of the anchor member of the haptic actuator of FIG. 18.

Referring now to FIGS. 17-19, in another embodiment, the haptic actuator 140 includes an actuator housing 141. The actuator housing 141 illustratively has a dimension in a length direction greater than a width direction. The actuator housing 141 may be ferritic. More particularly, the top and bottom of the actuator housing 141 may be ferritic. Of course other and/or additional portions of the actuator housing 141 may be ferritic.

The haptic actuator 140 also includes first and second coils 144, 145 carried by the actuator housing 141, for example, the top and the bottom, respectively. The first and second coils 144, 145 each illustratively have a loop shape or "racetrack" shape and are aligned in a stacked relation and spaced apart.

The haptic actuator 140 also includes a field member 150 carried by the actuator housing 141. The field member 150, similarly to the actuator housing 141, has a dimension in a length direction greater than a width direction. Thus, the field member 150 is reciprocally movable in the width direction (i.e., the y-direction). While the movement of the field member 150 is described as being movable in one direction, i.e., a linear haptic actuator, it should be understood that in some embodiments, the field member may be movable in other directions, i.e., an angular haptic actuator, or may be a combination of both a linear and an angular haptic actuator.

The field member 150 illustratively includes permanent magnets 151, 152 between the first and second coils 144, 145. The permanent magnets 151, 152 may be neodymium, for example, and may be positioned in opposing directions with respect to their respective poles.

The permanent magnets 151, 152 also have a rectangular shape and are aligned along a length of the first and second coils 144, 145. While a pair of rectangular shaped permanent magnets is illustrated, it will be appreciated that there may be any number of permanent magnets having any shape between the first and second coils 145, 145.

The field member 150 also includes a mass 157 between the permanent magnets 151, 152. The mass 157 may be tungsten, for example. The mass 157 may be a different material and there may be more than one mass.

The haptic actuator 140 also includes respective flexure bearings 160a, 160b mounting each of first and second sides 153, 154 of the field member 150 to be reciprocally movable within the actuator housing 141 responsive to the first and second coils 144, 145. Each flexure bearing 160a, 160b includes a first end member 161a, 161b, and a second end member 162a, 162b. The second end member 161a, 161b is coupled to an adjacent side 153, 154 of the field member 150. The second end member 162a, 162b has a slot 159b therein (FIG. 19) receiving the adjacent side 153, 154 of the field member 150 therein.

Each flexure bearing 160a, 160b also includes a pair of parallel spaced apart flexible arms 163a, 163b coupled between the first and second end members 161a, 161b, 162a, 162b. Each flexure bearing 160a, 160b may have more than one pair of parallel spaced apart flexible arms 163a, 163b.

Figure 20:
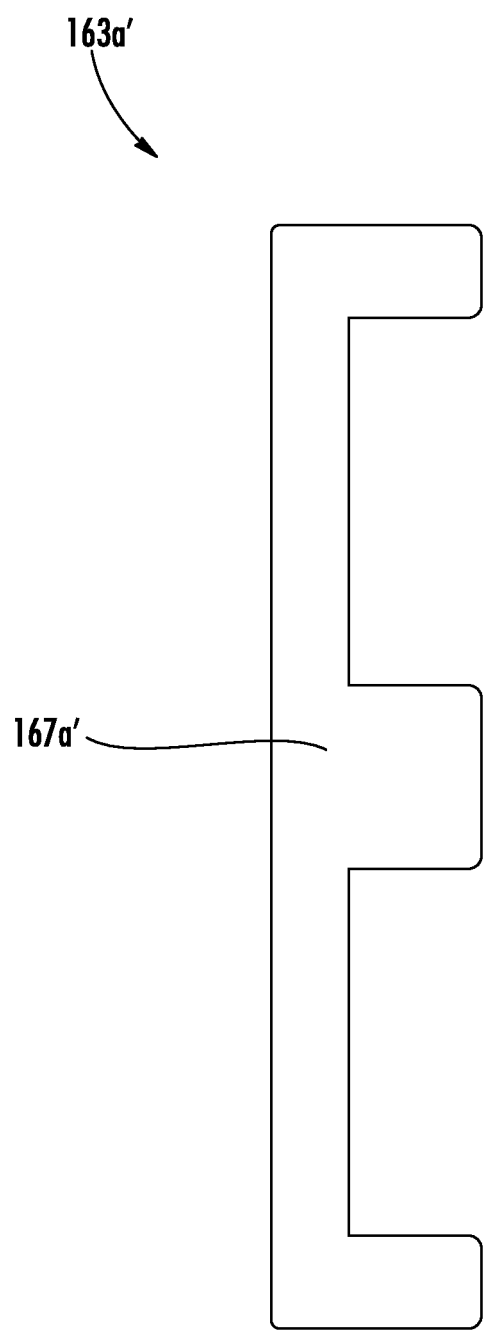
FIG. 20 is a top view of a parallel spaced apart flexible arm in accordance with an embodiment.
Figure 21:
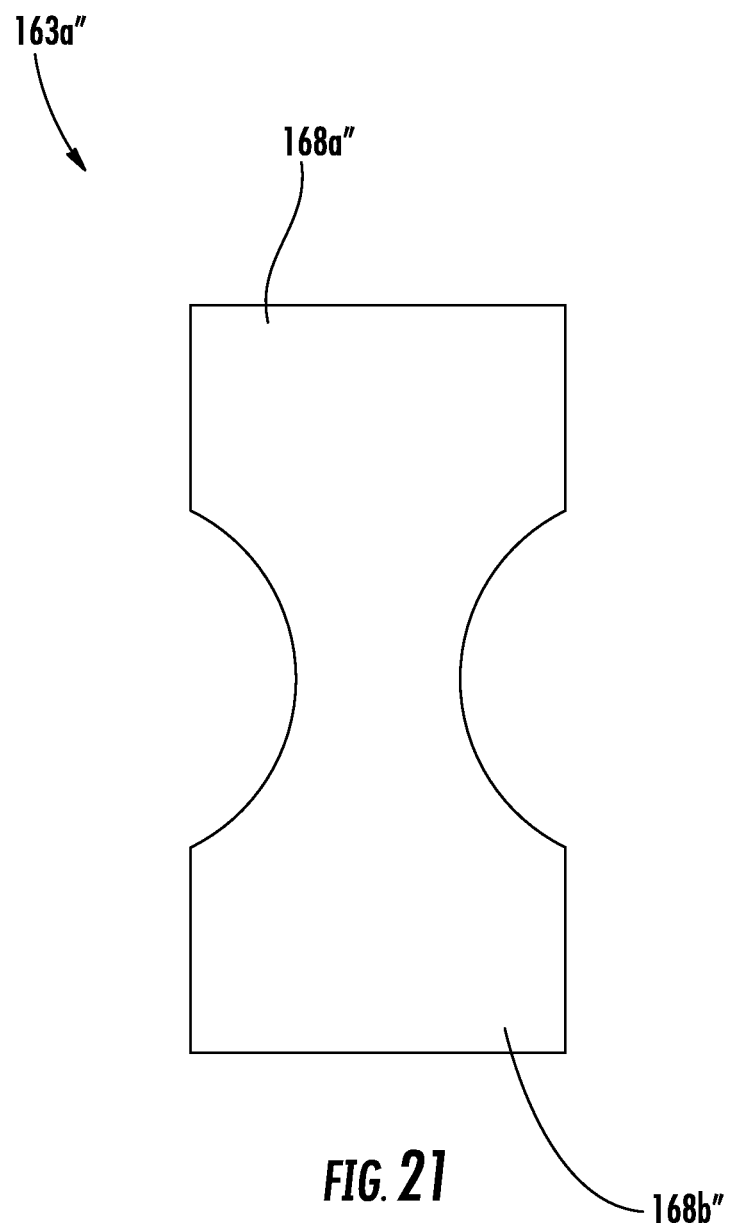
FIG. 21 is a side view of a parallel spaced apart flexible arm in accordance with an embodiment.
Figure 22:
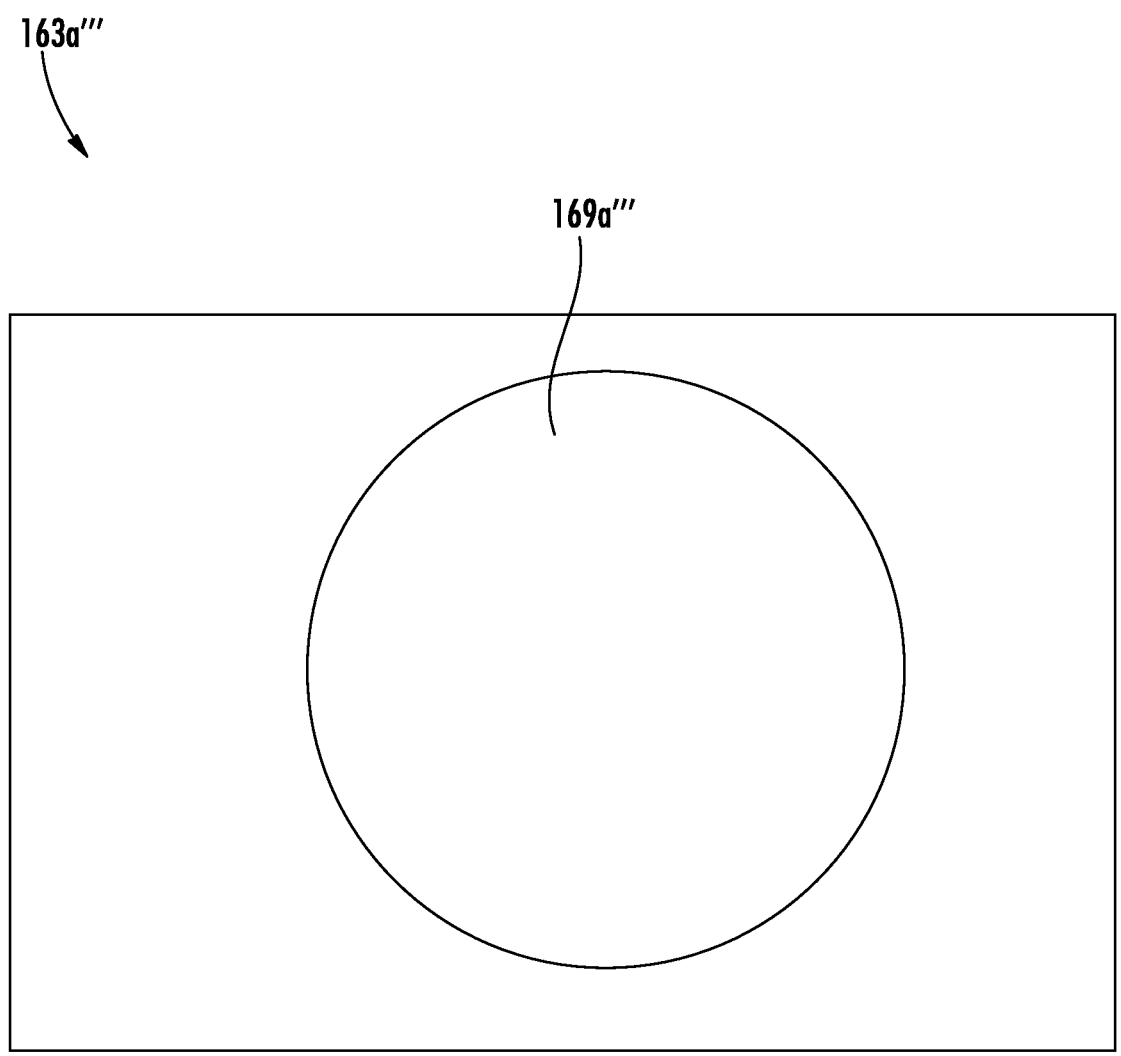
FIG. 22 is a side view of a portion of a parallel spaced apart flexible arm in accordance with an embodiment.

The pair of parallel spaced apart flexible arms 163a, 163b illustratively has a non-uniform thickness. Referring briefly to FIGS. 20, 21, and 22, in some embodiments, the pair of parallel spaced apart flexible arms 163a' may include an enlarged width medial portion 167a' (FIG. 20), enlarged width end portion's 168a'', 168b'' (FIG. 21), and/or one or more openings 169a''' therein (FIG. 22). By having a non-uniform thickness or having an opening therethrough, stress areas, which may be referred to as "stress hot spots," may be reduced by reducing the amount of material, thereby also increasing displacement.

Additionally, it may be desirable for the pair of parallel spaced apart flexible arms 163a, 1613b to have a thickness that is a few times smaller than the height thereof. This may maintain a reasonable stiffness in directions other than along the motion axis, for example, as will be appreciated by those skilled in the art. More particularly, the pair of parallel spaced apart flexible arms 163a, 163b may have a thickness that is greater than or equal to half of the distance of the travel thereof (i.e., displacement) to reduce nonlinear stiffening. Reasonable nonlinear stiffening may be particularly advantageous for widening the spectrum, as will be appreciated by those skilled in the art.

Each flexure bearing 160a, 160b also includes an anchor member 164a, 164b coupled to the first end member 161a, 161b and coupled to the actuator housing 141. The anchor member 164a, 164b is also spaced from the second end member 162a, 162b. The anchor member 164a, 164b includes a T-shaped anchor body 165a, 165b and a pair of parallel spaced apart flexure arms 166a, 166b extending between the anchor body and the first end member 161a, 161b. In some embodiments, the anchor body 165a, 165b may have another shape.

The flexure bearings 160a, 160b mount each of the first and second sides 153, 154 of the field member 150 to be reciprocally movable within the actuator housing 141 responsive to the coils 144, 145. More particularly, the flexure bearings 160a, 160b move or flex in the direction of the field member 150 and return it to the equilibrium position. Overall flexure or movement of each flexure bearing 160a, 160b is about 1/10 of the length of the flexure bearing.

The haptic actuator 140 advantageously does not include, relative to other types of haptic actuators, shafts and/or bearings to constrain the motion of the mass 157 in a desired direction. Typically, to constrain angular motions, a second shaft or relatively complex stabilization techniques, such as stabilization magnets would be used. However, stabilization magnets may make the haptic actuator more complex, more unreliable, and increasingly expensive. By using the flexure bearings 160a, 160b, movement is generally constrained in every direction except the desired direction, and several relatively expensive parts may be omitted, such as shafts, precise bearings (round/slot), and springs, resulting in a more simple haptic actuator 140.

A method aspect is directed to a method of making a haptic actuator 140. The method may include positioning at least one coil 144, 145 to be carried by an actuator housing 141 and positioning a field member 50 having opposing first and second sides 153, 154 within the actuator housing 141. The method also includes positioning a respective flexure bearing 160a, 160b to mount each of the first and second sides 153, 154 of the field member 150 to be reciprocally movable within the housing responsive to the at least one coil 144, 145. Each flexure bearing 160a, 1610b includes a first end member 161a, 161b, a second end member 162a, 162b coupled to an adjacent side of the field member, a pair of parallel spaced apart flexible arms 163a, 163b coupled between the first and second end members, and an anchor member 164a, 164b coupled to the first end member and coupled to the actuator housing.

Figure 23:
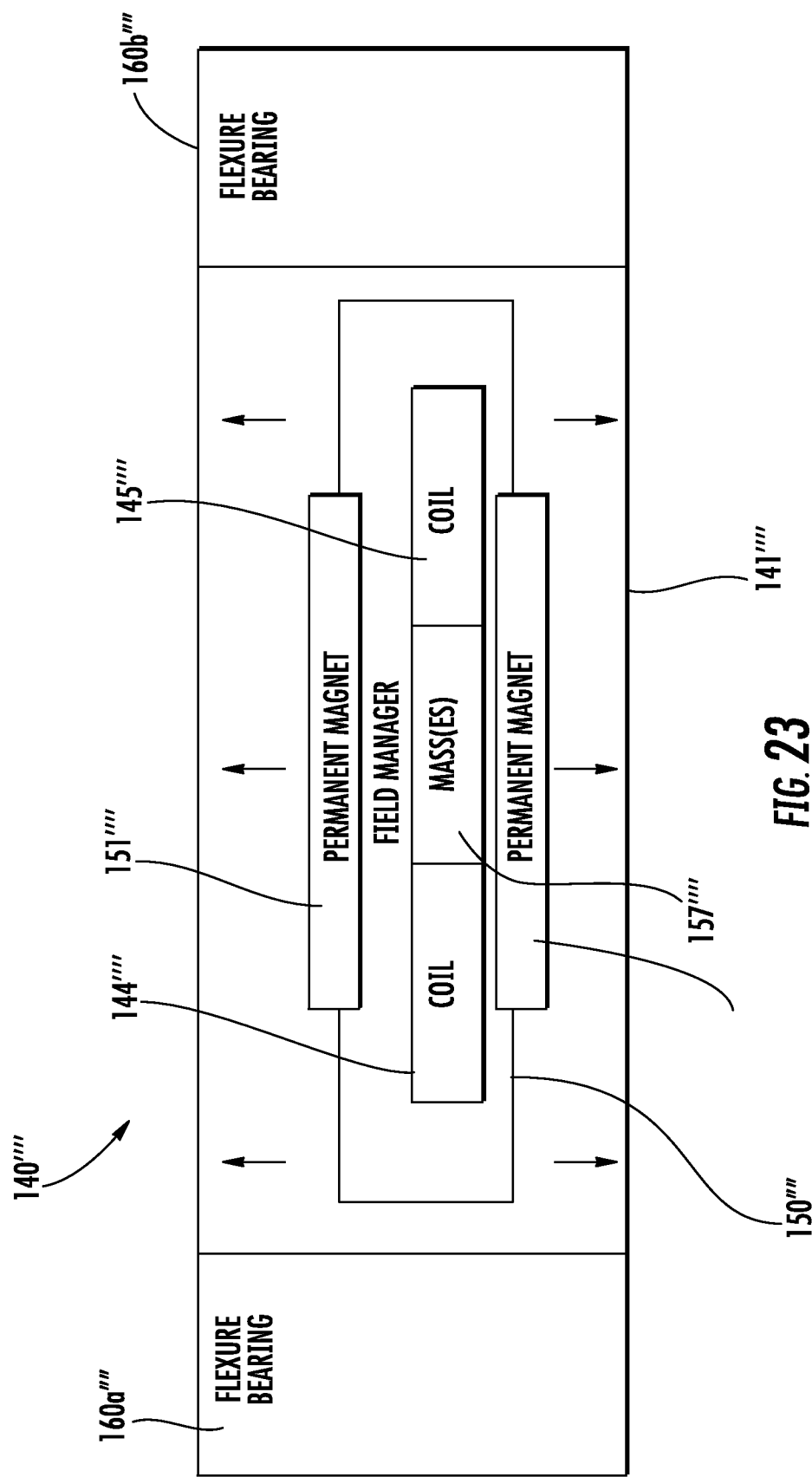
FIG. 23 is a schematic block diagram of a haptic actuator according to another embodiment.

Referring now to FIG. 23 in another embodiment, the haptic actuator 140'''' may include permanent magnets 151'''', 152'''' carried by the housing 141'''', and the field member 150'''' may include one or more coils 144'''', 145'''' that cooperate with the permanent magnets. In other words, in contrast to the embodiment described above, the permanent magnets 151'''', 152'''' are stationary (i.e., carried by the actuator housing 141'''') and the coils 144'''', 145'''', as part of the field member 150'''', are moving (i.e., connected to the mass). Of course, there may be any number of coils 144'''', 145'''' and/or permanent magnets 151'''', 152''''.

Figure 24:
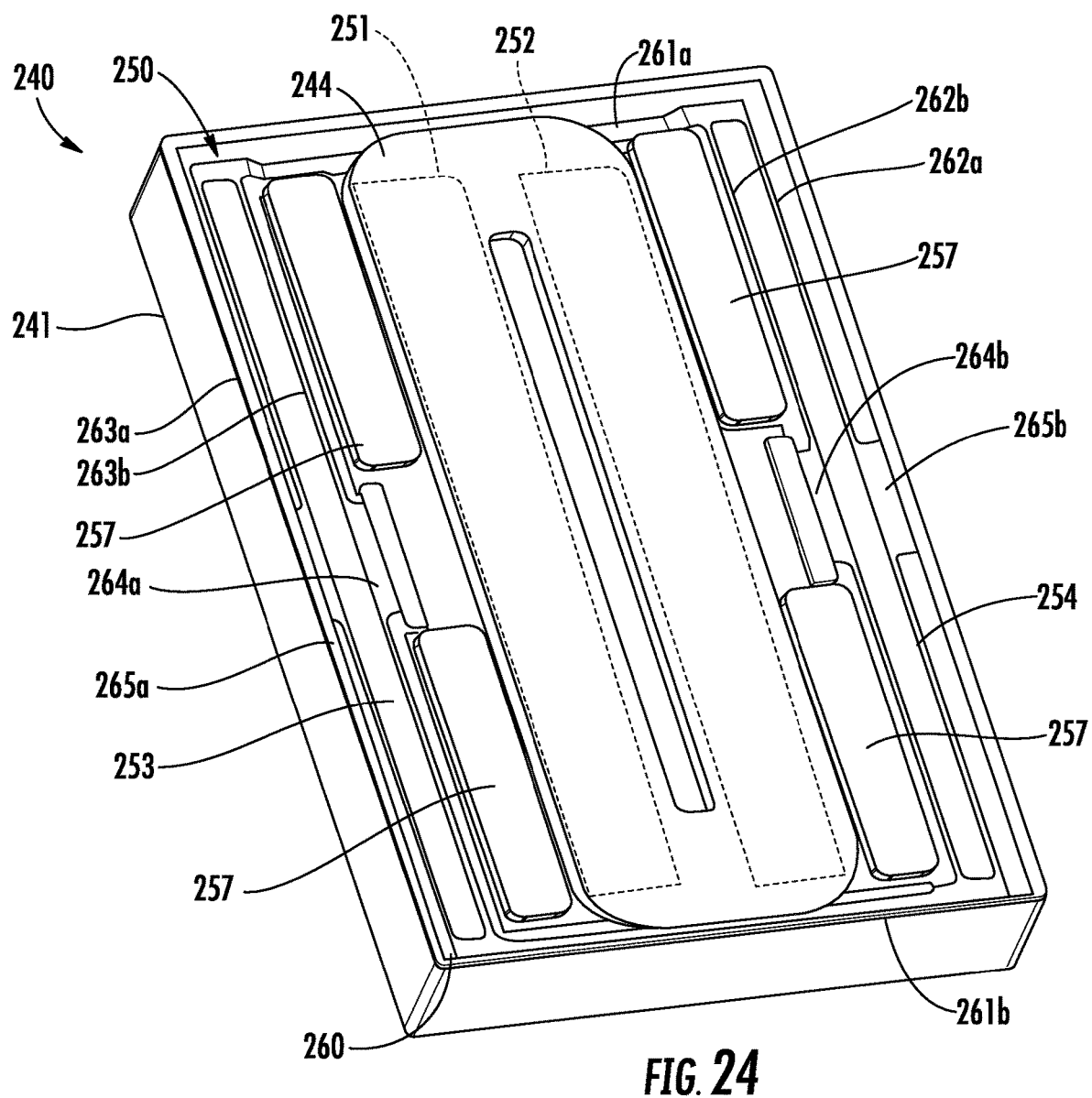
FIG. 24 is an enlarged perspective view of a portion of a haptic actuator according to another embodiment.

Referring now to FIG. 24, another embodiment of a haptic actuator 240 is illustrated. Similar to the haptic actuator 140 described above, the haptic actuator 240 includes an actuator housing 241 having a dimension in a length direction greater than a width direction and a coil 244 carried by the actuator housing. The coil 244 illustratively has a loop shape. A second coil, not shown, may be carried by the actuator housing 241 in spaced relation from the coil 244. Of course, there may be any number of coils 244, and the coil may have a different shape.

The haptic actuator 240 also includes a field member 250 having opposing first and second sides 253, 254. The field member 250, similarly to the actuator housing 241, has a dimension in a length direction greater than a width direction. Thus, the field member 250 is reciprocally movable in the width direction (i.e., the y-direction). While the movement of the field member 250 is described as being movable in one direction, i.e., a linear haptic actuator, it should be understood that in some embodiments, the field member may be movable in other directions, i.e., an angular haptic actuator, or may be a combination of both a linear and an angular haptic actuator.

The field member 250 includes permanent magnets 251, 252 under the coil 244, or between the first and second coils. The permanent magnets 151, 152 may be neodymium, for example, and may be positioned in opposing directions with respect to their respective poles.

The permanent magnets 251, 252 also have a rectangular shape and are aligned along a length of the coil 244. While a pair of rectangular shaped permanent magnets is illustrated, it will be appreciated that there may be any number of permanent magnets having any shape.

The field member 250 also includes a mass 257 adjacent the permanent magnets 251, 252. The mass 257 may be tungsten, for example. The mass 257 may be a different material and there may be more than one mass.

The haptic actuator 240 also includes a flexure bearing 260 mounting each of the first and second sides 253, 254 of the field member 250 to be reciprocally movable within the actuator housing 241 responsive to the coil 244. The flexure bearing 260 includes first and second opposing end members 261a, 261b, and two pairs of parallel spaced apart flexible arms 262a-262b, 263a-263b coupled between the first and second end members and spaced apart on opposing sides of the field member 250. In other embodiments, there may be more than two pairs of parallel spaced apart flexible arms 262a-262b, 263a-263b, or only one pair.

The haptic actuator 240 also includes first and second anchor members 264a-264b, 265a-265b each having a rectangular shape and respectively coupling one of each of the two pairs of parallel spaced apart flexible arms 262a-262b, 263a-263b. The first anchor members 264a, 264b are illustratively coupled between inner ones of the two pairs of the parallel spaced apart flexible arms and the adjacent portions of the field member 250. In particular, the first anchor members 264a, 264b are coupled to a medial portion of the field member 250 and a medial portion of the inner ones 262b, 263b of the pairs of parallel spaced apart flexible arms. In some embodiments, for example, where there is a single pair of parallel spaced apart flexible arms, there may be a single first anchor. In other embodiments, there may be more than two first anchors 264a, 264b.

The second anchor members 265a, 265b respectively couple the outer ones 262a-262b of each pair of parallel spaced apart flexible arms to adjacent portions of the actuator housing 241. In particular, the second anchor members 265a, 265b are coupled to a medial portion of the actuator housing 141 and a medial portion of the outer ones 263a, 262a of the pairs of the parallel spaced apart flexible arms respectively. In some embodiments, for example, where there is a single pair of parallel spaced apart flexible arms 262a-262b, 263a-263b, there may be a single second anchor member. In other embodiments, there may be more than two second anchor members 265a, 265b. Moreover, while the first and second anchor members 264a-264b, 265a-265b have been described as being rectangular, in some embodiments the first and second anchor members may be a different shape.

Figure 25:
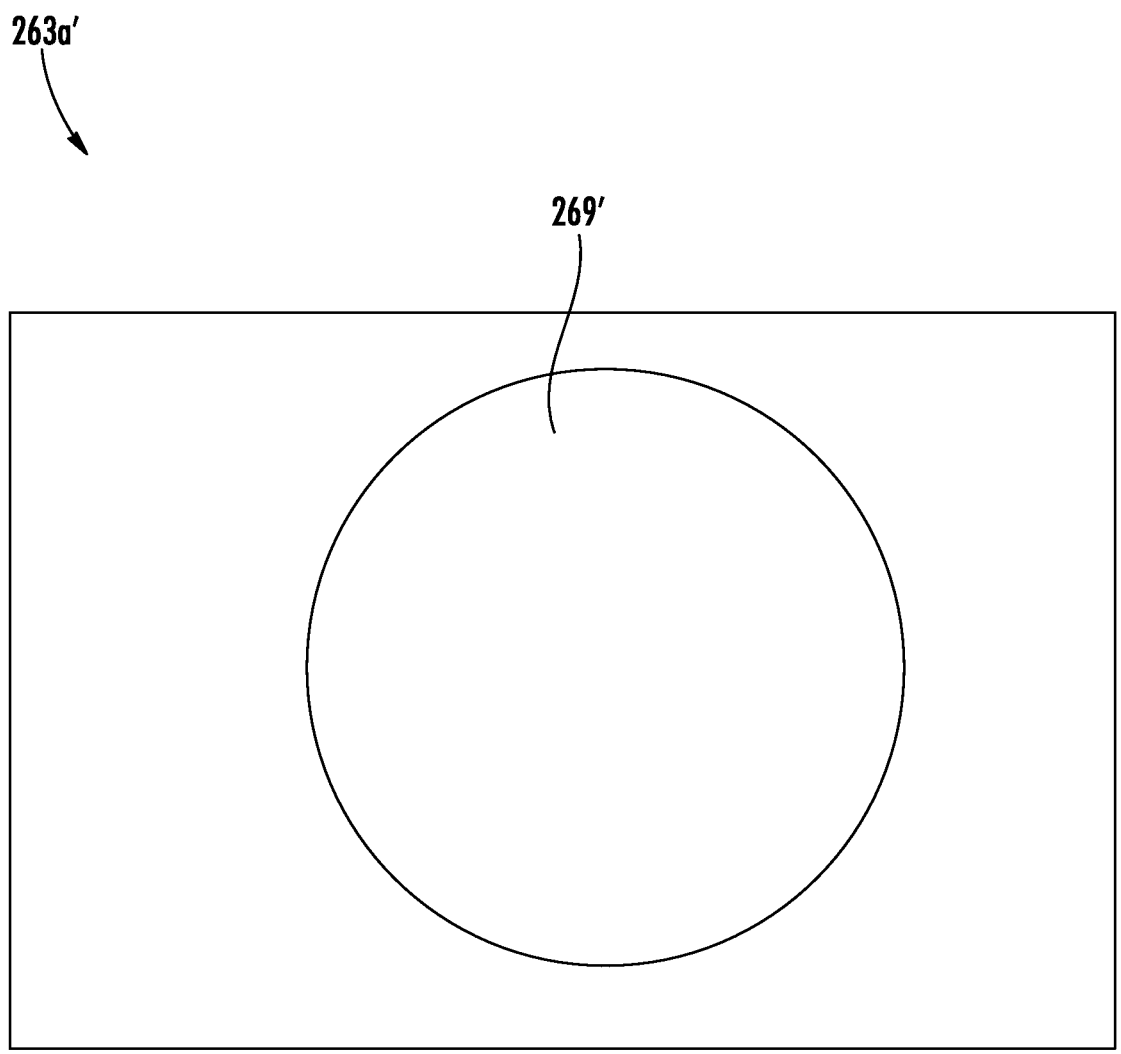
FIG. 25 is a side view of a portion of a parallel spaced apart flexible arm in accordance with an embodiment.

Each of the pairs of parallel spaced apart flexible arms 262a-262b, 263a-263b illustratively has a non-uniform height. Referring briefly to FIG. 25, in some embodiments, each of the pairs of parallel spaced apart flexible arms 263a' may include one or more openings therein 269'. By having a non-uniform height or having an opening therethrough, stress areas, which may be referred to as "stress hot spots," may be reduced by reducing the amount of material, thereby also increasing displacement.

A method aspect is directed to a method of making an actuator 240. The method includes positioning at least one coil 244 to be carried by the actuator housing 241. The method also includes positioning a field member 250 having opposing first and second sides 253, 254 within the housing and positioning the flexure bearing 260 to mount each of the first and second sides of the field member to be reciprocally movable within the housing responsive to the at least one coil 244.

Figure 26:
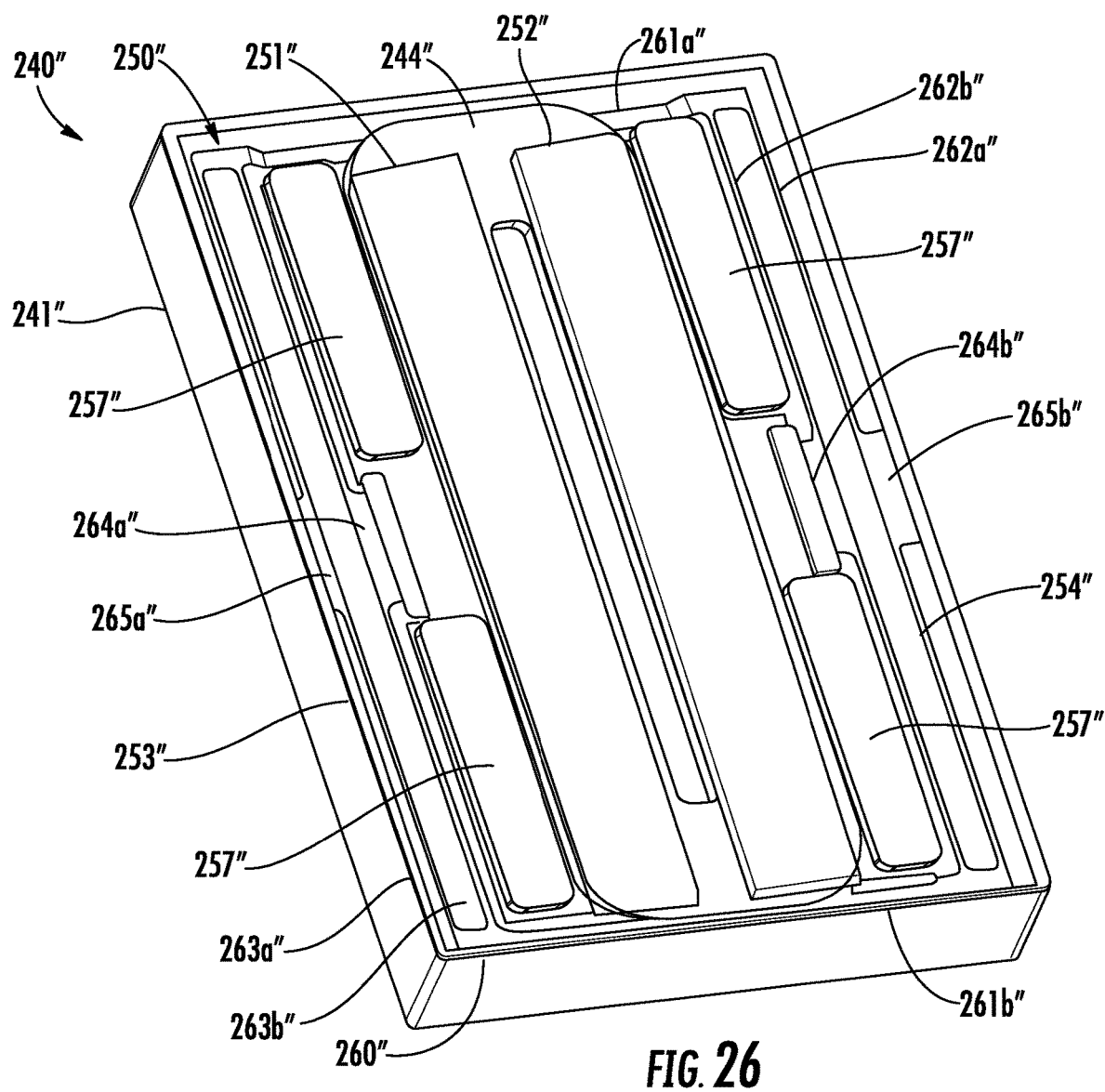
FIG. 26 is an enlarged perspective view of a haptic actuator in accordance with an embodiment.

Referring now to FIG. 26, in another embodiment, the haptic actuator 240" may include permanent magnets 251", 252" carried by the housing 241", and the field member 250" may include one or more coils 244" that cooperate with the permanent magnets. In other words, in contrast to the embodiment described above, the permanent magnets 251", 252" are stationary (i.e., carried by the actuator housing 241") and the coil 244", as part of the field member 250" is moving (i.e., connected to the masses 257"). Of course, there may be any number of coils and/or permanent magnets. For example, another set of permanent magnets may be carried on opposing sides of the coil 244" than the first and second magnets 251", 252"

Figure 27:
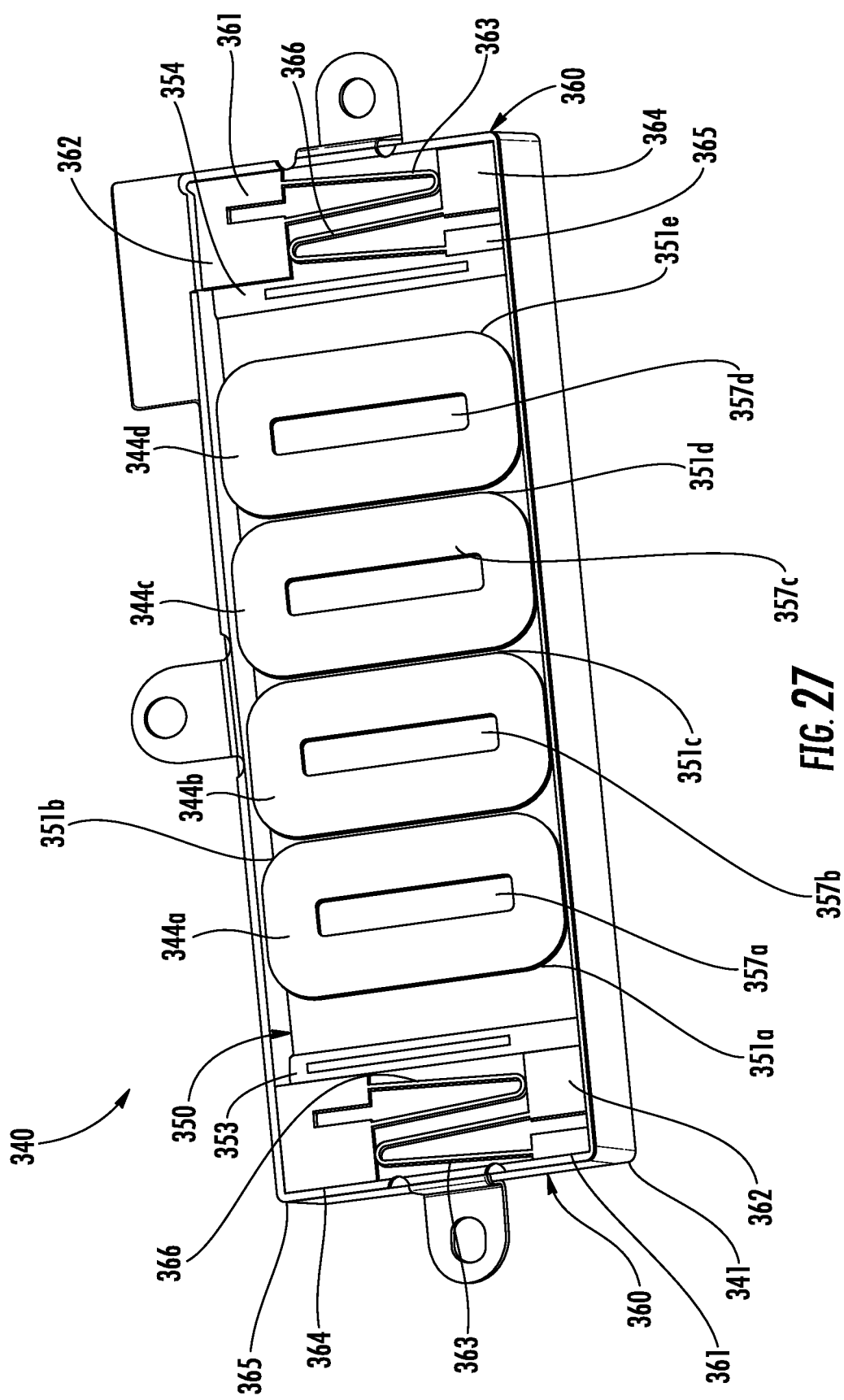
FIG. 27 is a perspective view of a portion of a haptic actuator according to an embodiment.
Figure 28:
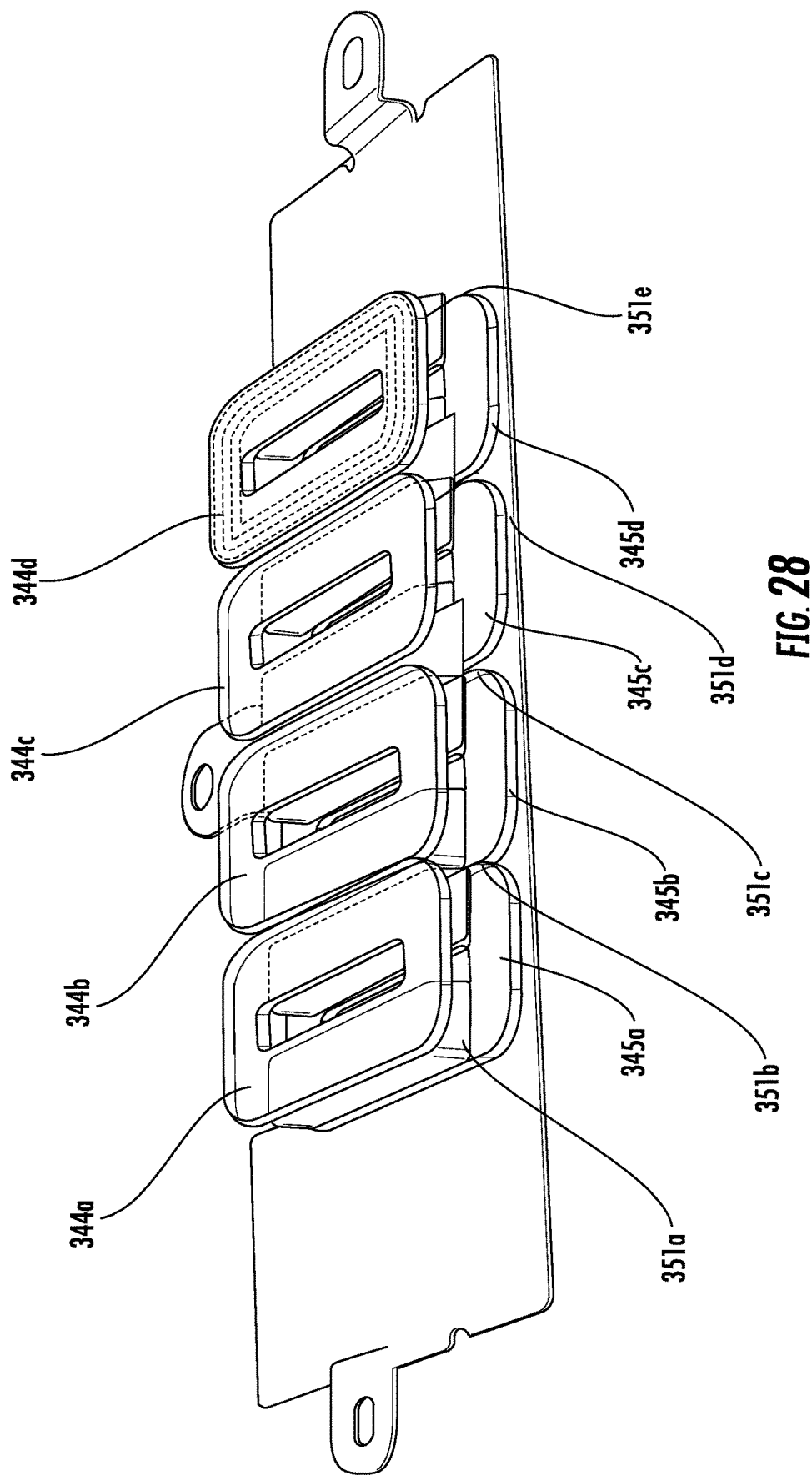
FIG. 28 is another perspective view of a portion of the haptic actuator in FIG. 27.

Referring now to FIGS. 27 and 28, another embodiment of a haptic actuator 340 is illustrated. The haptic actuator 340 includes an actuator housing 341 having a dimension in a length direction greater than a width direction and first and second sets of coils 344a-344d, 345a-345d are carried by the actuator housing 341 in spaced apart relation by the top and bottom of the actuator housing. The coils 344a-344d, 345a-345d each illustratively have a loop shape and each extends along a width of the actuator housing 341. Each of the first set of coils 344a-344d is in side-by-side relation. Each of the second set of coils 345a-345d, is also in side-by-side relation. While four first coils 344a-344d and four second coils 345a-345d are illustrated, it will be appreciated by those skilled in the art that there may be any number of coils 344a-344d, 345a-345d, and the coils may have a different shape.

The haptic actuator 340 also includes a field member 350 having opposing first and second sides 353, 354. The field member 350, similarly to the actuator housing 341, has a dimension in a length direction greater than a width direction. Thus, the field member 350 is reciprocally movable in the length direction (i.e., the x-direction). While the movement of the field member 350 is described as being movable in one direction, i.e., a linear haptic actuator, it should be understood that in some embodiments, the field member may be movable in other directions, i.e., an angular haptic actuator, or may be a combination of both a linear and an angular haptic actuator.

The field member 350 includes permanent magnets 351a-351e between the first and second sets of coils 244a-244d, 245a-345d. The permanent magnets 351a-351e may be neodymium, for example, and may be positioned in opposing directions with respect to their respective poles.

The permanent magnets 351a-351e also each have a rectangular shape and are spaced apart along a length of the actuator housing 341. While rectangular shaped permanent magnets 351a-351e are illustrated, it will be appreciated that there may be any number of permanent magnets having any shape between the first and second coils 344a-344d, 345a-345d.

The field member 350 also includes masses 357a-357d between the permanent magnets 351a-351e. The masses 357a-357d may be tungsten, for example. The masses 357a-357d may be a different material and there may be more or less than the three masses illustrated. The masses 357a-357d may be part of a body of the field member 350, for example members extending across the actuator housing 341.

The haptic actuator 340 also includes a respective flexure bearing 360 mounting each of the first and second sides 353, 354 of the field member 350 to be reciprocally movable within the actuator housing 341 responsive to the first and second sets of coils 344a-344d, 345a-345d. Each flexure bearing 360 includes a first anchor member 361 coupled to an adjacent portion of the actuator housing 341, more particularly, adjacent an end and a side (i.e., a corner) of the actuator housing. A second anchor member 362 is coupled to an adjacent side of the field member 350 and also adjacent the first side 347a of the actuator housing 341. The first and second anchor members 361, 362 are illustratively spaced apart at an initial at-rest position. However, under compression, for example, the first and second anchor members 361, 362 may be in contact, as will be appreciated by those skilled in the art.

A first flexible arm 363 couples the first and second anchor members 361, 362 together. The first flexible arm 363 has a bend therein to define a V-shape, for example. The first flexible arm 363 may have more than one bend therein.

Each flexure bearing 360 also includes a third anchor member 364 coupled to an adjacent portion of the actuator housing 341, illustratively in a corner opposite the first anchor member 361. A fourth anchor member 365 is coupled to an adjacent side of the field member 350 opposite the second anchor member 362 and also adjacent the second side of the actuator housing 341. A second flexible arm 366 couples the third and fourth anchor members 364, 365 together and has a bend therein, for example, to also define a V-shape. The second flexible arm 366 may have more than one bend therein.

A method aspect is directed to a method of making a haptic actuator 340. The method includes positioning at least one coil 344a-344d to be carried by an actuator housing 341 and positioning a field member 350 having opposing first and second sides 353, 354 within the actuator housing. The method also includes positioning respective flexure bearings 360 to mount each of the first and second sides 353, 354 of the field member 350 to be reciprocally movable within the actuator housing responsive to the at least one coil.

Figure 29:
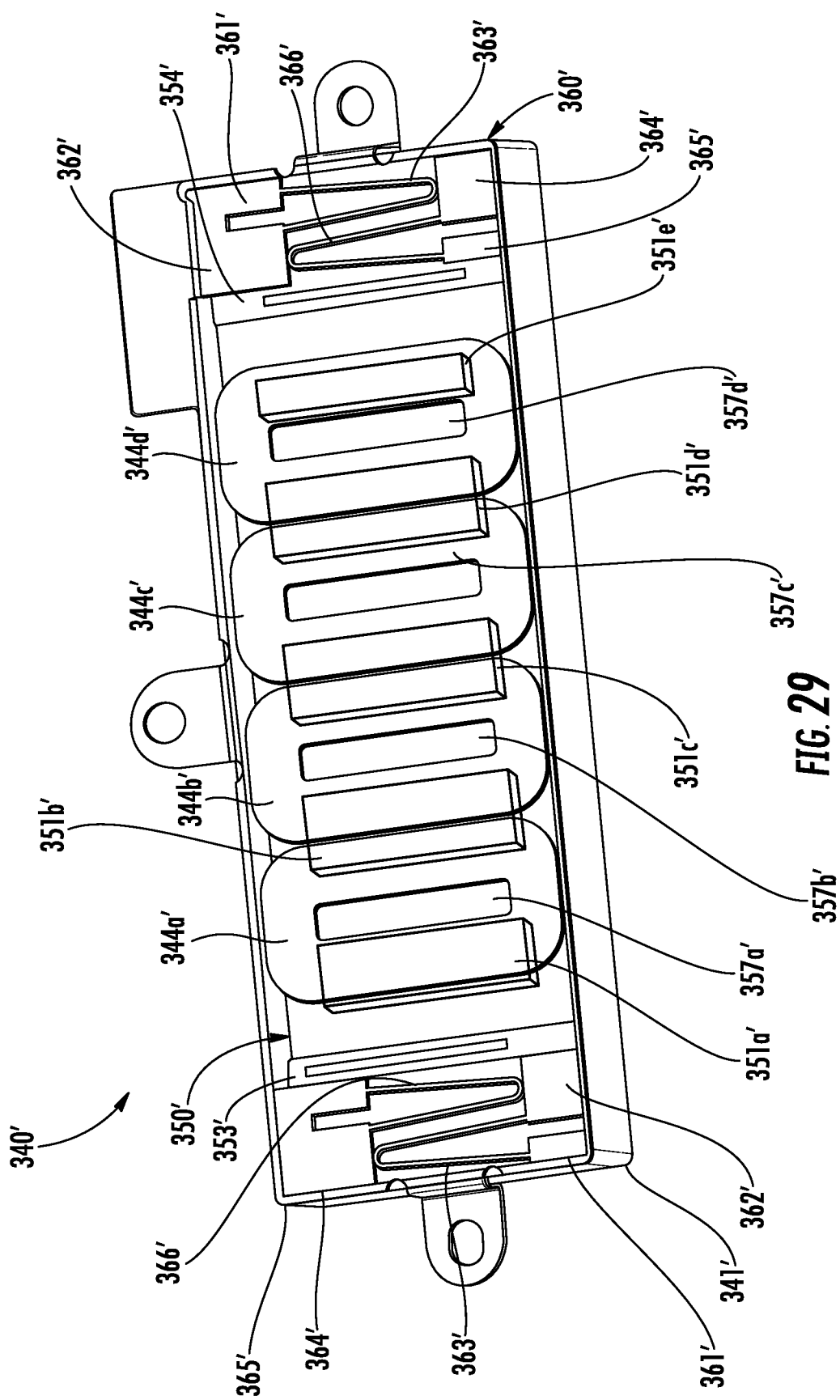
FIG. 29 is a perspective view of a haptic actuator according to another embodiment.

Referring now to FIG. 29, in another embodiment, the haptic actuator 340' may include permanent magnets 351a'-351e' carried by the housing 341', and the field member 350' may include coils 344a'-344d' that cooperate with the permanent magnets. In other words, in contrast to the embodiment described above, the permanent magnets 351a'-351e' are stationary (i.e., carried by the actuator housing 341') and the coils 344a'-344d' as part of the field member 350' are moving (i.e., connected to the masses 357a'-357d'). Of course, there may be any number of coils and/or permanent magnets. For example, there may be a second set of permanent magnets carried on an opposing side of the coils 344a'-344d'.

Figure 30:
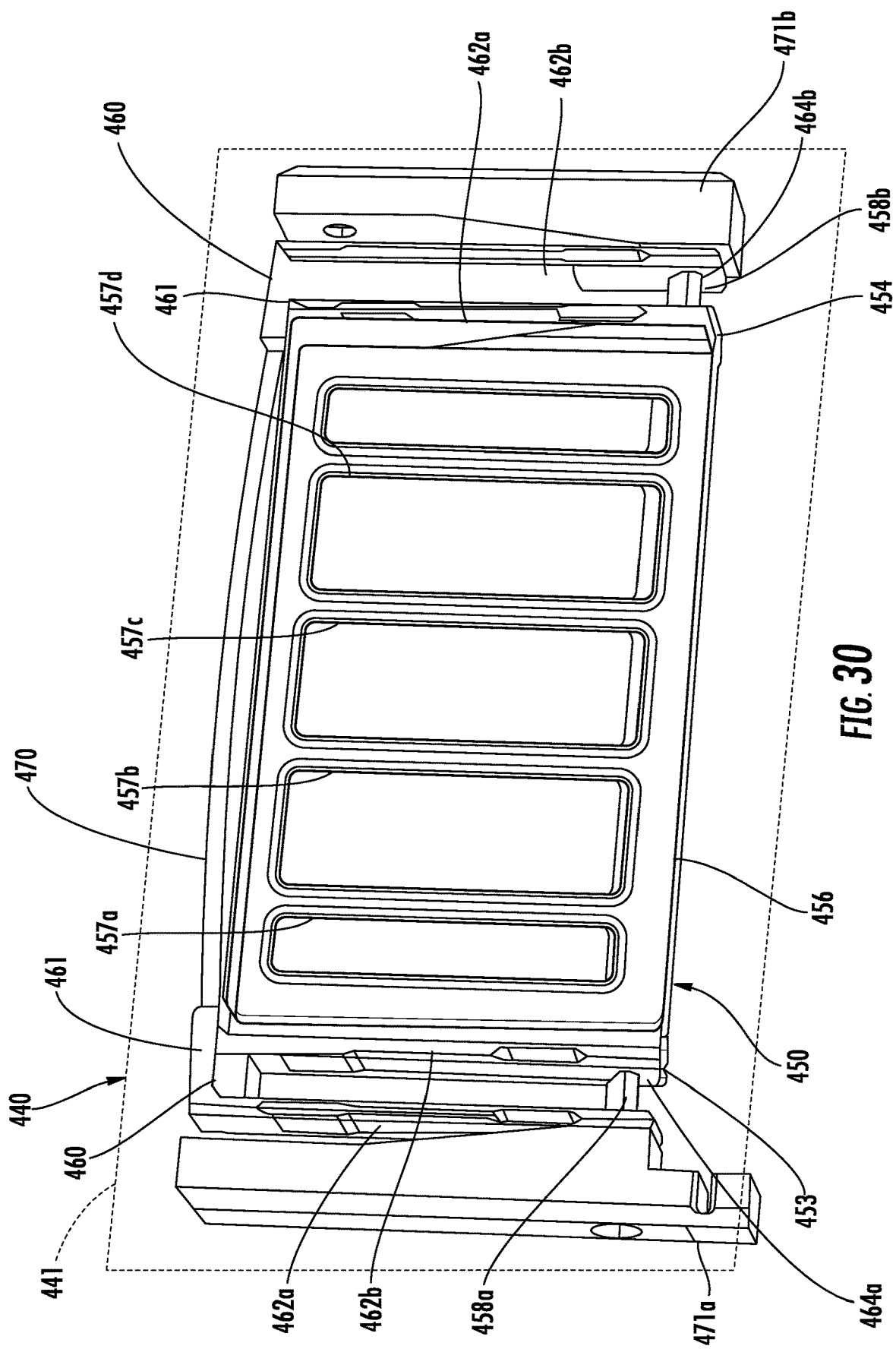
FIG. 30 is a perspective view of a portion of a haptic actuator according to an embodiment.
Figure 31:
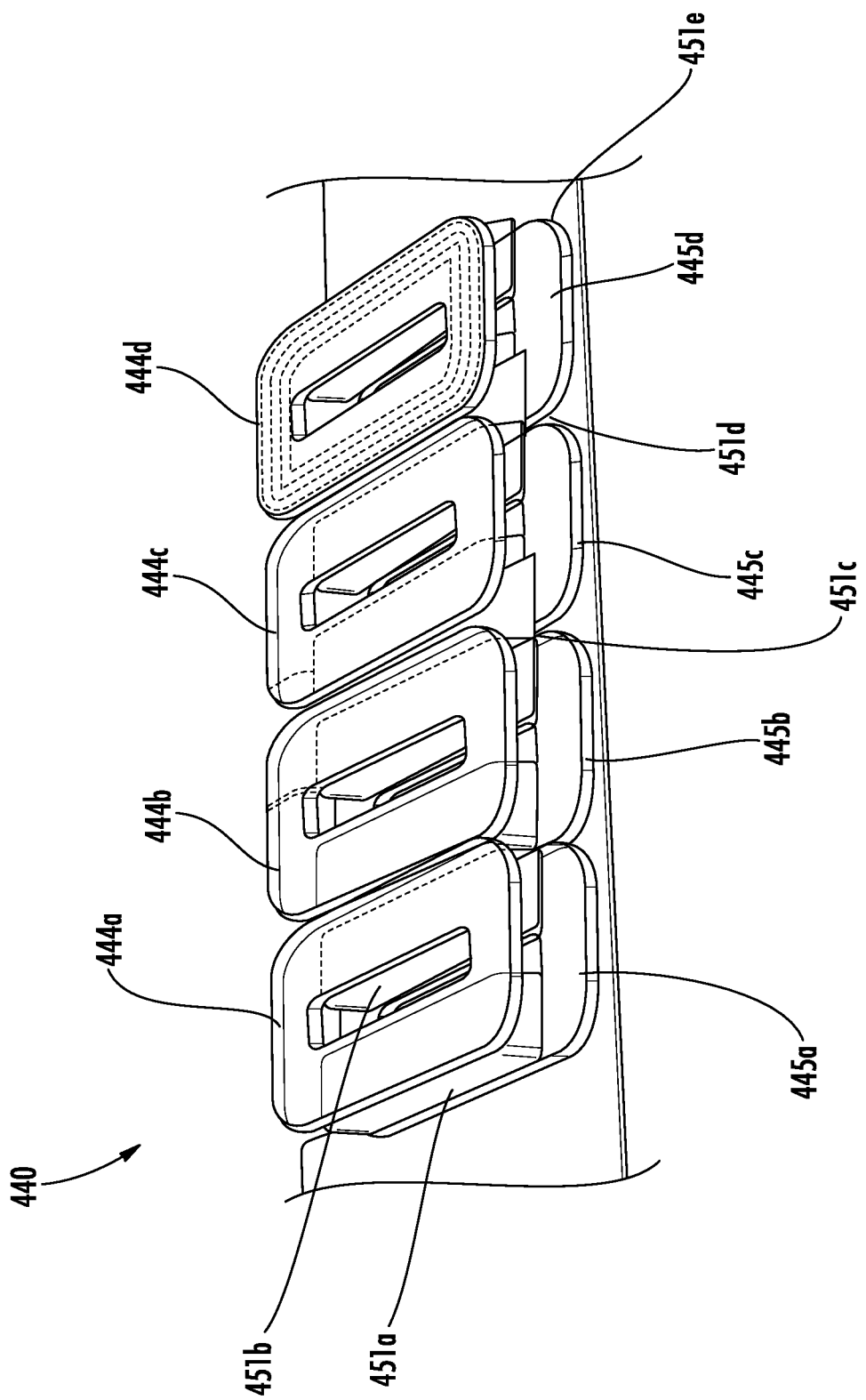
FIG. 31 is a perspective view of another portion of the haptic actuator in FIG. 30.

Referring now to FIGS. 30 and 31, another embodiment of a haptic actuator 440 is illustrated. The haptic actuator 440 includes an actuator housing 441 having a dimension in a length direction greater than a width direction and first and second sets of coils 444a-444d, 445a-445d are carried by the actuator housing in spaced apart relation by the top and bottom of the actuator housing. The coils 444a-444d, 445a-445d each illustratively has a loop shape and each extends along a width of the actuator housing 441. Each of the first set of coils 444a-444d is in side-by-side relation. Each of the second set of coils 445a-445d, is also in side-by-side relation. While four first coils 444a-444d and four second coils 445a-445d are illustrated, it will be appreciated by those skilled in the art that there may be any number of coils, and the coils may have a different shape.

The haptic actuator 440 also includes a field member 450 having opposing first and second sides 453, 454. The field member 450, similarly to the actuator housing 441, has a dimension in a length direction greater than a width direction. Thus, the field member 450 is reciprocally movable in the length direction (i.e., the x-direction). While the movement of the field member 450 is described as being movable in one direction, i.e., a linear haptic actuator, it should be understood that in some embodiments, the field member may be movable in other directions, i.e., an angular haptic actuator, or may be a combination of both a linear and an angular haptic actuator.

The field member 450 includes permanent magnets 451a-451e between the first and second sets of coils 444a-444d, 445a-445d. The permanent magnets 451a-451e may be neodymium, for example, and may be positioned in opposing directions with respect to their respective poles.

The permanent magnets 451a-451e also each have a rectangular shape and are spaced apart along a length of the actuator housing 441. While rectangular shaped permanent magnets 451a-451e are illustrated, it will be appreciated that there may be any number of permanent magnets having any shape.

The field member 450 also includes a body 456 that includes masses 457a-457d between the permanent magnets 451a-451e. The masses 457a-457d may be tungsten, for example. The masses 457a-457d may be a different material and there may be any number of masses. The field member 450 also includes shafts 458a, 458b extending outwardly from the body 456 adjacent the first and second ends or sides 453, 454.

The haptic actuator 440 also illustratively includes a frame member 470 extending along a first side of the actuator housing 441. A respective flexure bearing 460 is carried by the frame member 470 and mounts each of the first and second ends 453, 454 of the field member 450 to be reciprocally movable within the actuator housing 441 responsive to the first and second coils 444a-444d, 445a-445d.

Each flexure bearing 460 includes a base member 461 coupled to an end of the frame member 470, and spaced apart flexible arms 462a, 462b extending outwardly from the base member to a second side of the actuator housing 441. The spaced apart flexible arms 462a, 462b are spaced apart at distal ends thereof at an initial at-rest position, and may be parallel at the initial at-rest position. When the flexure bearing 460 is under compression, the spaced apart flexible arms 462a, 462b may contact one another at the distal ends thereof. The spaced apart flexible arms 462a, 462b also illustratively include an opening 464a, 464b therein for receiving respective ones of the shafts 458a, 458b therein.

The haptic actuator 440 also includes a respective guide member 471a, 471b coupled between a respective end of the actuator housing 441 and a respective flexure bearing 460. Each guide member 471a, 471b has an opening 472a, 472b therein for receiving a respective one of the shafts 458a, 458b. Each guide member 471a, 471b also has a tapered shape, and more particularly, a width that is decreasing along the width thereof. A thinner or smaller end of each guide member is adjacent the base member of each flexure bearing 460, for example, to permit the field member 450 to have a larger displacement along the movement or travel path (i.e., the x-axis). As will be appreciated by those skilled in the art, the distal ends of the spaced apart flexible arms slide on the shafts 458a, 458b. In some embodiments, there may be no shafts and openings.

A method aspect is directed to a method of making a haptic actuator 440. The method includes positioning at least one coil 444a-444d, 445a-445d to be carried by an actuator housing 410 and positioning a field member 450 having opposing first and second sides 453, 454 within the actuator housing. The method also includes positioning the respective flexure bearing 460 to mount each of the first and second sides 453, 454 of the field member 450 to be reciprocally movable within the housing responsive to the at least one coil 444a-444d, 445a-445d.

Figure 32:
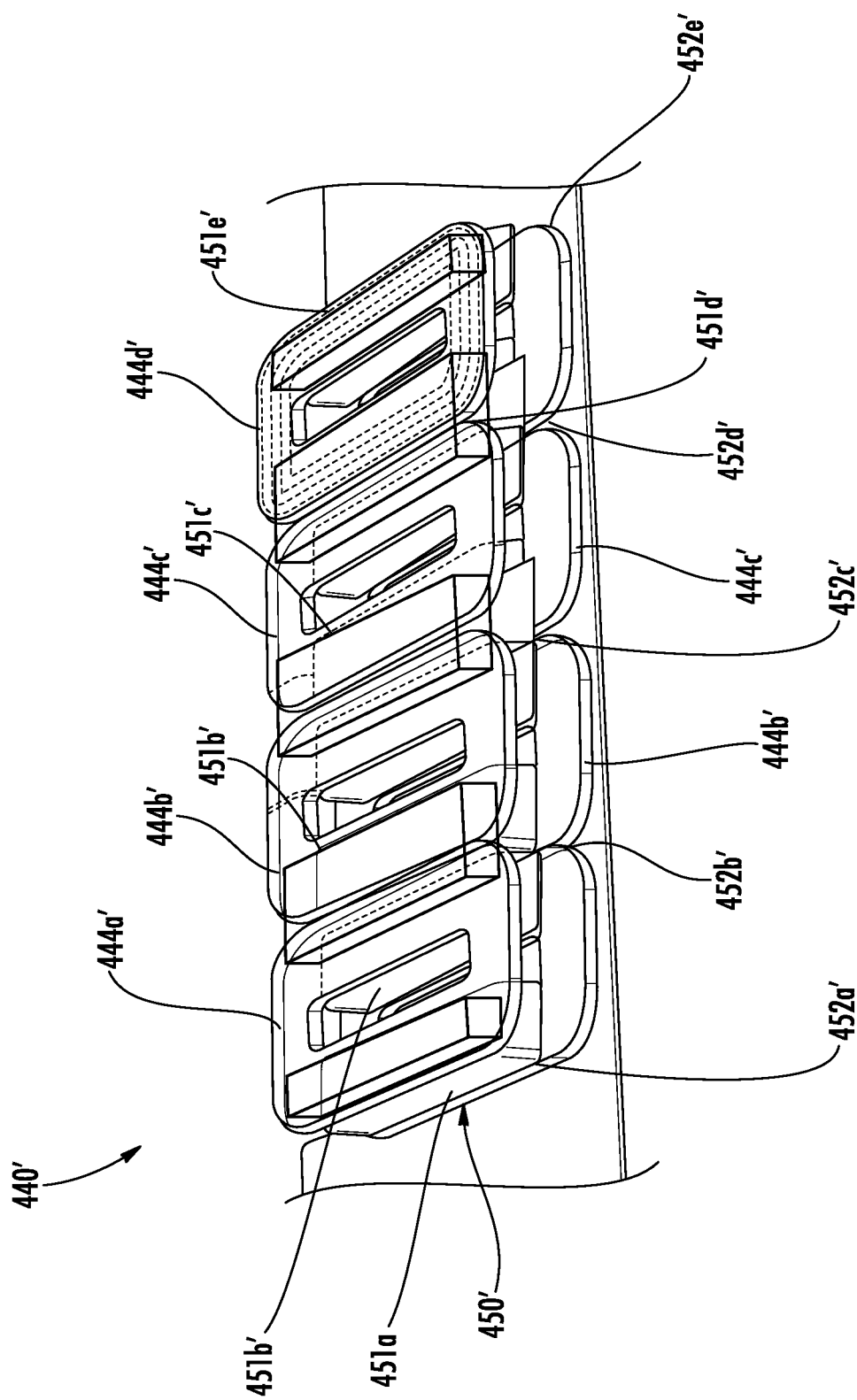
FIG. 32 is a perspective view of a portion of a haptic actuator in accordance with another embodiment.

Referring to FIG. 32, in another embodiment, the haptic actuator 440' may include first and second sets of permanent magnets 451a'-451e', 452a'-352e' carried by the housing, and the field member 450' may include coils 444a'-444d' that cooperate with the permanent magnets, and more particularly, that are between the first and second sets of permanent magnets. In other words, in contrast to the embodiment described above, the permanent magnets 451a'-451e', 452a'-452e' are stationary (i.e., carried by the actuator housing 441') and the coils 444a'-444d' as part of the field member 450' are moving (i.e., connected to the masses). Of course, there may be any number of coils and/or permanent magnets.

Figure 33:
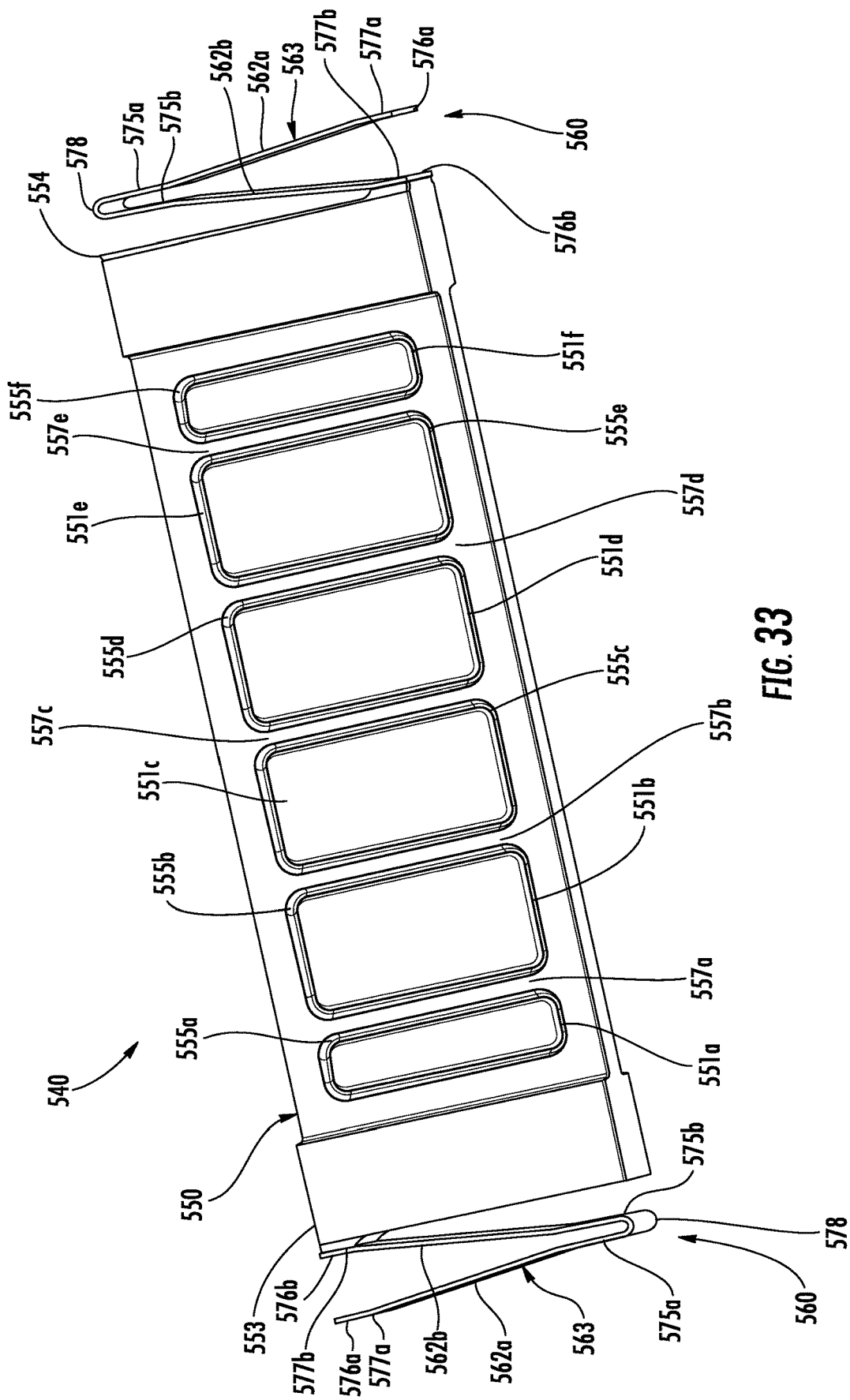
FIG. 33 is a perspective view of a portion of a haptic actuator according to an embodiment.
Figure 34:
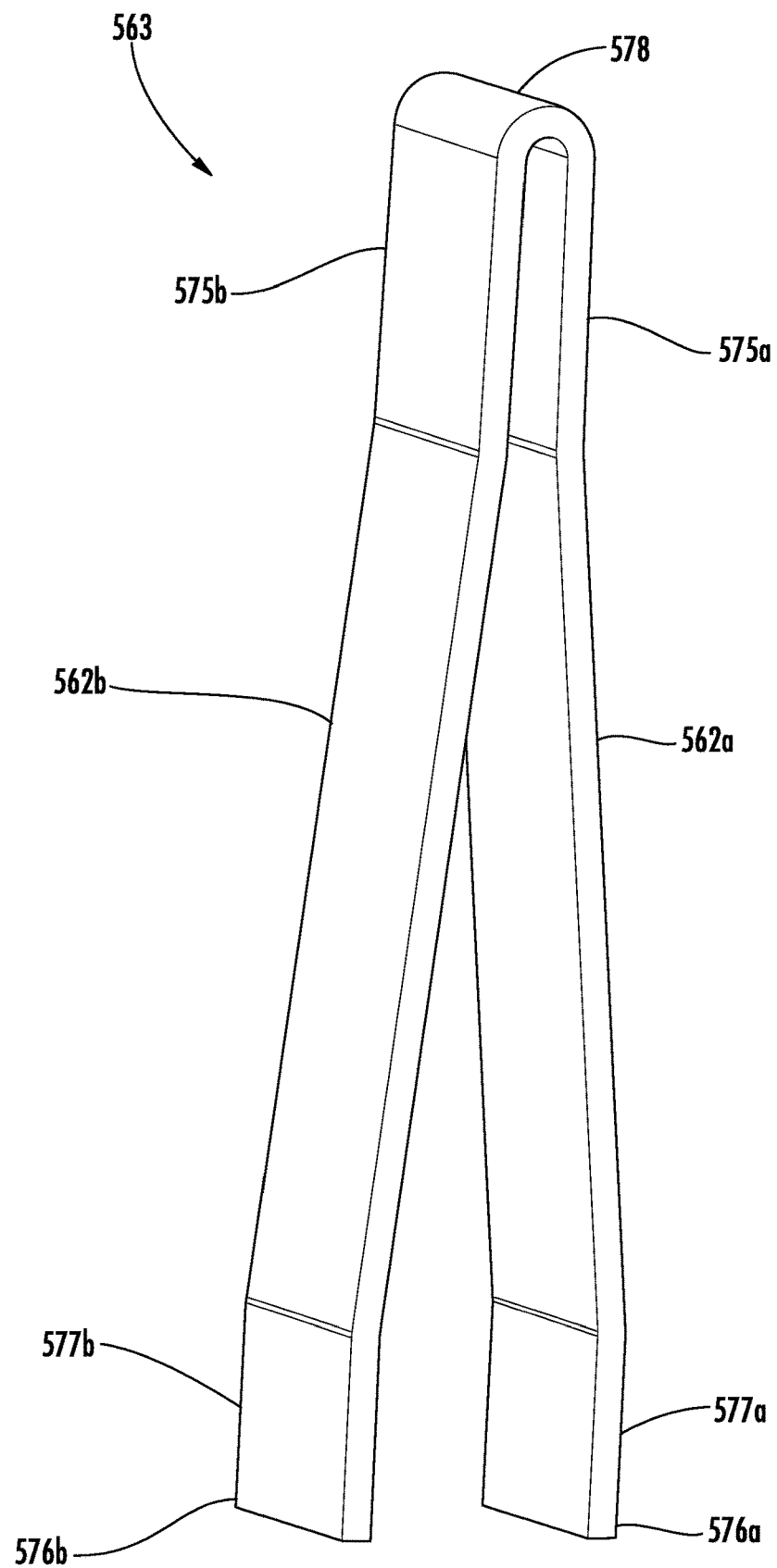
FIG. 34 is an enlarged perspective view of the flexible member of FIG. 33.

Referring now to FIGS. 33 and 34, another embodiment of a haptic actuator 540 is illustrated. The haptic actuator 540 may include an actuator housing 541 having a dimension in a length direction greater than a width direction and first and second sets of coils carried by the actuator housing in spaced apart relation, for example, as described above.

The haptic actuator 540 also includes a field member 550 having opposing first and second sides 553, 554. The field member 550, similarly to the actuator housing, has a dimension in a length direction greater than a width direction. Thus, the field member 550 is reciprocally movable in the length direction (i.e., the x-direction). While the movement of the field member 550 is described as being movable in one direction, i.e., a linear haptic actuator, it should be understood that in some embodiments, the field member may be movable in other directions, i.e., an angular haptic actuator, or may be a combination of both a linear and an angular haptic actuator.

The field member 550 includes permanent magnets 551a-551f that are positioned between the first and second sets of coils. The permanent magnets 551a-551f may be neodymium, for example, and may be positioned in opposing directions with respect to their respective poles.

The permanent magnets 551a-551f also each have a rectangular shape and are spaced apart along a length of the field member 550, and more particularly, spaced within openings 555a-555f in the field member 550. While rectangular shaped permanent magnets 551a-551f are illustrated, it will be appreciated that there may be any number of permanent magnets having any shape between and the openings 555a-555f may also have any shape.

The field member 550 also includes masses 557a-557e between the permanent magnets 551a-551f. The masses 557a-557e are illustratively part of the body of the field member 550, for example, members extending across the field member and defining the openings 555a-555f. Of course, the masses 557a-557e can be arranged as described above with respect to the other embodiments.

The haptic actuator 540 also includes a respective flexure bearing 560 mounting each of the first and second sides 553, 554 of the field member 550 to be reciprocally movable within the actuator housing 541 responsive to the first and second sets of coils. Each flexure bearing 560 includes a flexible member 563 having a wishbone or Y-shape, with two diverging arms 562a, 562b joined together at proximal ends 575a, 575b. The two diverging arms 562a, 562b have spaced distal ends 576a, 576b operatively coupled between adjacent portions of the field member 550 and the housing.

The flexible member 563 has a bend 578 therein joining together the two diverging arms 562a, 562b at the proximal ends 575a, 575b. The bend 578 causes the two diverging arms 562a, 562b to be spaced apart at the distal ends 576a, 576b. Illustratively, the two diverging arms 562a, 562b include a parallel portion 577a, 577b at the distal ends 576a, 576b. In some embodiments, the distal ends 576a, 576b of the two diverging arms 562a, 562b may continue to diverge instead of turning or becoming parallel.

Figure 35:
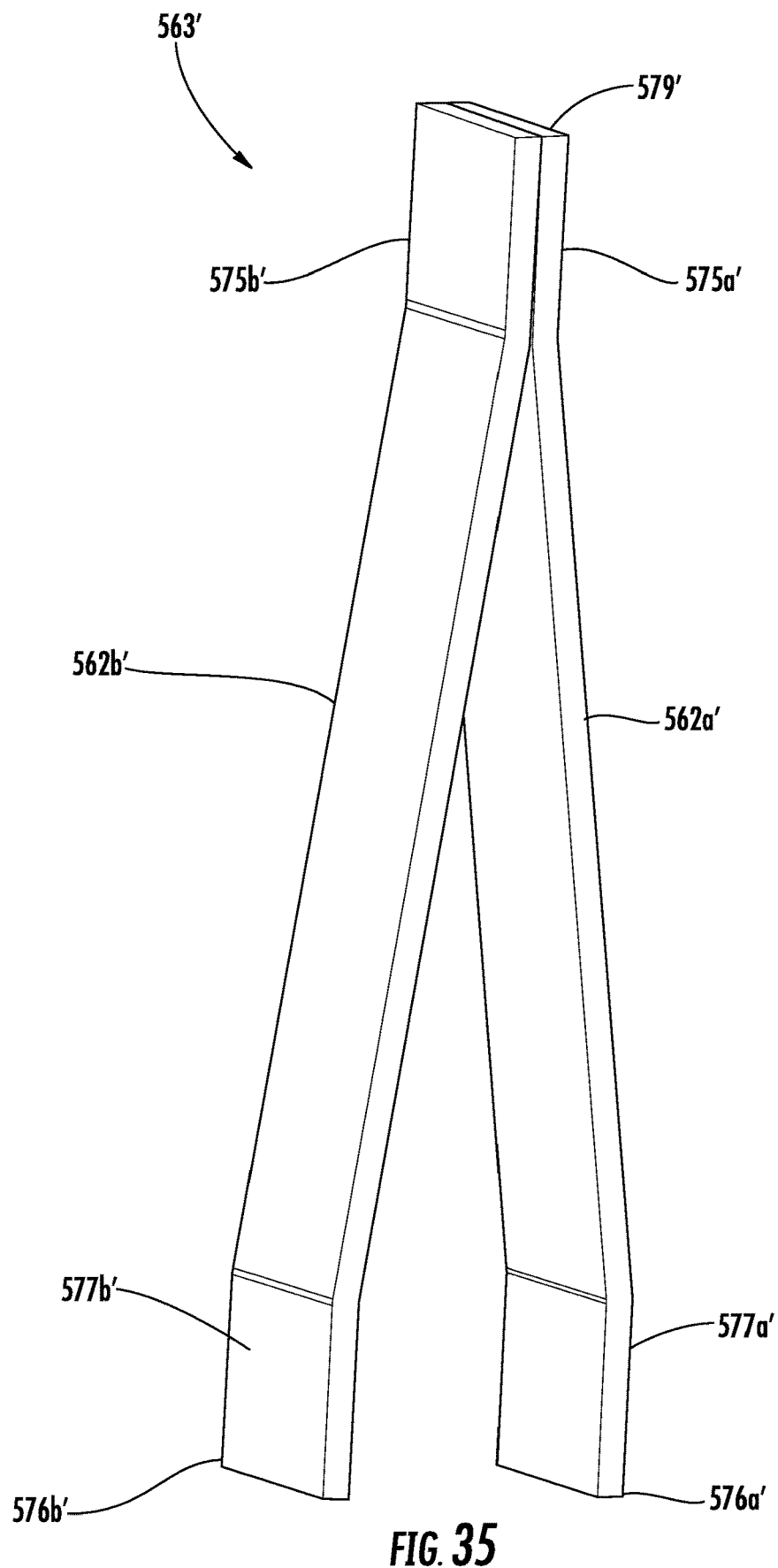
FIG. 35 is an enlarged perspective view of a flexible member according to another embodiment.

Referring briefly to FIG. 35 in another embodiment, the two diverging arms 562a', 552b' are parallel at the proximal ends 575a', 575b' and are coupled together, for example, via a weld joint 579'.

Figure 36:
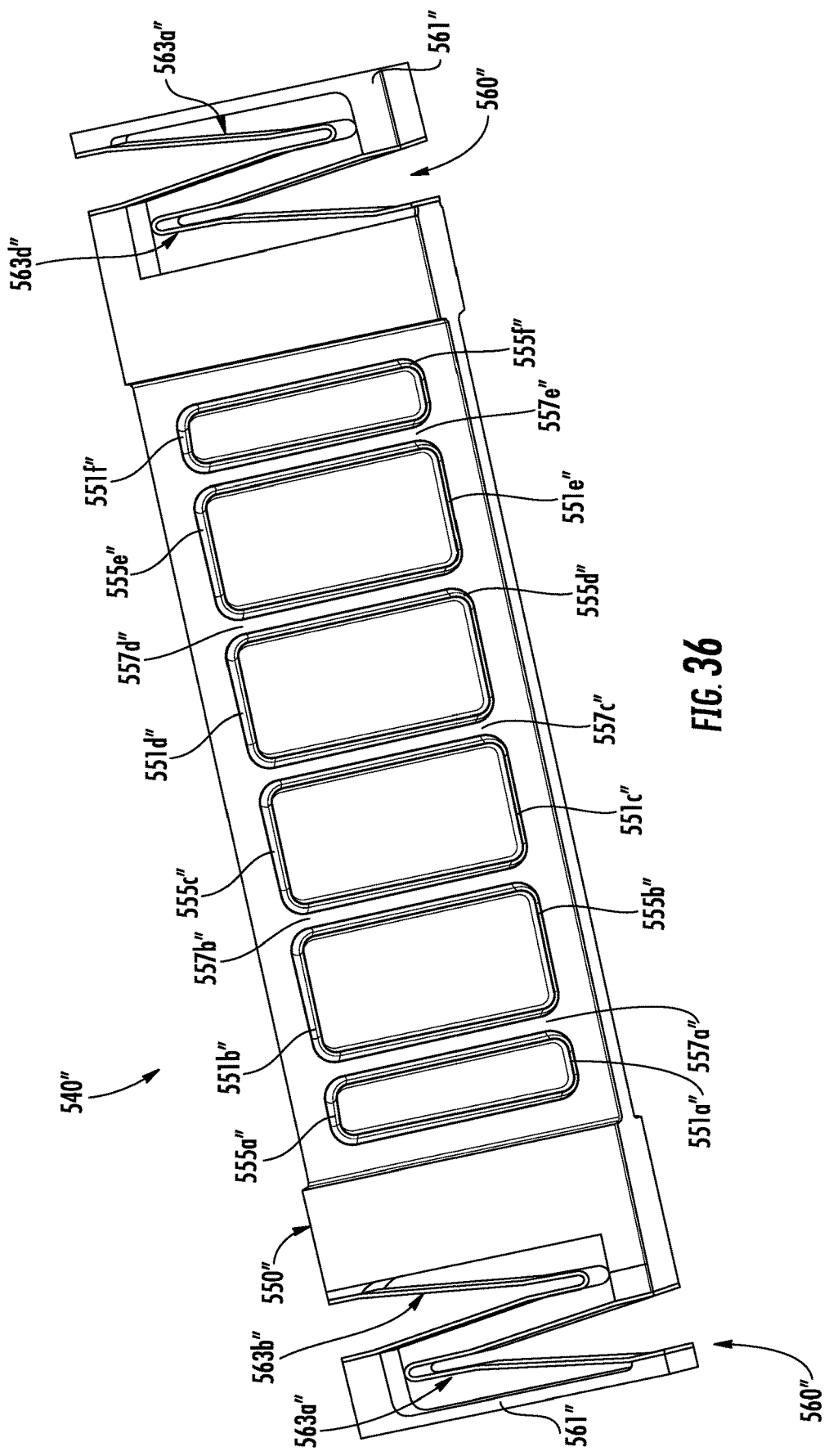
FIG. 36 is a perspective view of a portion of a haptic actuator according to an embodiment.

Referring now to FIG. 36, in another embodiment, each flexure bearing 560" may include first and second flexible members 563a", 563b". A respective anchor member 561" is coupled to an adjacent portion of the housing and spaced from an adjacent portion of the field member 550". The anchor member 561" is illustratively L-shaped, having a length aligned along the adjacent portion of the housing. The first and second flexible members 563a", 563b" are coupled between the respective anchor member 561" and the adjacent portions of the field member 550". The first and second flexible members 563a", 563b" are arranged so that the proximal end of the first flexible member 563a" is adjacent the distal end of the second flexible member 563b".

The table below illustrates exemplary mode shapes and frequencies versus design. Indeed, as will be appreciated by those skilled in the art, the wishbone or Y-shaped design of the flexible member 563 may provide increased stability versus a U or V-shaped flexible member, for example.

|  | Mode | | | |
| --- | --- | --- | --- | --- |
|  | X Mode | Rocking Z Mode | Z Mode | Y Mode |
| U/V Shaped w/o magnetic anti-spring | 100 Hz | 285 Hz | 316 Hz | 329 Hz |
| Wishbone Shaped w/o magnetic anti-spring | 100 Hz | 381 Hz | 382 Hz | 405 Hz |
| U/V Shaped w/magnetic anti-spring | 100 Hz | Unstable | 128 Hz | 329 Hz |
| Wishbone Shaped w/magnetic anti-spring | 100 Hz | 250 Hz | 251 Hz | 405 Hz |

A method aspect is directed to a method of making a haptic actuator 540. The method includes positioning at least one coil to be carried by an actuator housing and positioning a field member 550 having opposing first and second sides 553, 554 within the actuator housing. The method also includes positioning respective flexure bearings 560 to mount each of the first and second sides 553, 554 of the field member 550 to be reciprocally movable within the actuator housing responsive to the at least one coil.

Figure 37:
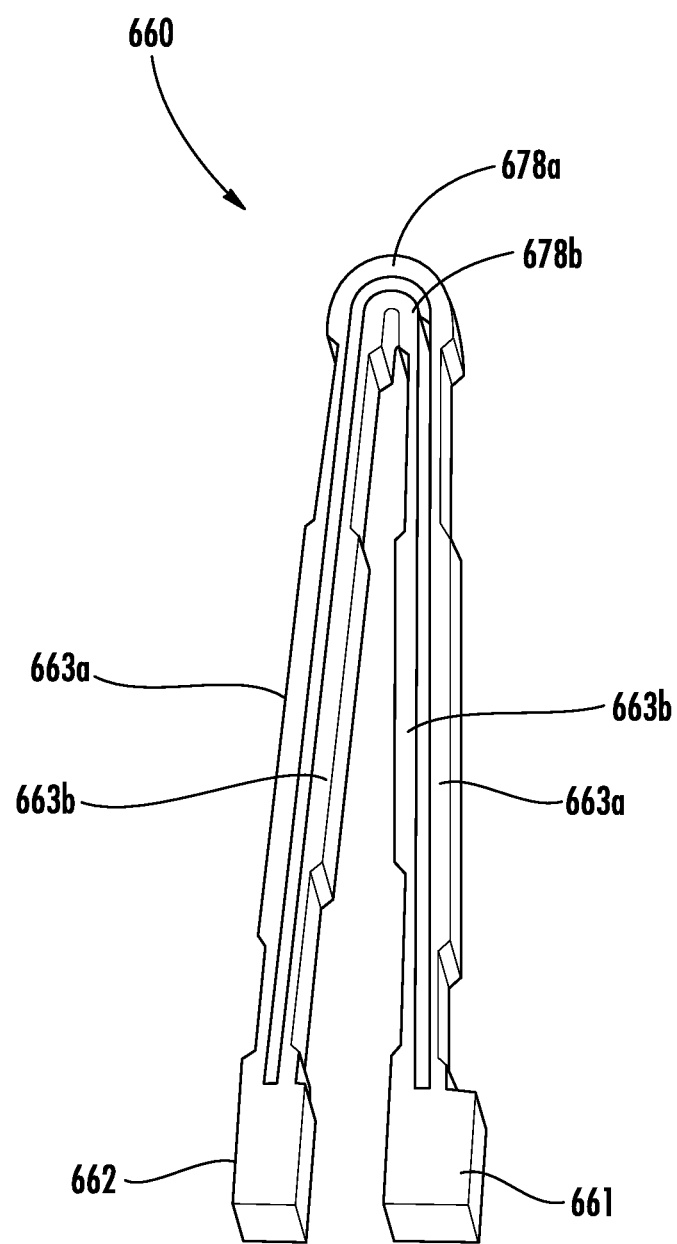
FIG. 37 is an enlarged perspective view of a flexure bearing for use with a field member of a haptic actuator in accordance with an embodiment.

Referring now to FIG. 37, another embodiment of a flexure bearing 660 is illustrated for use with a field member in a haptic actuator as described above. As will be appreciated by those skilled in the art and along the lines as described above, two flexure bearings 660 are typically used in the haptic actuator.

Each flexure bearing 660 includes a first anchor member 661 coupled to an adjacent portion of the actuator housing, and more particularly, adjacent an end and a side (i.e., a corner) of the actuator housing. A second anchor member 662 is coupled to an adjacent side of the field member and also adjacent the first side of the actuator housing. The first and second anchor members 661, 662 are illustratively spaced apart at an initial at-rest position. However, under compression, for example, the first and second anchor members 661, 662 may be in contact, as will be appreciated by those skilled in the art.

First and second parallel, spaced apart flexible arms 663a, 663b each couple the first and second anchor members 661, 662 together. The first and second flexible arms 663a, 663b each has a bend 678a, 678b therein to define a V-shape, for example. The first and second parallel and spaced apart flexible arms 663a, 663b may each have more than one bend therein. The first and second parallel, spaced apart flexible arms 663a, 663b may each have a varying thickness along a length thereof (e.g., from the first anchor member 661 through the bend 678a, 678b to the second anchor member 662). While two parallel, spaced apart flexible arms are illustrated, it will be appreciated that any number of parallel, spaced apart flexible arms 663a, 663b may couple the first and second anchor members 661, 662.

A method aspect is directed to a method of making a haptic actuator. The method includes positioning at least one coil to be carried by an actuator housing and positioning a field member having opposing first and second sides within the actuator housing. The method also includes positioning respective flexure bearings 660 to mount each of the first and second sides of the field member to be reciprocally movable within the actuator housing responsive to the at least one coil.

Figure 38:
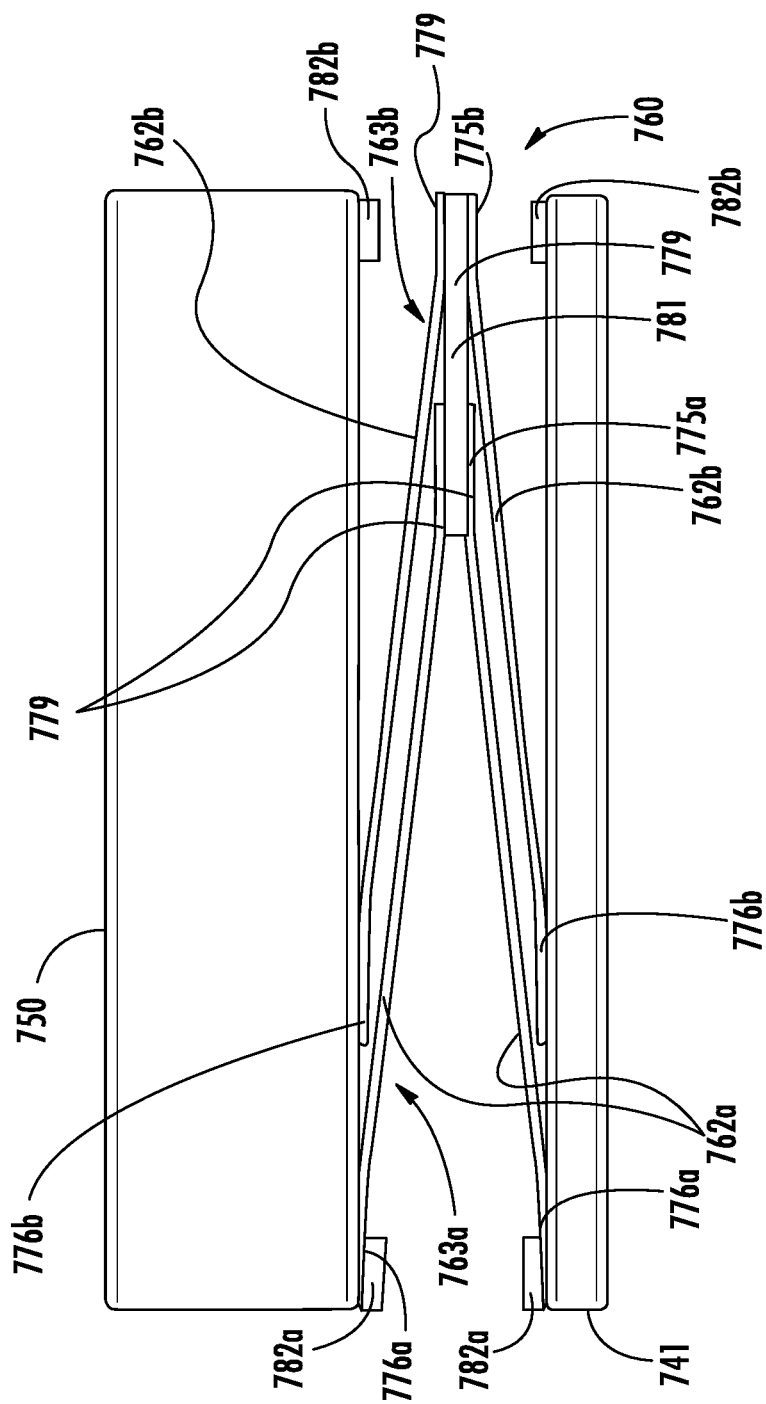
FIG. 38 is an enlarged schematic top view of a portion of a haptic actuator including a flexure bearing in accordance with an embodiment.

Referring now to FIG. 38, in another embodiment, a respective flexure bearing 760 mounts each of the first and second sides of the field member 750 to be reciprocally movable within the housing 741 responsive to at least one coil. The field member 750 and at least one coil are similar to those described above and, thus, need no further discussion herein.

Each flexure bearing 760 includes nested flexible members 763a, 763b (i.e., having a chevron shape) each having a wishbone or Y-shape, with two diverging arms 762a, 762b joined together at spaced apart proximal ends 775a, 775b. The two diverging arms 762a, 762b have spaced distal ends 776a, 776b operatively coupled between adjacent portions of the field member 750 and the housing 741. The two diverging arms 762a, 762b are parallel at the proximal ends 775a, 775b and are coupled together, for example, via a coupling member 781. The coupling member 781 (e.g., a spacer) may be coupled to the two diverging arms 762a, 762b of each of the nested flexible members 763a, 763b by way of weld joints 779, for example, laser weld joints. The two diverging arms 762a, 762b of each nested flexible member 763a, 763b are also parallel to the adjacent nested flexible member.

The two diverging arms 762a, 762b of each of the nested flexible members 763a, 763b at the distal ends 776a, 776b may be coupled to the adjacent portions of the field member 750 and housing 741 by an adhesive bond. The respective adjacent portions of the field member 750 and housing 741 are spaced apart along the length of the field member and housing. Of course, the two diverging arms 762a, 762b of each of the nested flexible members 763a, 763b at the distal ends 776a, 776b may be coupled to the adjacent portions of the field member 750 and housing 741 by other coupling techniques, for example, mechanical fasteners, epoxies, etc.

Mechanical stops 782a are illustratively coupled between the spaced apart distal ends 776a, 776b of the two diverging arms 762a, 762b of the nested flexible members 763a, 763b. Mechanical stops 782b are also illustratively coupled to the field member 750 adjacent the proximal ends 775a, 775b of the two diverging arms 762a, 762b of the flexible members 763a, 763b. The mechanical stops 782a, 782b may include rubber or other material. There may a different number of mechanical stops 782a, 782b, and the mechanical stops may be positioned elsewhere. In some embodiments, mechanical stops 782a, 782b, may not be included.

An exemplary assembly process of the flexure bearing 760 will now be described. A first step may include assembly of the two diverging arms 762a, 762b of the inner nested flexible member 763a. The two diverging arms 762a, 762b or flexure legs and coupling member or linkage are mounted in position by carrier tabs that have notches therein, which are pressed together and welded, for example. 1.3 mm long welding spacing provides a standoff between zones affected by welding heat and high-strain locations of the flexure bearing 760.

The lower or inner nested flexible member and corresponding mounts are assembled and mounted by positioning the lower flexure, inner mount, outer mount, and hard stops in a fixture or bearing by carrier tabs, pressed together and welded. The upper flexure halves are assembled into the flexure assembly or bearing by positioning upper flexure legs or the outer diverging arms in a fixture by carrier tabs, pressed together and welded. It should be noted that there may be an increased failure risk at the welding point during assembly due to a relatively small gap between upper flexure halves and lower flexure halves at the push location due to tight tolerances at small gaps (inner and outer nested flexible members). Relatively tight gaps can be widened by using a profile bar rather than a sheet metal linkage and an offset between upper and lower flexures on inner and outer flexure mounts. The carrier tabs are then removed, by "wiggling" or back and forth motion, flexure glue added, bumpers attached, and a soft stop attached.

Figure 39:
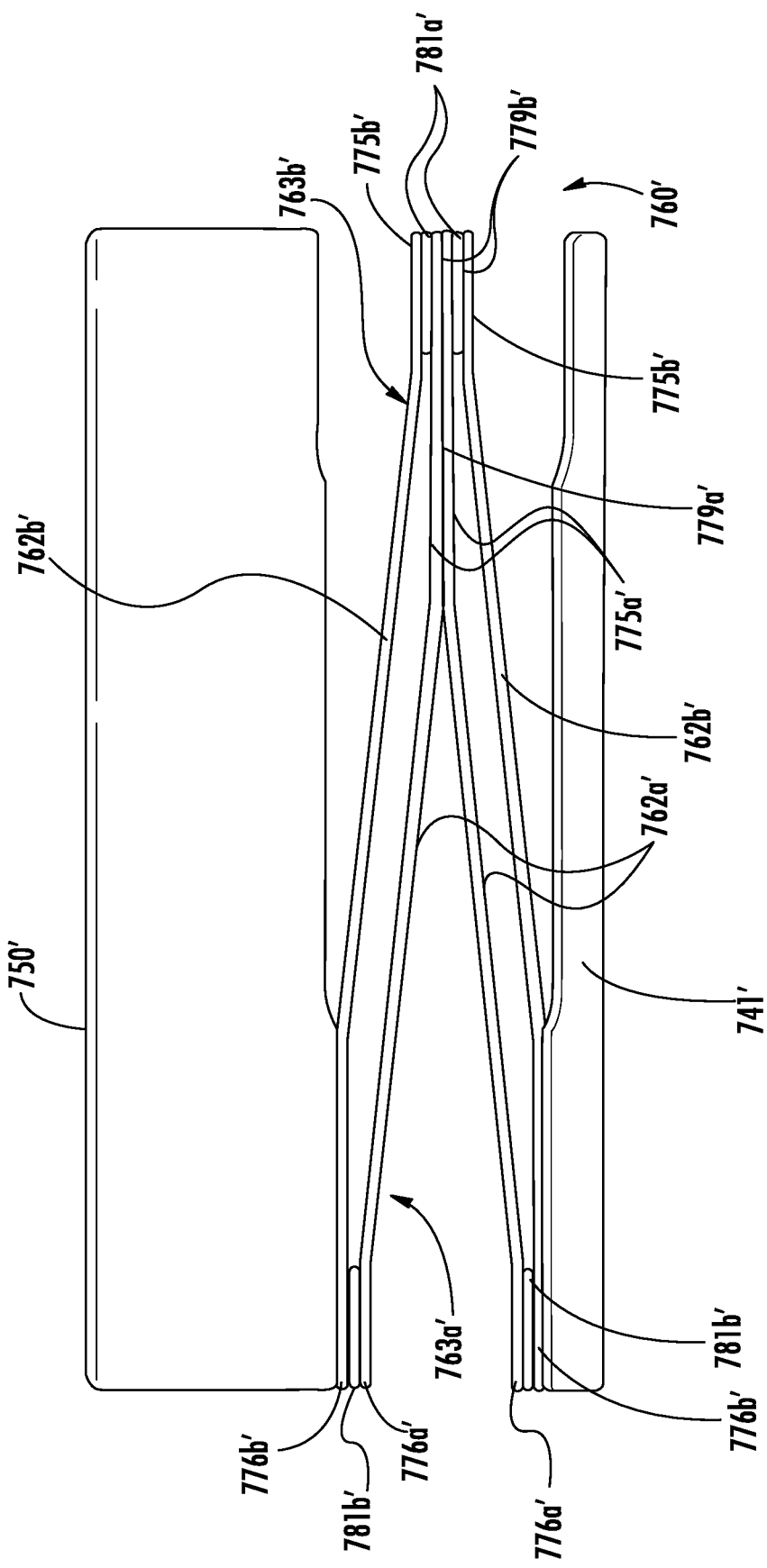
FIG. 39 is an enlarged schematic top view of a portion of a haptic actuator including a flexure bearing in accordance with an embodiment.

Referring now to FIG. 39, in another embodiment, a first pair of coupling members 781a', for example, in the form of spacers, couple each of the nested flexible members 763a', 763b', and more particularly, the proximal ends 775a', 775b' of the two diverging arms 762a', 762b', together. The first pair of coupling members 781a' may be welded between the two diverging arms of the inner and outer nested flexible members 763a', 763b', for example, via laser welding, to create weld joints 779b' therebetween. Illustratively, there is no coupling member or spacer between proximal ends of the two diverging arms 762a' of the inner nested flexible member 763a', as the two diverging arms are welded together forming a weld joint 779a' therebetween. A second pair of coupling members 781b' are coupled between the distal ends 776a', 776b' of two diverging arms 762a', 762b' of the inner and outer nested flexible members 763a', 763b'.

The spaced apart distal ends 776a', 776b' of the two diverging arms 762a', 762b' of each of the inner and outer nested flexible members 763a', 763b' couple to the same adjacent portion of the housing 741' and field member 750'. Since the inner nested flexible member 763a' is spaced from direct contact or coupling with the adjacent portions of the housing and field member 750', it is the second pair of coupling members 781b' that provides the operative coupling to the adjacent portions of the field member and the housing. While not illustrated, mechanical stops may be included.

The parallel proximal ends 775a', 775b' of the two diverging arms 762a' of the inner nested flexible member 763a' are illustratively longer in length than their counterparts of the outer nested flexible member 763b'. The spaced distal ends 776a', 776b' of the two diverging arms of the outer nested flexible member 763b' are illustratively longer in length than their counterparts of the inner nested flexible member. This arrangement may advantageously achieve a desired spacing between the inner and outer nested flexible members 763a', 763b'.

Figure 40:
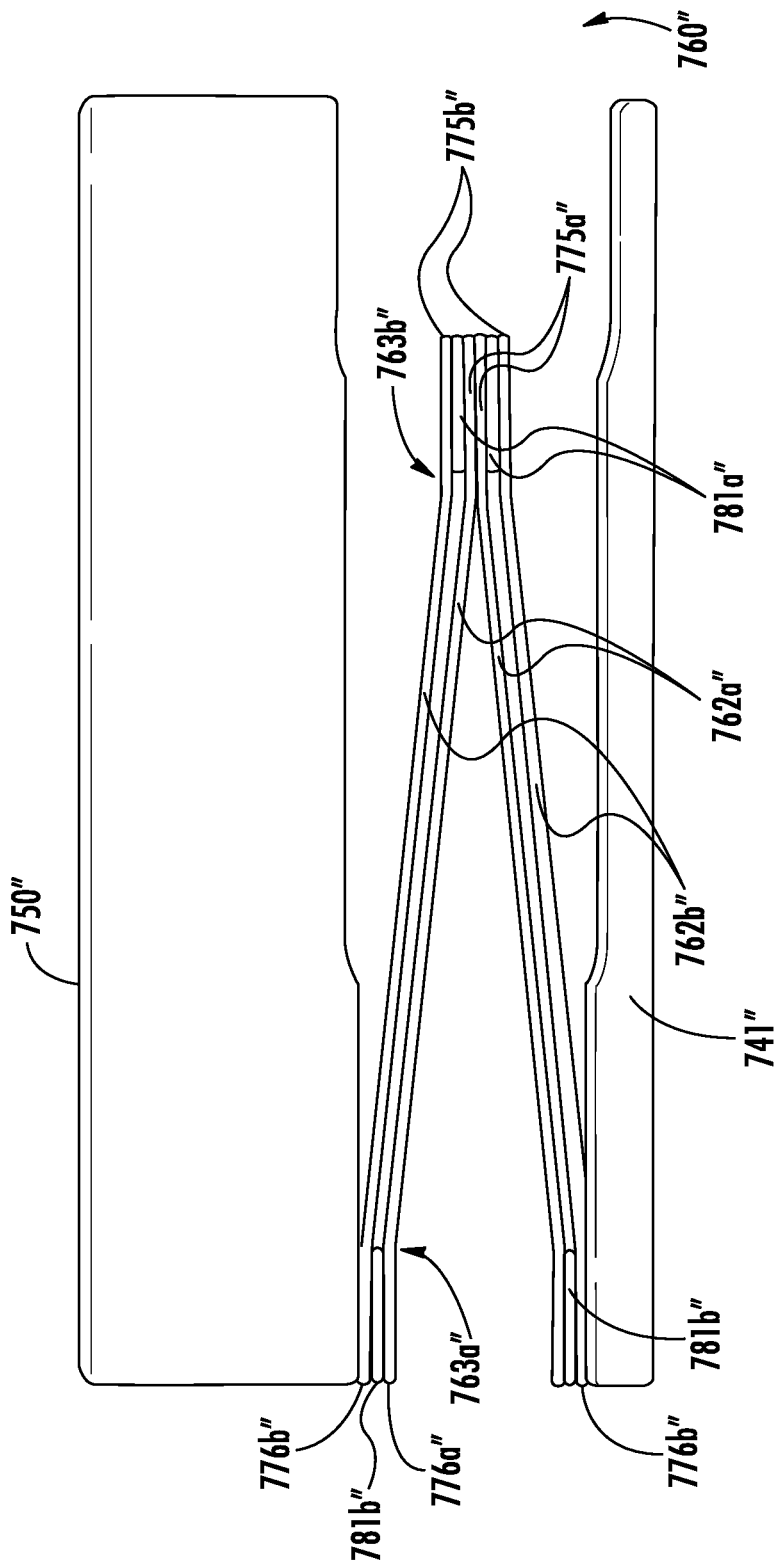
FIG. 40 is an enlarged schematic top view of a portion of a haptic actuator including a flexure bearing in accordance with an embodiment.

Referring now briefly to FIG. 40, in another embodiment, the proximal and distal ends 775a", 775b", 776a", 776b" of the two diverging arms 762a", 762b" of the inner and outer nested flexible members 763a", 763b" are relatively the same length. The result is that the spacing between the inner and outer nested flexible members 763a", 763b" are determined by the width of the first and second pairs of coupling bodies 781a", 781b". The distal ends 776a", 776b" of each of the inner and outer nested flexible members 763a", 763b" couple the same adjacent portion of the field member 750" and housing 741".

Figure 41:
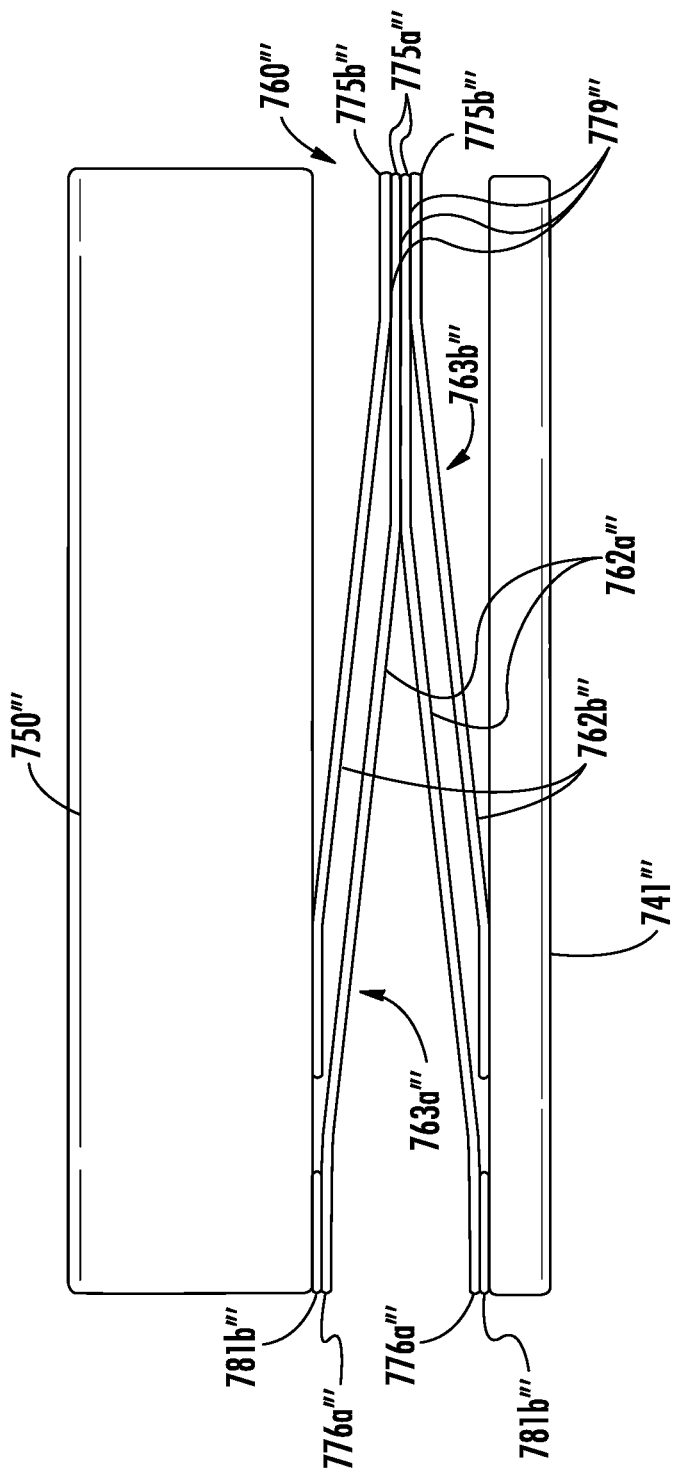
FIG. 41 is an enlarged schematic top view of a portion of a haptic actuator including a flexure bearing in accordance with an embodiment.

Referring to FIG. 41, similar to the embodiments described in FIG. 39, the parallel proximal ends 775a''', 775b''' of the two diverging arms 762a''' of the inner nested flexible member 763a''' are illustratively longer in length than their counterparts of the outer nested flexible member 763b'''. There is no coupling member coupling together the proximal ends 775a''', 775b''' of the inner and outer nested flexible members 763a''', 763b''', as the proximal ends of the inner and outer nested flexible members may be coupled by way of a respective weld joints 779''. The spaced apart distal ends 776a''', 776b''' of the inner and outer nested flexible members 763a''', 763b''' are operatively coupled to spaced apart adjacent portions of the field member 750''' and housing 741''' via a coupling member 781b''' (inner) and directly (outer) thereto.

Figure 42:
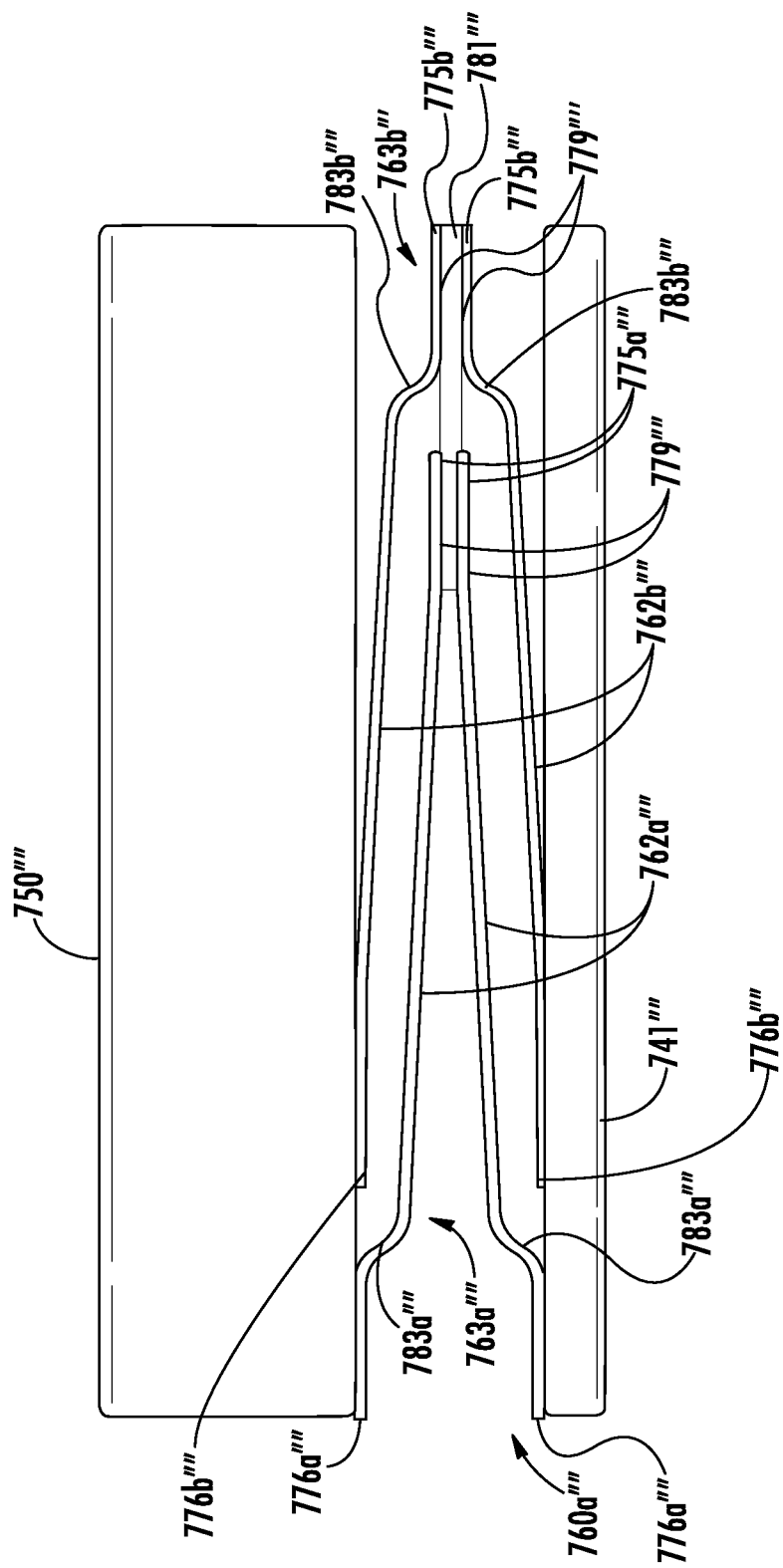
FIG. 42 is an enlarged schematic top view of a portion of a haptic actuator including a flexure bearing in accordance with an embodiment.

Referring now to FIG. 42, in another embodiment, similar to the embodiment described in FIG. 38, a coupling member 781'''' couples together the proximal ends 775a'''', 775b'''' of the inner and outer nested flexible members 763a'''', 763b''''. The location at which the inner and outer nested flexible members 763a'''', 763b'''' couple to the coupling member 781'''' is spaced apart to create spacing between the inner and outer nested flexible members. For further spacing, for example, the diverging arms 762b'''' of the outer nested flexible member 763b'''' each have a bend 783b'''' therein adjacent the proximal ends 775b'''' thereof. Each of the diverging arms 762a'''' of the inner nested flexible member 763a'''' also, for example, for spacing, have a bend 783a'''' therein adjacent the distal ends 776a'''' thereof.

The tables below shows a comparison between the different, above-described, flexure bearings.

| Architecture | Layout | Linear X Stiffness (N/mm) | Linear Y Stiffness (N/mm) | Linear Z Stiffness (N/mm) |
| --- | --- | --- | --- | --- |
| Chevron (FIG. 24) | Offset 0.20 mm X, Offset 0.00 mm Y, 2x linkage 0.10 mm | 1.3 | 70 | 77 |
| Chevron (FIG. 23) | Offset 0.20 mm X, Offset 2.20 mm Y, 2x linkage 0.10 mm | 1.2 | 99 | 77 |
| Chevron (FIG. 25) | Offset 0.10 mm X, Offset 2.20 mm Y, 1x linkage 0.10 mm | 1.4 | 99 | 108 |

-continued

| Architecture | Layout | Linear X Stiffness (N/mm) | Linear Y Stiffness (N/mm) | Linear Z Stiffness (N/mm) |
|---|---|---|---|---|
| Chevron (FIG. 22) | Offset 0.00 mm X, Offset 2.70 mm Y, 1x linkage 0.20 mm | 1.5 | 93 | 94 |
| Chevron Asymmetric Flexure (FIG. 26) | Offset 0.00 mm X, Offset 2.20 mm Y, 1x linkage 0.20 mm | 1.7 | 177 | 71 |
| Single Wishbone (reference) | One edge of mounts | 0.6 | 18 | 48 |
| Double wishbone (not nested; reference) | Opposing edges of mounts | 1.2 | 35 | 95 |

| Architecture | Layout | Bending X Stiffness (N/mm) | Bending Y Stiffness (N/mm) | Bending Z Stiffness (N/mm) |
|---|---|---|---|---|
| Chevron (FIG. 24) | Offset 0.20 mm X, Offset 0.00 mm Y, 2x linkage 0.10 mm | 1.3 | 31 | 18 |
| Chevron (FIG. 23) | Offset 0.20 mm X, Offset 2.20 mm Y, 2x linkage 0.10 mm | 1.2 | 63 | 27 |
| Chevron (FIG. 25) | Offset 0.10 mm X, Offset 2.20 mm Y, 1x linkage 0.10 mm | 1.4 | 60 | 34 |
| Chevron (FIG. 22) | Offset 0.00 mm X, Offset 2.70 mm Y, 1x linkage 0.20 mm | 1.5 | 59 | 26 |
| Chevron Asymmetric Flexure (FIG. 26) | Offset 0.00 mm X, Offset 2.20 mm Y, 1x linkage 0.20 mm | 1.6 | 95 | 49 |
| Single Wishbone (reference) | One edge of mounts | 0.6 | 13 | 17 |
| Double wishbone (not nested; reference) | Opposing edges of mounts | 1.2 | 27 | 24 |

As will be appreciated by those skilled in the art, a proximal end of a flexible member may bend toward the housing or field member during compression or tension. Moreover, there may be motion in directions other than linear compression or tension, which may be undesirable and result in crashing. A single wishbone shaped flexible member may also be subject to rotation and buckling.

The nested flexible members having a wishbone shape advantageously may restrict movement of the proximal end of the flexure member and may restrict movement of the field member in directions other than linear compression and tension. However, the nested flexible members having a wishbone shape may be subject to increased x-direction, y-direction, and z-direction drop and fatigue risk relative to other types of flexible members. Simulated comparisons between a flexure bearing having nested flexible members each having a wishbone shape relative to a U/V shape flexure bearing are below in the tables.

| Parameter | U/V Shaped Flexure | Nested Wishbone Flexure (% change) |
|---|---|---|
| X-Translation Frequency (X) | 133 Hz | −5% |
| Y-Translation Frequency (Y) | 511 Hz | +53% |
| Z-Bending Frequency (Z) | 436 Hz | +16% (w/anti-spring) |
| XY-Rotation Frequency (ZZ) | 732 Hz | +34% |
| YZ-Rotation Frequency (XX) | 1027 Hz | −18% (w/anti-spring) |
| $2^{nd}$ Z-Bending Frequency (YY) | 1193 Hz | +46% |
| $3^{rd}$ Z-Bending Frequency | 2402 Hz | +0.5% |
| XY-Flexure Frequency | 3907 Hz | +189% |
| X-Drop/(Nominal) Peak Stress | 0.65 (0.42) GPa | +17% |
| Z-Drop Peak Stress | 2.42 | +15% |

Indeed, while various embodiments have been described with respect to various flexure bearing configurations and coil and permanent magnet configurations, it should be understood that elements from any of the embodiments may be used with any of the other embodiments. For example, a given haptic actuator may include more than one type of flexure bearing as described herein, for example, to not only allow movement of the field member, but return it to an equilibrium position.

A haptic actuator comprises a housing, at least one coil carried by the housing, a field member having opposing first and second sides, and a respective flexure bearing mounting each of the first and second sides of the field member to be reciprocally movable within the housing responsive to the at least one coil. Each flexure bearing comprises a plurality of nested flexible members each having a wishbone shape with two diverging arms joined together at proximal ends and having spaced distal ends operatively coupled between adjacent portions of the field member and the housing.

The haptic actuator further comprises a coupling member coupling together proximal ends of the plurality of nested flexible members.

The two diverging arms of a given flexible member are parallel with the two diverging arms of an adjacent nested flexible member of the plurality thereof.

Each of the two diverging arms of each of the plurality of nested flexible members has a bend therein.

The two diverging arms include respective portions being spaced apart adjacent the proximal ends.

The two diverging arms are coupled together at the proximal ends.

Each flexible member comprises a weld joint at the proximal ends.

The haptic actuator further comprises at least one adhesive bond coupling each flexible member to adjacent portions of the field member.

The haptic actuator further comprises a mechanical stop coupled between the spaced distal ends of a given flexible member.

The haptic actuator further comprises a mechanical stop coupled to the field member adjacent the proximal ends of the two diverging arms of a given flexible member.

An electronic device comprises a housing, wireless communications circuitry carried by the housing, and a haptic actuator carried by the housing. The haptic actuator comprises an actuator housing, at least one coil carried by the housing, a field member having opposing first and second sides, and a respective flexure bearing mounting each of the first and second sides of the field member to be reciprocally movable within the housing responsive to the at least one coil. Each flexure bearing comprises a plurality of nested flexible members each having a wishbone shape with two diverging arms joined together at proximal ends and having spaced distal ends operatively coupled between adjacent portions of the field member and the housing. The electronic device comprises a controller coupled to the wireless communications circuitry and the haptic actuator and configured to perform at least one wireless communications function and selectively operate the haptic actuator.

The haptic actuator further comprises a coupling member coupling together proximal ends of the plurality of nested flexible members.

The two diverging arms of a given flexible member are parallel with the two diverging arms of an adjacent nested flexible member of the plurality thereof.

Each of the two diverging arms of each of the plurality of nested flexible members has a bend therein.

The two diverging arms include respective portions being spaced apart adjacent the proximal ends.

A method of making a haptic actuator comprises positioning a respective flexure bearing to mount each of first and second sides of a field member to be reciprocally movable within a housing responsive to at least one coil, each flexure bearing comprising a plurality of nested flexible members each having a wishbone shape with two diverging arms joined together at proximal ends and having spaced distal ends operatively coupled between adjacent portions of the field member and the housing.

Each respective flexure bearing comprises a coupling member coupling together proximal ends of the plurality of nested flexible members.

The two diverging arms of a given flexible member are parallel with the two diverging arms of an adjacent nested flexible member of the plurality thereof.

Each of the two diverging arms of each of the plurality of nested flexible members has a bend therein.

The two diverging arms include respective portions being spaced apart adjacent the proximal ends.

Figure 43:
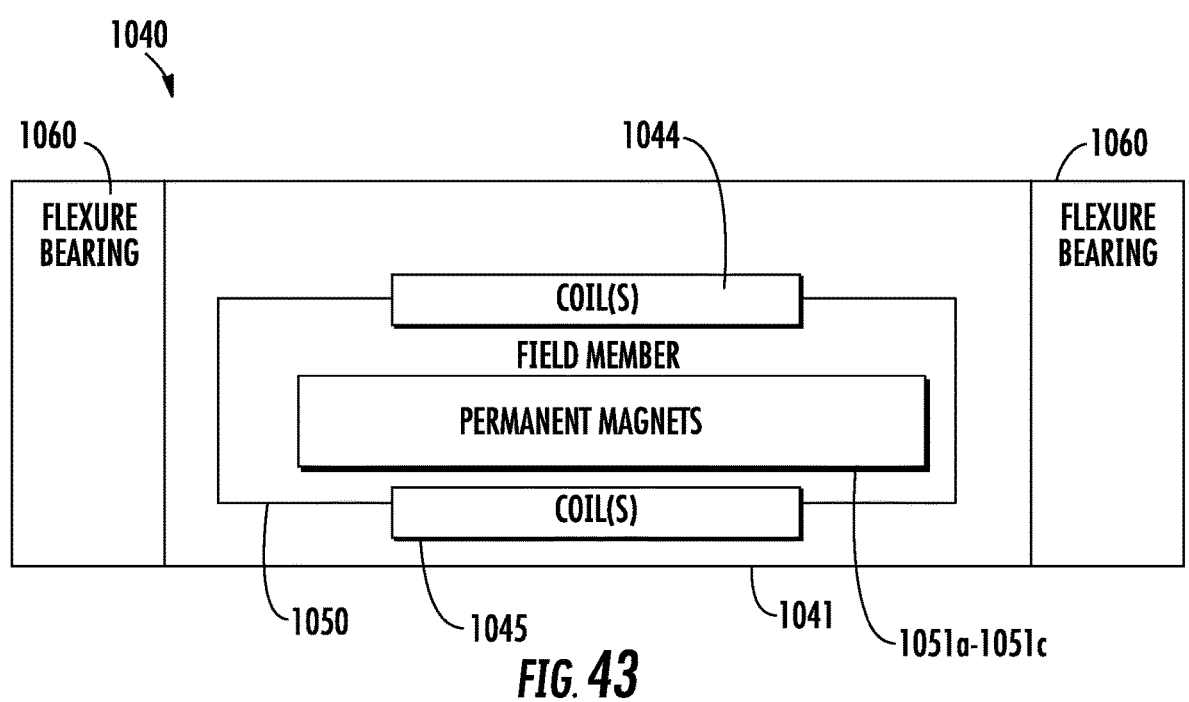
FIG. 43 is a block diagram of a haptic actuator in accordance with an embodiment.
Figure 44:
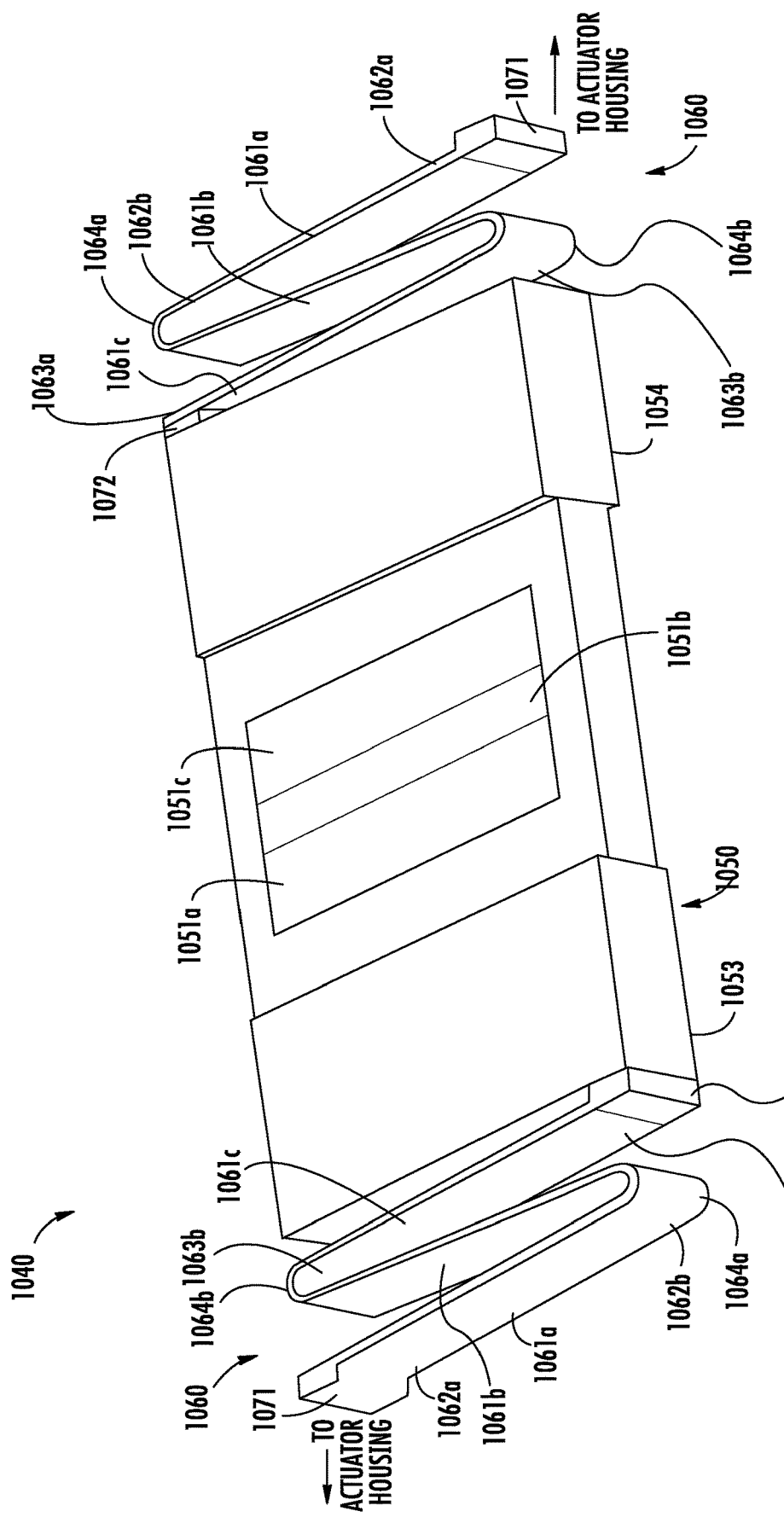
FIG. 44 is a perspective view of a portion of a haptic actuator in accordance with an embodiment.

Referring now additionally to FIGS. 43-44, in another embodiment the haptic actuator 1040 includes an actuator housing 1041. The actuator housing 1041 illustratively has a dimension in a length direction greater than a width direction. The actuator housing 1041 may include ferritic material in portions of or all of the actuator housing. For example, the top and bottom of the actuator housing 1041 may be ferritic. Of course other and/or additional portions of the actuator housing 1041 may be ferritic. The use of ferritic material in the actuator housing 1041 may improve performance, for example.

The haptic actuator 1040 also includes first and second coils 1044, 1045 carried by the actuator housing 1041, for example, the top and the bottom, respectively. The first and second coils 1044, 1045 may each have a loop shape or "racetrack" shape and are aligned in a stacked relation and spaced apart. There may be any number of first and second coils 1044, 1045, as will be appreciated by those skilled in the art. Moreover, in some embodiments, the first and/or second coils 1044, 1045 may be carried by the actuator housing around an exterior thereof, i.e., a circumferential voice coil.

The haptic actuator 1040 also includes a field member 1050 carried by the actuator housing 1041. The field member 1050, similarly to the actuator housing 1041, has a dimension in a length direction greater than a width direction. Thus, the field member 1050 is reciprocally movable in the width direction (i.e., the y-direction). While the movement of the field member 1050 is described as being movable in one direction, i.e., a linear haptic actuator, it should be understood that in some embodiments, the field member may be movable in other directions, i.e., an angular haptic actuator, or may be a combination of both a linear and an angular haptic actuator.

The field member 1050 illustratively includes permanent magnets 1051a-1051c between the first and second coils 1044, 1045. The permanent magnets 1501a-1051c may be neodymium, for example, and may be positioned in opposing directions with respect to their respective poles.

Figure 45:
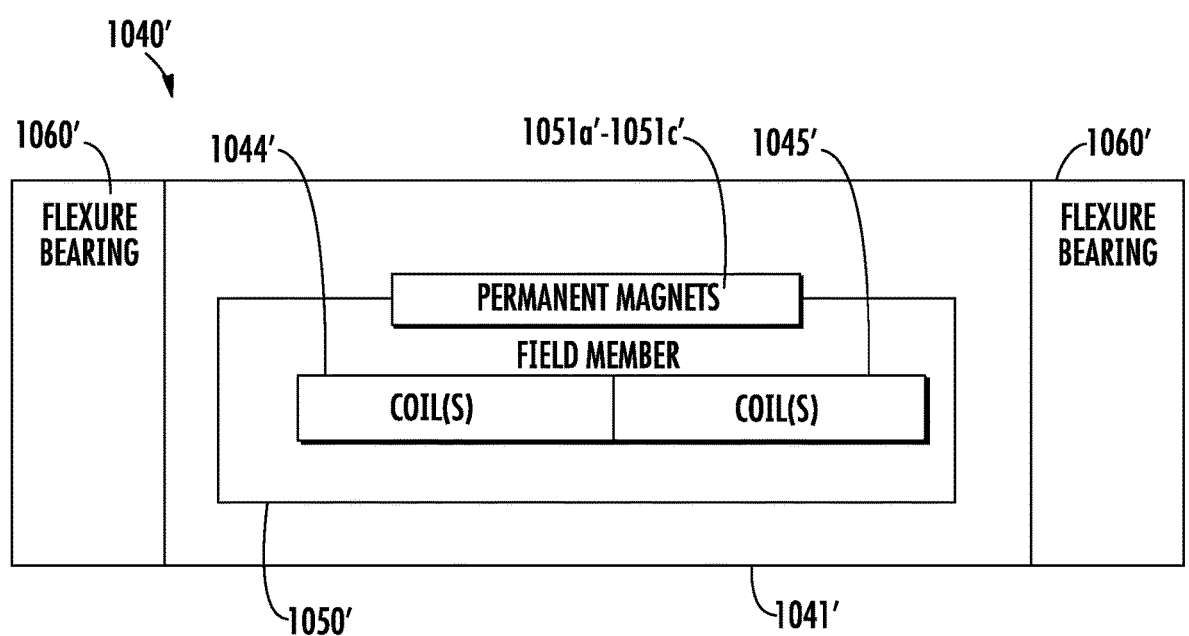
FIG. 45 is a block diagram of a haptic actuator in accordance with another embodiment.

The permanent magnets 1051a-1501c are aligned with the first and second coils 1044, 1045. While three permanent magnets 1051a-1051c are illustrated, it will be appreciated that there may be any number of permanent magnets having any shape between the first and second coils 1044, 1045. The permanent magnets 1051a-1051c may be arranged in a Halbach array, for example. Referring briefly to FIG. 45, in some embodiments, the position of the coils 1044', 1045' and the permanent magnets 1051a'-1051c' may be reversed. In other words, the first and second coils 1044', 1045' may be carried by or part of the field member 1050', while the permanent magnets 1051a'-1051c' are stationary or carried by the actuator housing 1041' (i.e., a moving coil configuration).

The haptic actuator 1040 also includes respective flexure bearings 1060 mounting each of first and second sides 1053, 1054 of the field member 1050 to be reciprocally movable within the actuator housing 1041 responsive to the first and second coils 1044, 1045. Each flexure bearing 1060 includes series coupled arms 1061a-1061c. While three arms 1061a-1061c are illustrated, it will be appreciated that there may be more than three arms. A first arm 1061a has a fixed end 1062a coupled to the actuator housing 1041, for example, by way of a first anchor member 1071.

A last arm 1061c has a fixed end 1063a this is coupled to the field member 1050. The last arm 1061c may be coupled to the field member 1050 by way of a second anchor member 1072, for example. The first and last arms 1061a, 1061c may be coupled, respectively, to the actuator housing 1041 by other and/or additional interface members or directly without any anchor or other member.

Each flexure bearing 1060 also includes an intermediate arm 1061b coupled between free ends 1062b, 1063b of the first and last arms 1061a, 1061c. The intermediate arm 1061b has opposing free ends by way of coupling to the free ends 1062b, 1063b of the first and last arms 1061a, 1061c. Illustratively, the flexure bearing 1060 has first and second bends 1064a, 1064b therein at the transition between the first and intermediate arms 1061a, 1061b and the last and intermediate arms 1061c, 1061b, respectively. In some embodiments, the transition between adjacent series coupled arms may not be in the form of a bend, but instead may include spacers, weld joints, and/or other transitions. As will be appreciated by those skilled in the art, the flexure bearing 1060 may include additional arms, for example, additional intermediate arms that would be series coupled.

The first, intermediate, and last arms 1061a-1061c may include steel, titanium, and/or copper. The first, intermediate, and last arms 1061a-1061c may include other and/or additional materials.

Figure 46:
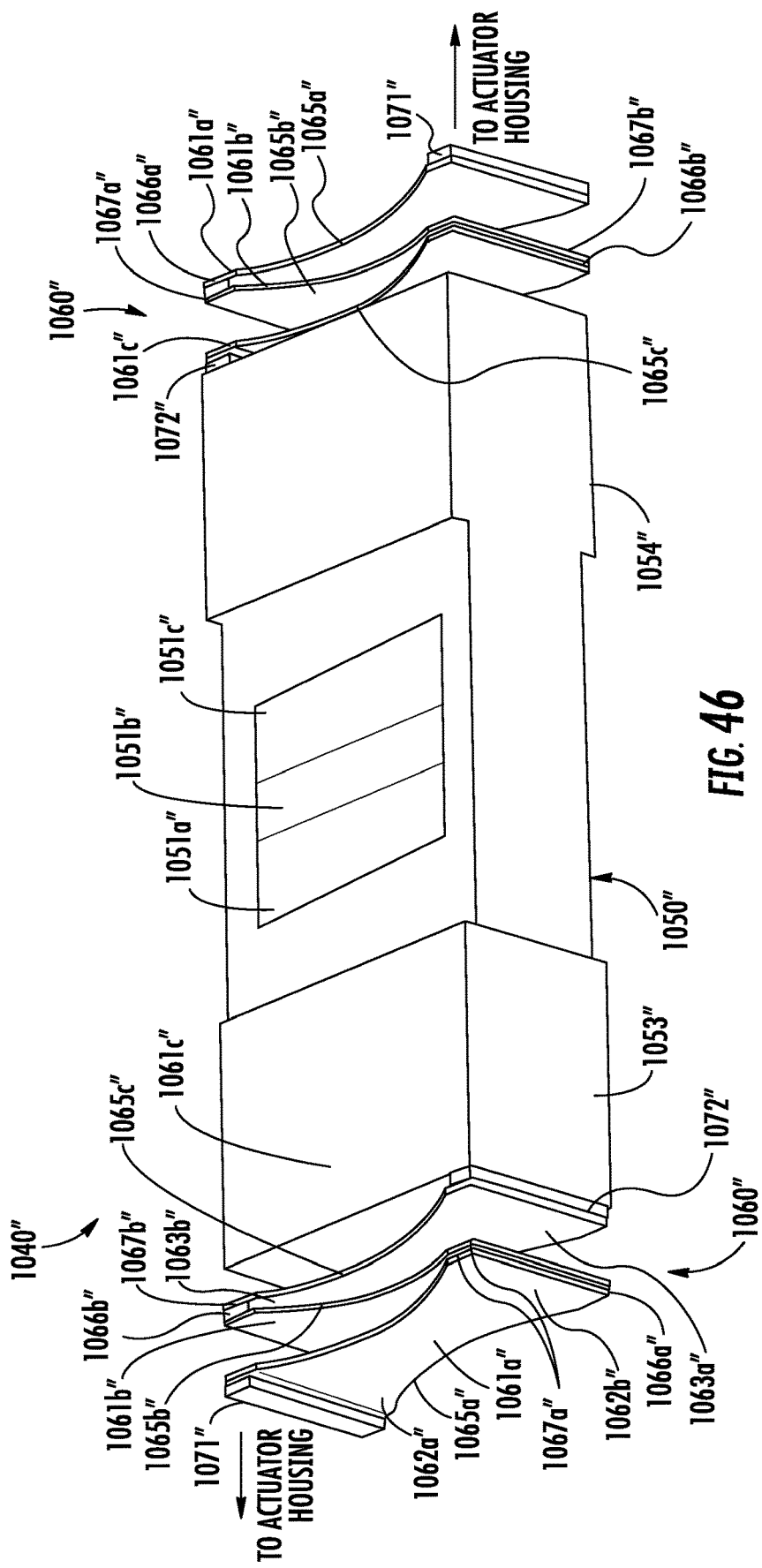
FIG. 46 is a perspective view of a portion of a haptic actuator in accordance with another embodiment.
Figure 47:
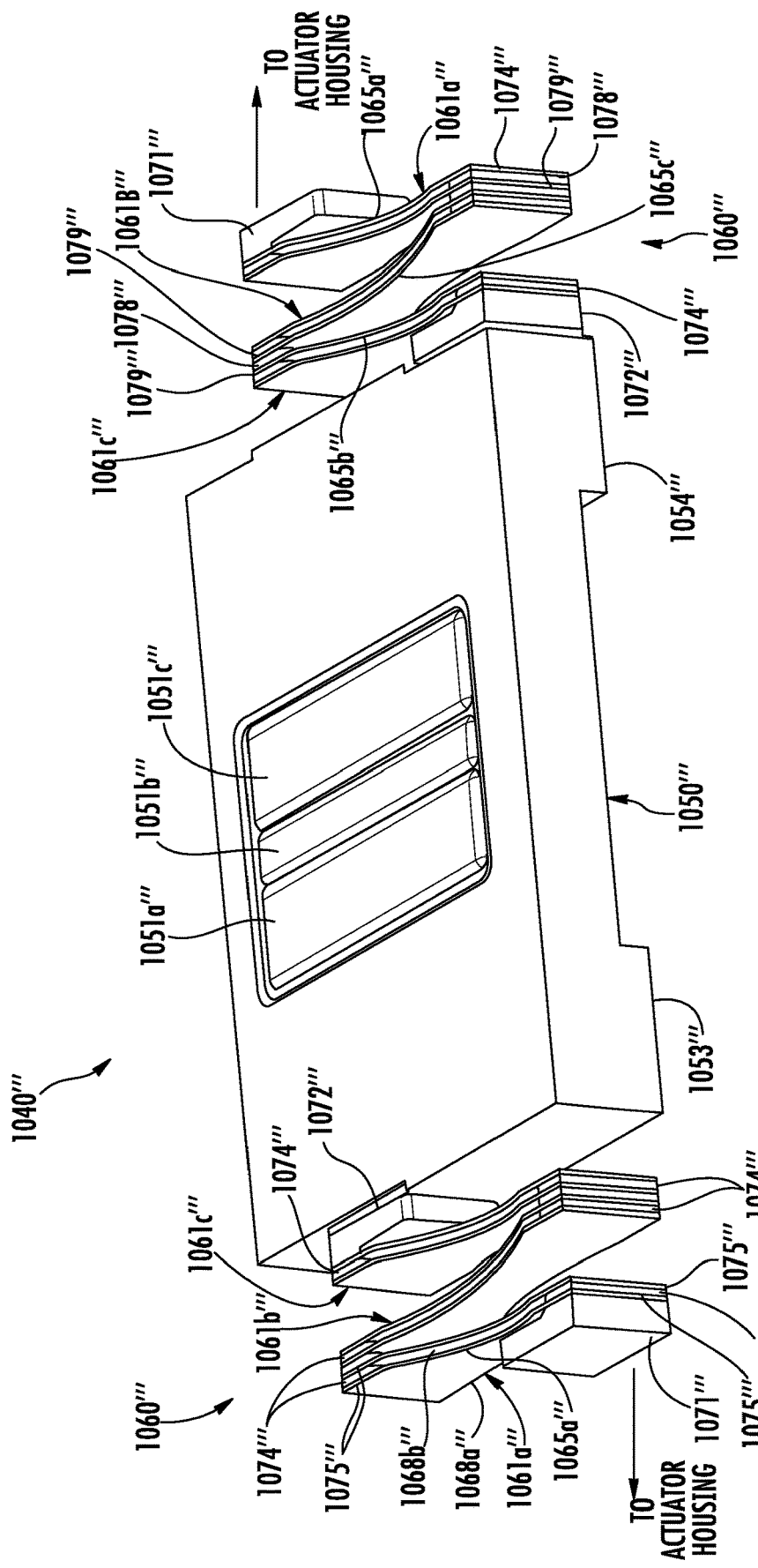
FIG. 47 is a perspective view of a portion of a haptic actuator in accordance with another embodiment.
Figure 48:
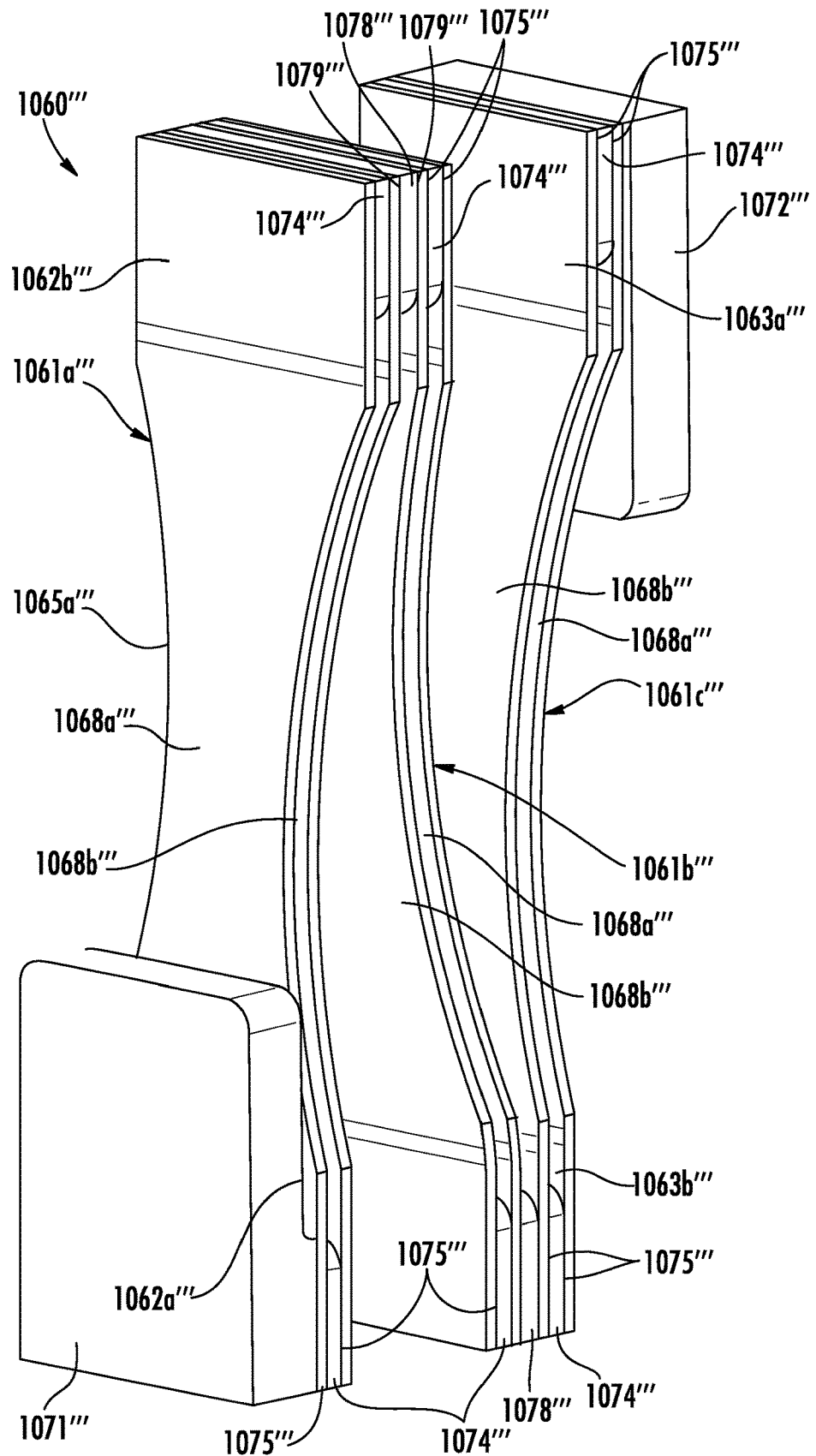
FIG. 48 is an enlarged perspective view of the flexure bearing of FIG.
Figure 49:
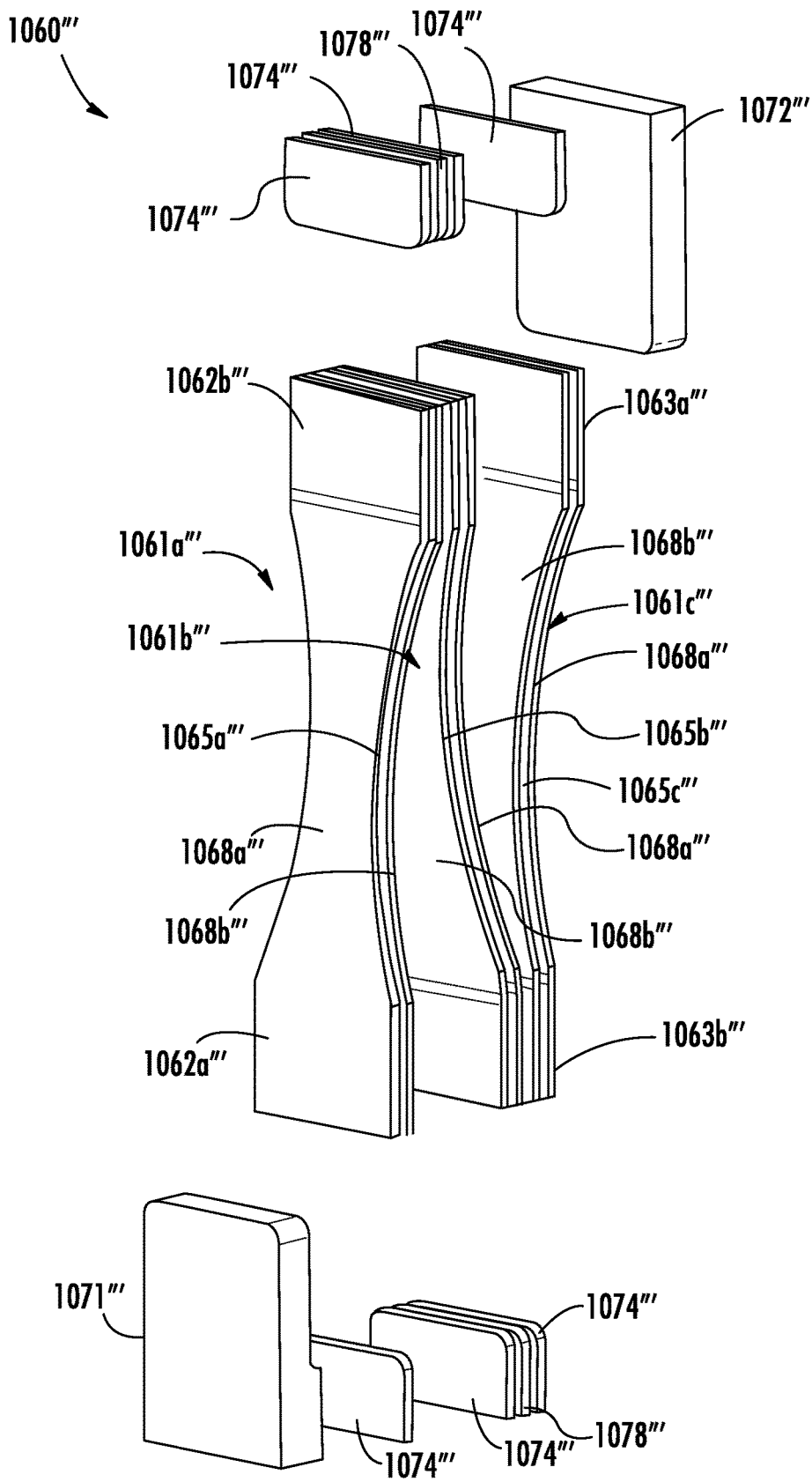
FIG. 49 is an exploded perspective view of the flexure bearing of FIG. 47.
Figure 50:
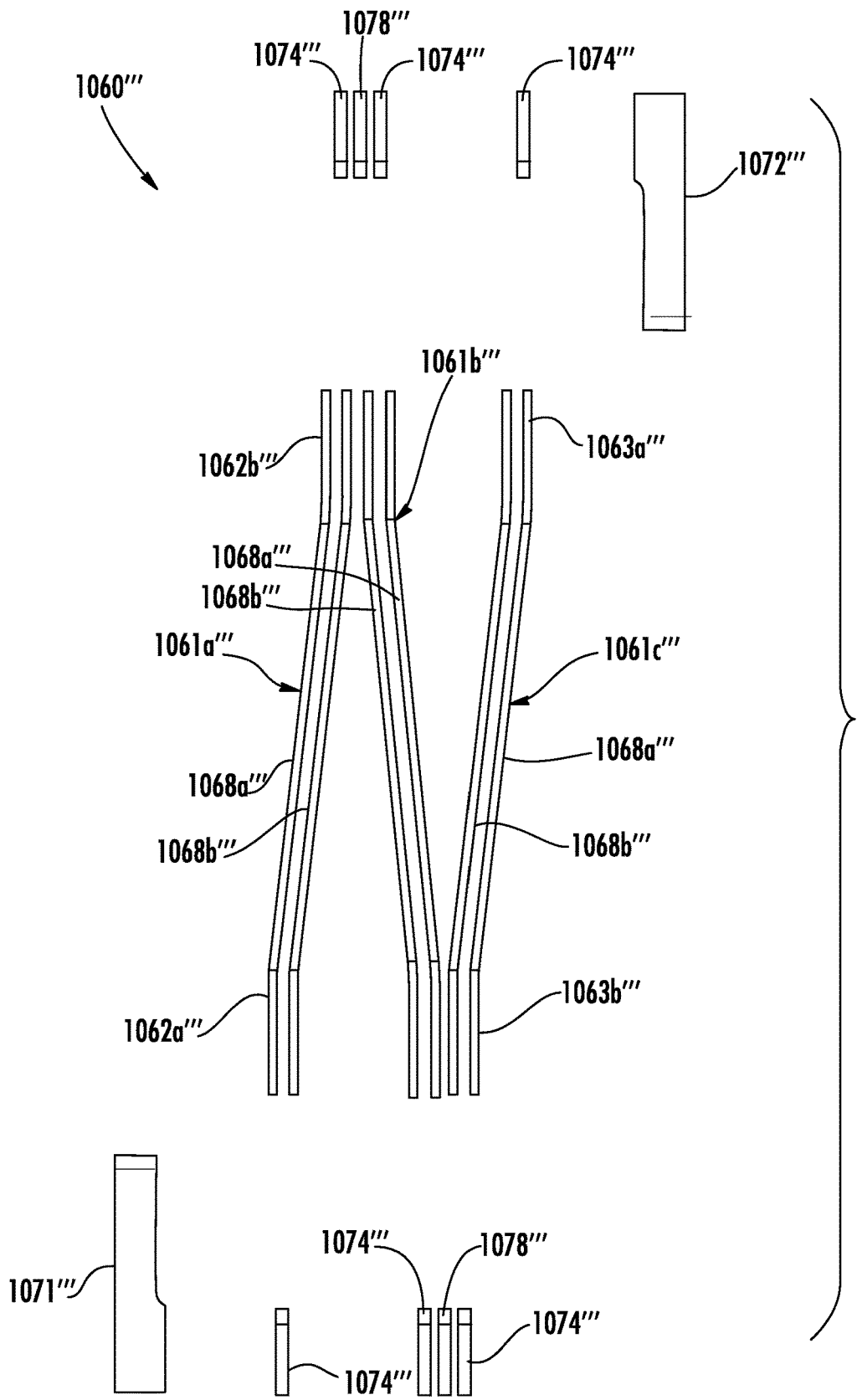
FIG. 50 is an exploded side view of the flexure bearing of FIG. 47.
Figure 51:
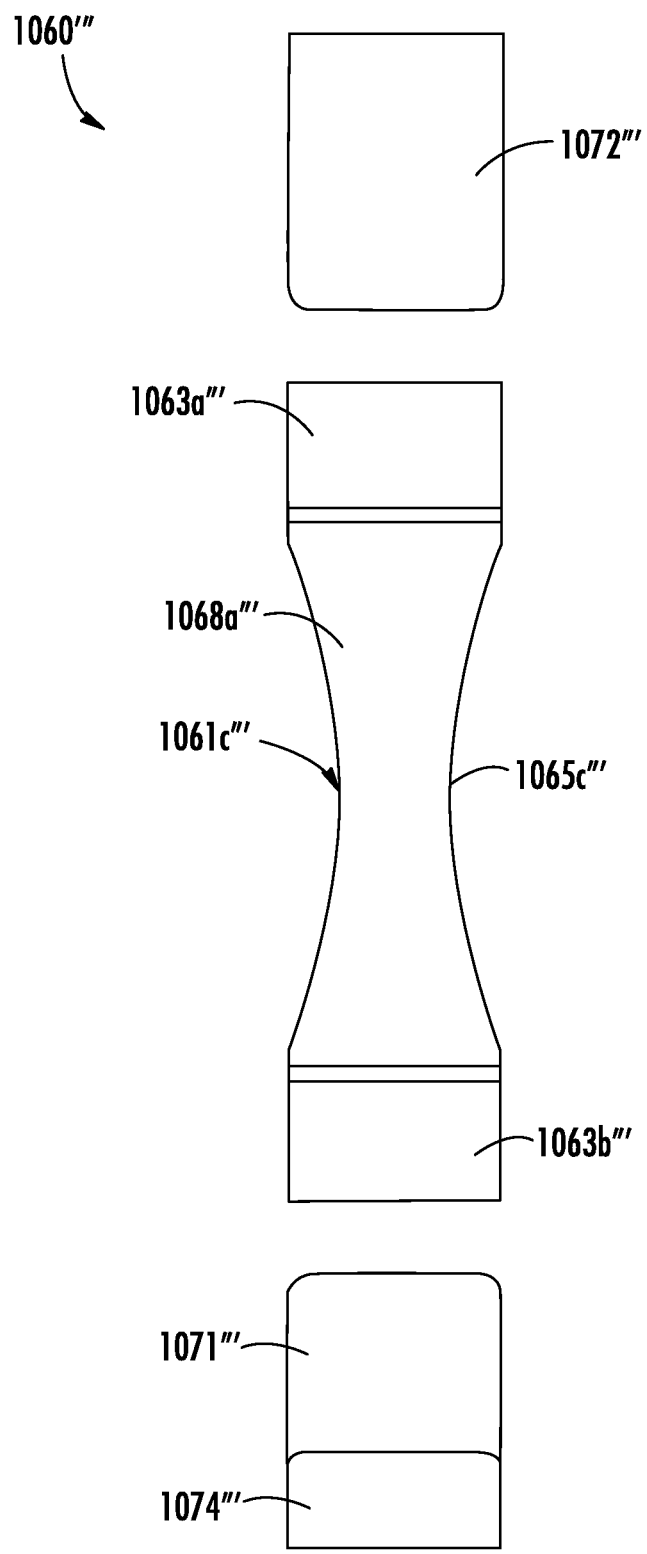
FIG. 51 is an exploded top view of the flexure bearing of FIG. 47.

Referring now to FIG. 46, each arm 1061a"-1061c" has a blade shape having a length between respective ends, a thickness, and height with a varying profile defining a reduced sized medial portion 1065a"-1065c". The varying profile that defines the reduced sized medial portions 1065a"-1065c" illustratively is in the form of a curve between the ends.

Each flexure bearing 1060" illustratively does not include a bend. Each arm 1061a"-1061c" is coupled to the adjacent arm using a spacer member 1066a", 1066b" adjacent the ends. More particularly, a respective spacer member 1066a", 1066b" is between adjacent ends of the intermediate arm 1061b" and the first arm 1061a", and the intermediate arm and the last arm 1061c". A weld joint joins 1067a", 1067b" together each respective spacer member 1066a", 1066b" with the intermediate and first arms 1061b", 1061a", and intermediate and last arms 1061c".

The reduced size medial portion 1065a"-1065c" may advantageously distribute stresses over each arm 1061a"-1061c" thus constituting an improved use of the material. In contrast, in a flat arm, or uniform size arm, stresses are mostly distributed along edges of the arms. More particularly, each arm is patterned (e.g. stamped) with the illustrated curved pattern defining the reduced size medial portion 1065a"-1065c" to distribute the stress more uniformly over the length of the arms and away from the weld joints to reduce the risk of fatigue and improve the flexure travel range at low frequencies by up to 1.5 times.

Referring now to FIGS. 47-51, in another embodiment, each arm 1061a'"-1061c'" includes first and second parallel and spaced apart blades 1068a'", 1068b'". Each arm 1061a'"-1061c'" has spacer members 1074'" between the first and second parallel and spaced apart blades 1068a'", 1068b'" at the ends thereof (e.g., at both free and fixed ends). Respective weld joints 1075'" join together each of the plurality of spacer members 1074'" and adjacent portions of the spaced apart blades 1068a'"-1068c'". Further spacer members 1078'" and respective weld joints 1079'" join together the first and intermediate arms 1061a'", 1061 b'", and the last and intermediate arms 1061c'", 1061 b'" at ends thereof.

Figure 52:
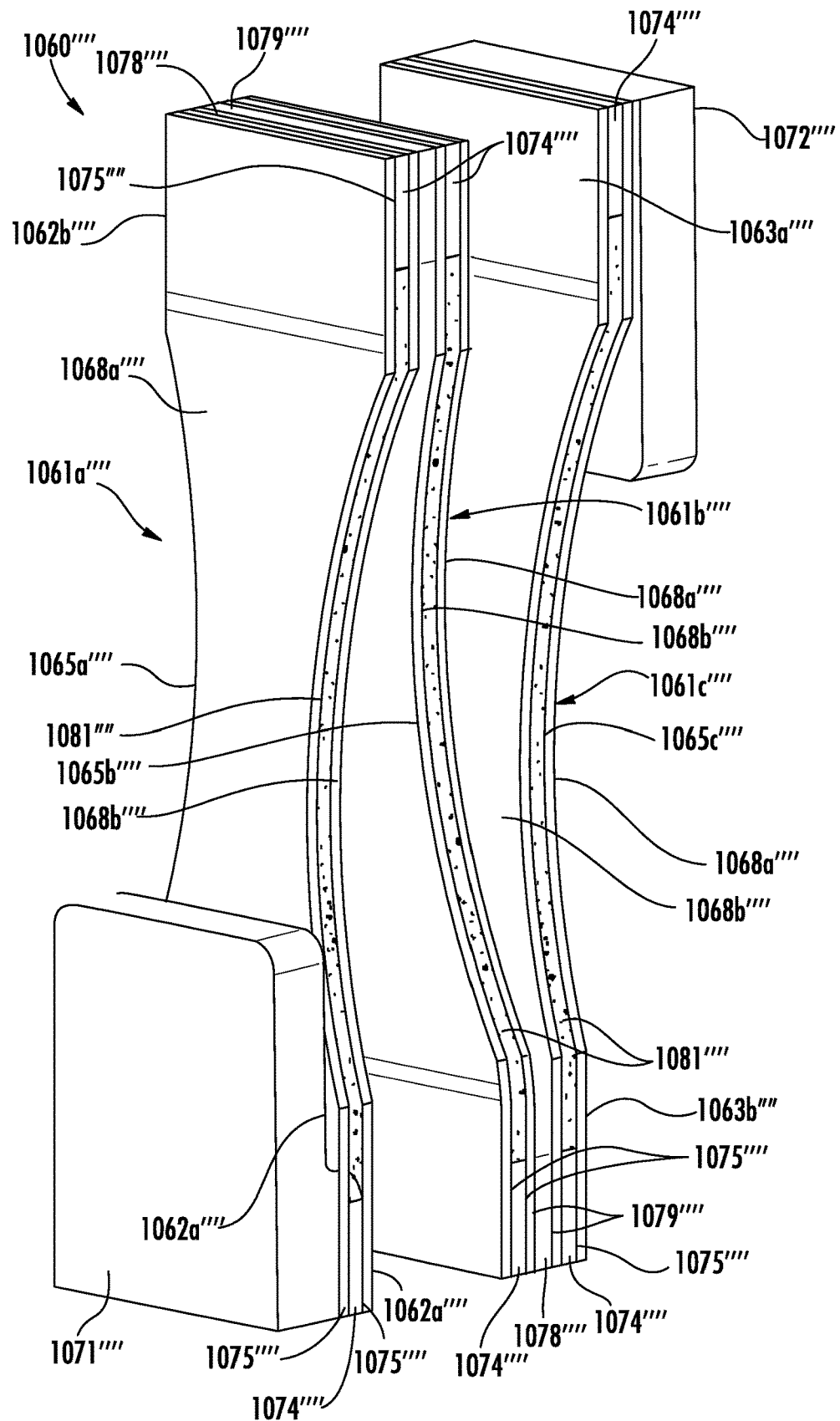
FIG. 52 is an enlarged perspective view of a flexure bearing in accordance with another embodiment.
Figure 53:
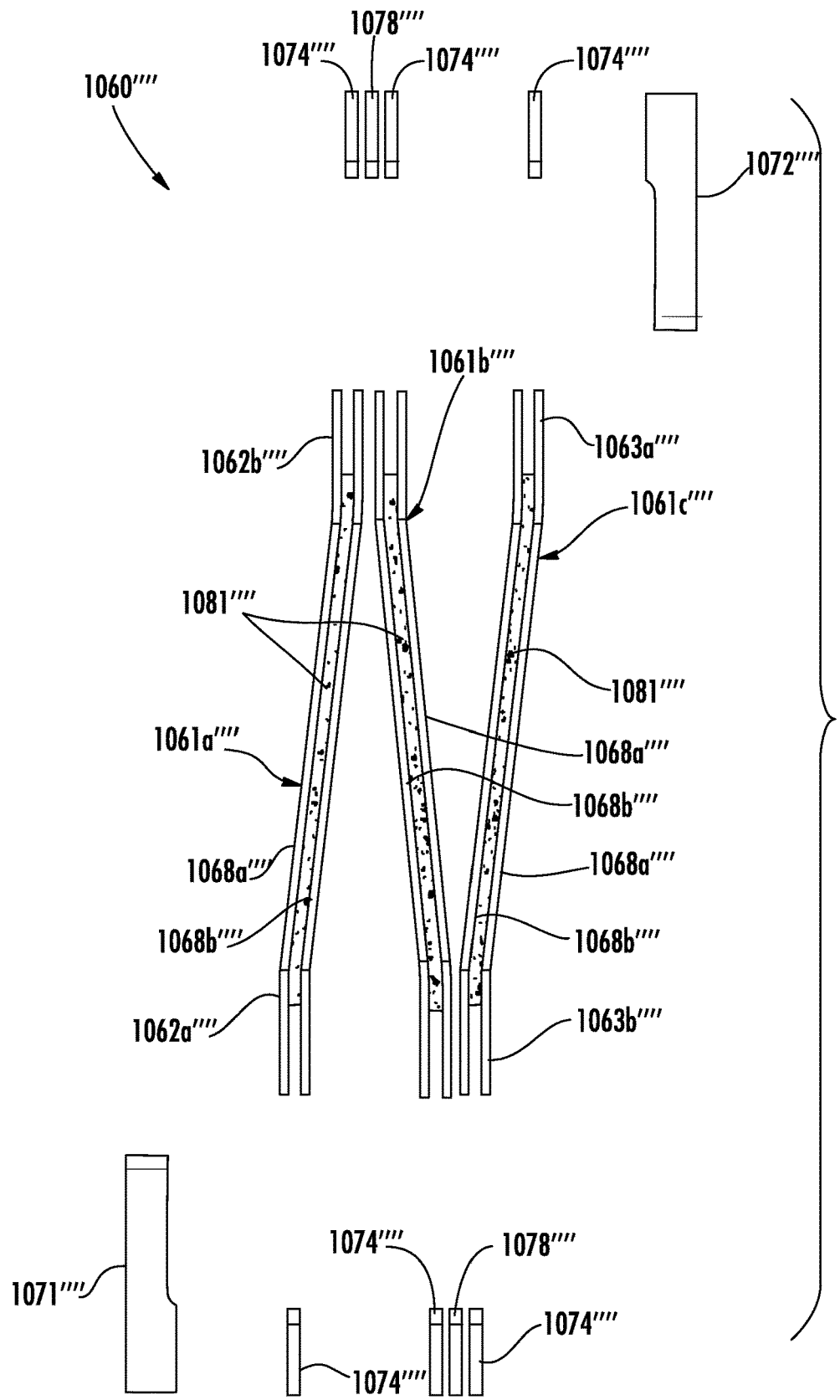
FIG. 53 is an exploded side view of the flexure bearing of FIG. 52.

Referring briefly to FIGS. 52 and 53 in another embodiment, each arm 1061a""-1061c"" may include a filler body 1081"" between the first and second parallel and spaced apart blades 1068a"", 1068b"". The filler body 1081"" may include a relatively soft material or bumper material, for example, an elastic material, silicone, and/or foam and follows the contour of the first and second blades 1068a"", 1068b"". The filler body 1081"" may act as a crash stop, for example, to reduce failure in an event of a crash. Of course, the filler body 1081"" may be another and/or include other materials, for example. As will be appreciated by those skilled in the art, the flexure bearing 1060"", at a relatively low frequency, may not see between the filler body 1081"", but upon a drop of the haptic actuator or at a relatively high frequency, the filler material provides increased protection against a failure. In some embodiments, the first and second spaced apart blades 1068a"", 1068b"" may be covered, partially or completely, in a bumper material.

As will be appreciated by those skilled in the art, by adding to the number of arms in a flexure bearing (e.g., going from two to three), the displacement and load may be distributed over more arms and reduce, e.g. proportionally, the fatigue risk for a same travel range. Furthermore, increasing the number of arms generally may increase the thickness of the flexure bearing for a given stiffness. Thus, the flexure bearings 1060, 1060", 1060'", 1060"" described herein may be significantly more bulky than one with two arms, for example, for the same stiffness.

Increasing the number of arms may deteriorate the lateral stiffness of the flexure bearing especially in Y-axis and Z-axis directions, which may be considered the main tradeoff of the flexure bearings described herein as opposed to, for example, a two-arm V-shaped flexure bearing. The first and second parallel and spaced apart blades 1068a'", 1068b'" of each flexure arm 1061a'"-1061c'" improve the lateral stiffness. Moreover, torsion, for example, at the free ends 1062b'", 1063b'" may be reduced, thus improving the actuator particularly in its higher modes. Frequency separation between a first mode (desired LRA motion in x-axis direction) and higher modes may also increase.

Still further, the free ends 1062b'", 1063b'" of the arms 1061a'", 1061c'" may act as a robust crash stop and may be used in addition to other crash stops that may be positioned along and/or adjacent the arms. Thus the risk of flexure deformation in the x-axis direction may be reduced, for example, during a drop.

A method aspect is directed to a method of making a haptic actuator 1040. The method includes positioning a respective flexure bearing 1060 to mount each of first and second sides 1053, 1054 of a field member 1050 to be reciprocally movable within a housing 1041 responsive to at least one coil 1044, 1045. Each flexure bearing 1060 includes series coupled arms 1061a-1061c, with a first arm 1061a having fixed end 1062a coupled to the housing 1041, a last arm 1061c having a fixed end 1063a coupled to the field member 1050, and an intermediate arm 1061b coupled between free ends 1062b, 1063b of the first and last arms.

A haptic actuator comprises a housing, at least one coil carried by the housing, a field member having opposing first and second sides, and a respective flexure bearing mounting each of the first and second sides of the field member to be reciprocally movable within the housing responsive to the at least one coil. Each flexure bearing comprises a plurality of series coupled arms, with a first arm having a fixed end coupled to the housing, a last arm having a fixed end coupled to the field member, and at least one intermediate arm coupled between free ends of the first and last arms.

Each arm has a blade shape having a length between respective ends, a thickness, and height with a varying profile defining a reduced sized medial portion.

Each flexure bearing further comprises a respective spacer member between adjacent ends of the at least one intermediate arm and the first arm, and the at least one intermediate arm and the last arm.

The haptic actuator further comprises a weld joint joining together the respective spacer member with the at least one intermediate and first arms, and the at least one intermediate and last arms.

Each arm comprises first and second parallel and spaced apart blades.

Each arm comprises a plurality of spacer members between the first and second parallel and spaced apart blades.

The haptic actuator further comprises respective weld joints joining together each of the plurality of spacer members and adjacent portions of the spaced apart blades.

Each arm further comprises a filler body between the first and second parallel and spaced apart blades.

Each flexure bearing has a plurality of bends therein.

Each flexure bearing further comprises a first anchor member between the housing and first arm.

Each flexure bearing further comprises a second anchor member between the field member and last arm.

An electronic device comprises a housing, wireless communications circuitry carried by the housing, and a haptic actuator carried by the housing. The haptic actuator comprises an actuator housing, at least one coil carried by the housing, a field member having opposing first and second sides, and a respective flexure bearing mounting each of the first and second sides of the field member to be reciprocally movable within the housing responsive to the at least one coil. Each flexure bearing comprises a plurality of series coupled arms, with a first arm having a fixed end coupled to the housing, a last arm having a fixed end coupled to the field member, and at least one intermediate arm coupled between free ends of the first and last arms. The electronic device comprises a controller coupled to the wireless communications circuitry and the haptic actuator and configured to perform at least one wireless communications function and selectively operating the haptic actuator.

Each arm has a blade shape having a length between respective ends, a thickness, and height with a varying profile defining a reduced sized medial portion.

Each flexure bearing further comprises a respective spacer member between adjacent ends of the at least one intermediate arm and the first arm, and the at least one intermediate arm and the last arm.

Each arm comprises first and second parallel and spaced apart blades.

Each arm comprises a plurality of spacer members between the first and second parallel and spaced apart blades.

Each arm further comprises a filler body between the first and second parallel and spaced apart blades.

A method of making a haptic actuator comprises positioning a respective flexure bearing to mount each of first and second sides of a field member to be reciprocally movable within a housing responsive to at least one coil, each flexure bearing comprising a plurality of series coupled arms, with a first arm having a fixed end coupled to the housing, a last arm having a fixed end coupled to the field member, and at least one intermediate arm coupled between free ends of the first and last arms.

Each arm has a blade shape having a length between respective ends, a thickness, and height with a varying profile defining a reduced sized medial portion.

Each flexure bearing further comprises a respective spacer member between the at least one intermediate arm and the first arm, and the at least one intermediate arm and the last arm.

Each arm comprises first and second parallel and spaced apart blades.

Each arm comprises a plurality of spacer members between the first and second parallel and spaced apart blades.

Each arm further comprises a filler body between the first and second parallel and spaced apart blades.

A haptic actuator comprises a housing, at least one permanent magnet carried by the housing, a field member having opposing first and second sides and comprising at least one coil cooperating with the at least one permanent magnet, and a respective flexure bearing mounting each of the first and second sides of the field member to be reciprocally movable within the housing responsive to the at least one coil. Each flexure bearing comprises a plurality of series coupled arms, with a first arm having a fixed end coupled to the housing, a last arm having a fixed end coupled to the field member, and at least one intermediate arm coupled between free ends of the first and last arms.

Each arm has a blade shape having a length between respective ends, a thickness, and height with a varying profile defining a reduced sized medial portion.

Each flexure bearing further comprises a respective spacer member between adjacent ends of the at least one intermediate arm and the first arm, and the at least one intermediate arm and the last arm.

The haptic actuator further comprises a weld joint joining together the respective spacer member with the at least one intermediate and first arms, and the at least one intermediate and last arms.

Each arm comprises first and second parallel and spaced apart blades.

Each arm comprises a plurality of spacer members between the first and second parallel and spaced apart blades.

The haptic actuator further comprises respective weld joints joining together each of the plurality of spacer members and adjacent portions of the spaced apart blades.

Each arm further comprises a filler body between the first and second parallel and spaced apart blades.

Each flexure bearing has a plurality of bends therein.

Each flexure bearing further comprises a first anchor member between the housing and first arm.

Each flexure bearing further comprises a second anchor member between the field member and last arm.

An electronic device comprises a housing, wireless communications circuitry carried by the housing, and a haptic actuator carried by the housing. The haptic actuator comprises an actuator housing, at least one permanent magnet carried by the housing, a field member having opposing first and second sides and comprising at least one coil cooperating with the at least one permanent magnet, and a respective flexure bearing mounting each of the first and second sides of the field member to be reciprocally movable within the housing responsive to the at least one coil. Each flexure bearing comprises a plurality of series coupled arms, with a first arm having a fixed end coupled to the housing, a last arm having a fixed end coupled to the field member, and at least one intermediate arm coupled between free ends of the first and last arms. The electronic device comprises a controller coupled to the wireless communications circuitry and the haptic actuator and configured to perform at least one wireless communications function and selectively operating the haptic actuator.

Each arm has a blade shape having a length between respective ends, a thickness, and height with a varying profile defining a reduced sized medial portion.

Each flexure bearing further comprises a respective spacer member between adjacent ends of the at least one intermediate arm and the first arm, and the at least one intermediate arm and the last arm.

Each arm comprises first and second parallel and spaced apart blades.

Each arm comprises a plurality of spacer members between the first and second parallel and spaced apart blades.

Each arm further comprises a filler body between the first and second parallel and spaced apart blades.

A method of making a haptic actuator comprises positioning a respective flexure bearing to mount each of first and second sides of a field member comprising at least one coil to be reciprocally movable within a housing responsive to the at least one coil, the housing carrying at least one permanent magnet cooperating with the at least one coil, each flexure bearing comprising a plurality of series coupled arms, with a first arm having a fixed end coupled to the housing, a last arm having a fixed end coupled to the field member, and at least one intermediate arm coupled between free ends of the first and last arms.

Each arm has a blade shape having a length between respective ends, a thickness, and height with a varying profile defining a reduced sized medial portion.

Each flexure bearing further comprises a respective spacer member between the at least one intermediate arm and the first arm, and the at least one intermediate arm and the last arm.

Each arm comprises first and second parallel and spaced apart blades.

Each arm comprises a plurality of spacer members between the first and second parallel and spaced apart blades.

Each arm further comprises a filler body between the first and second parallel and spaced apart blades.

While several different embodiments have been described, it should be appreciated that elements in any one embodiment may be used with any other element or elements from any of the other embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A haptic actuator comprising:
a housing;
at least one coil carried by the housing;
a field member having opposing first and second sides; and
a respective at least one flexure bearing mounting each of the first and second sides of the field member to be reciprocally movable within the housing responsive to the at least one coil;
each flexure bearing comprising two diverging arms joined together at proximal ends and having spaced distal ends operatively coupled between adjacent portions of the field member and the housing, the two diverging arms each having,
a respective length extending between a respective proximal end and a respective distal end; and
a respective reduced size medial portion relative to the respective proximal end and the respective distal end; wherein,
the respective reduced size medial portion is transverse to the respective length.

2. The haptic actuator of claim 1 wherein each flexure bearing further comprises a spacer member between the proximal ends of the two diverging arms.

3. The haptic actuator of claim 2 further comprising a weld joint joining together the spacer member and the proximal ends of the two diverging arms.

4. The haptic actuator of claim 1 wherein each diverging arm comprises first and second parallel and spaced apart blades.

5. The haptic actuator of claim 4 wherein each diverging arm comprises proximal and distal end spacers between the first and second parallel and spaced apart blades.

6. The haptic actuator of claim 5 further comprising respective weld joints joining together the proximal and distal end spacers and adjacent portions of the spaced apart blades.

7. The haptic actuator of claim 4 wherein each diverging arm further comprises a filler body between the first and second parallel and spaced apart blades.

8. The haptic actuator of claim 1 wherein each flexure bearing has a wishbone shape.

9. The haptic actuator of claim 1 wherein each flexure bearing comprises at least one mechanical stop adjacent the proximal ends.

10. The haptic actuator of claim 1 wherein each flexure bearing comprises at least one mechanical stop between the spaced distal ends.

11. An electronic device comprising:
a housing;
wireless communications circuitry carried by the housing;
a haptic actuator carried by the housing and comprising
an actuator housing,
at least one coil carried by the actuator housing,
a field member having opposing first and second sides, and
a respective at least one flexure bearing mounting each of the first and second sides of the field member to be reciprocally movable within the housing responsive to the at least one coil,
each flexure bearing comprising two diverging arms joined together at proximal ends and having spaced distal ends operatively coupled between adjacent portions of the field member and the housing, the two diverging arms each having,
a respective length extending between a respective proximal end and a respective distal end; and
a respective reduced size medial portion relative to the respective proximal end and the respective distal end; wherein,
the respective reduced size medial portion is transverse to the respective length; and
a controller coupled to the wireless communications circuitry and the haptic actuator and configured to perform at least one wireless communications function and selectively operate the haptic actuator.

12. The electronic device of claim 11 wherein each flexure bearing further comprises a spacer member between the proximal ends of the two diverging arms.

13. The electronic device of claim 12 wherein the haptic actuator further comprises a weld joint joining together the spacer member and the proximal ends of the two diverging arms.

14. The electronic device of claim 11 wherein each diverging arm comprises first and second parallel and spaced apart blades.

15. The electronic device of claim 14 wherein each diverging arm comprises proximal and distal end spacers between the first and second parallel and spaced apart blades.

16. The electronic device of claim 14 wherein each diverging arm further comprises a filler body between the first and second parallel and spaced apart blades.

17. A method of making a haptic actuator comprising:
positioning a respective at least one flexure bearing to mount each of first and second sides of a field member to be reciprocally movable within a housing responsive to at least one coil, each flexure bearing comprising two diverging arms joined together at proximal ends and having spaced distal ends operatively coupled between adjacent portions of the field member and the housing, the two diverging arms each having,
a respective length extending between a respective proximal end and a respective distal end; and
a respective reduced size medial portion relative to the respective proximal end and the respective distal end; wherein, the respective reduced size medial portion is transverse to the respective length.

18. The method of claim 17 wherein each flexure bearing further comprises a spacer member between the proximal ends of the two diverging arms.

19. The method of claim 17 wherein each diverging arm comprises first and second parallel and spaced apart blades.

20. The method of claim 19 wherein each diverging arm comprises proximal and distal end spacers between the first and second parallel and spaced apart blades.

21. The method of claim 19 wherein each diverging arm further comprises a filler body between the first and second parallel and spaced apart blades.

\* \* \* \* \*